United States Patent
Li et al.

(10) Patent No.: US 12,546,950 B2
(45) Date of Patent: Feb. 10, 2026

(54) FIBER CONNECTOR PLUG ASSEMBLY, FIBER CONNECTOR ASSEMBLY, AND COMMUNICATION DEVICE

(71) Applicant: Huawei Technologies Co., Ltd., Shenzhen (CN)

(72) Inventors: Xiupeng Li, Wuhan (CN); Shangjun Peng, Wuhan (CN); Chunpeng Wang, Mexico City (MX)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 18/307,520

(22) Filed: Apr. 26, 2023

(65) Prior Publication Data

US 2023/0258875 A1    Aug. 17, 2023

Related U.S. Application Data

(63) Continuation of application No. PCT/CN2021/111912, filed on Aug. 10, 2021.

(30) Foreign Application Priority Data

Oct. 29, 2020   (CN) .......................... 202011183419.7

(51) Int. Cl.
G02B 6/38    (2006.01)
(52) U.S. Cl.
CPC ......... *G02B 6/3825* (2013.01); *G02B 6/3831* (2013.01)
(58) Field of Classification Search
None
See application file for complete search history.

(56) References Cited

U.S. PATENT DOCUMENTS 5,067,783 A * 11/1991 Lampert .............. G02B 6/3877
385/60
5,321,784 A * 6/1994 Cubukciyan ......... G02B 6/3869
385/87

(Continued)

FOREIGN PATENT DOCUMENTS

CN    103278890 A    9/2013
CN    105339822 B    10/2017

(Continued)

OTHER PUBLICATIONS

JIS C5980 F11 Type connectors for optical fiber cables. Japanese industrial standard,_1998, total 8 pages.

*Primary Examiner* — Chris H Chu
(74) *Attorney, Agent, or Firm* — Slater Matsil, LLP

(57) ABSTRACT

This application provides a fiber connector plug assembly, a fiber connector assembly, and a communication device. The fiber connector assembly includes a connector main part and at least two kits, a front section of a ferrule in the connector main part is entirely located outside a main housing, and the at least two kits are capable of being detachably connected to the main housing to block the front section of the ferrule. The connector main part is selectively connected to one of the at least two kits to form a fiber connector plug, a slot is formed between the kit and the front section, and when the ferrule is inserted into a ferrule sleeve of a fiber adapter, an open end of the ferrule sleeve of the fiber adapter is located in the slot.

20 Claims, 51 Drawing Sheets

(56) References Cited

U.S. PATENT DOCUMENTS

| | | | |
|---|---|---|---|
| 7,744,286 B2 * | 6/2010 | Lu .................. | G02B 6/3877 |
| | | | 385/73 |
| 2001/0012428 A1 | 8/2001 | Nakajima et al. | |
| 2007/0201798 A1 * | 8/2007 | Kramer ............ | G02B 6/3825 |
| | | | 385/70 |
| 2011/0103748 A1 | 5/2011 | Ott | |
| 2016/0209599 A1 | 7/2016 | Van Baelen et al. | |
| 2021/0011235 A1 * | 1/2021 | Wimmer ............ | G02B 6/3831 |

FOREIGN PATENT DOCUMENTS

| | | | |
|---|---|---|---|
| CN | 110998397 A | 4/2020 | |
| CN | 112327424 A | 2/2021 | |
| JP | H06186456 A | 7/1994 | |
| JP | 2002174749 A | 6/2002 | |
| WO | 2020167779 A1 | 8/2020 | |

* cited by examiner

FIBER CONNECTOR PLUG ASSEMBLY, FIBER CONNECTOR ASSEMBLY, AND COMMUNICATION DEVICE

CROSS-REFERENCE TO RELATED APPLICATIONS

This application is a continuation of International Application No. PCT/CN2021/111912, filed on Aug. 10, 2021, which claims priority to Chinese Patent Application No. 202011183419.7, filed on Oct. 29, 2020. The disclosures of the aforementioned applications are hereby incorporated by reference in their entireties.

TECHNICAL FIELD

This application relates to the field of optical communication, and in particular, to a fiber connector plug, a fiber adapter, a connector assembly, and a communication device.

BACKGROUND

With development of communication technologies, fiber transmission is increasingly applied to communication systems. In a fiber to the home network, in a home access phase, a fiber led out from an office is connected to a drop fiber in a communication device (for example, a fiber box) through a fiber connector plug, so that an optical network is laid to each household. Specifically, the fiber connector plug is plugged in a fiber adapter of the communication device. With diversified designs of communication devices, different communication devices may have fiber adapters of different types. Therefore, each communication device needs to be equipped with a fiber connector plug of a fixed type. An existing fiber connector plug has poor compatibility, and can only adapt to a fiber adapter of a single type. For fiber adapters of different types, different fiber connector plugs need to be used, and a same fiber connector cannot be converted into plugs adapting to different fiber adapters.

SUMMARY

Embodiments of this application provide a fiber connector plug assembly, which can adapt to fiber connectors of different types, has possibility, and can avoid a waste of materials.

According to a first aspect, this application provides a fiber connector plug assembly, including a connector main part and at least two kits. The connector main part includes a ferrule and a main housing, where the ferrule includes a front section and a connection section, the connection section is at least partially located inside the main housing, the connection section is in positioning connection to the main housing, to radially fasten the ferrule and restrict the ferrule from axially moving out of the main housing, and the front section is entirely located outside the main housing. The at least two kits that are all in a sleeve shape can be detachably connected to the main housing to block the front section, which may be understood as that the kits can block the front section after being mounted to the main housing. The connector main part is selectively connected to one of the at least two kits to form a fiber connector plug. When one of the at least two kits is connected to the connector main part, a slot is formed between the kit and the front section; and when the ferrule is inserted into a ferrule sleeve of a fiber adapter, the ferrule sleeve extends into the slot and an open end of the ferrule sleeve is located in the slot, which may be understood as that a front-end of the ferrule sleeve is entirely inserted into the slot, and a radial size of the ferrule sleeve fits a radial size of the slot, that is, the radial sizes of the two may be equal or a size difference between the two is to meet a processing tolerance and an assembly gap, that is, the slot accommodates only the ferrule and does not accommodate other elements. Different kits and the connector main part are combined to form fiber connector plugs of different forms, to adapt to fiber adapters of different forms.

In this application, one connection main part and at least two kits are arranged, and the connector main part and different kits cooperate to form fiber connector plugs of different forms, so that fiber adapters of different forms can cooperate with. Therefore, a plug-in member in a fiber connector assembly provided in this application can be compatible with sockets of a plurality of different fiber adapters. As a core element of the fiber connector plug, the connector main part has reusability and universality, which can avoid a waste of materials, thereby reducing costs of using the fiber connector plug by a user.

In a possible implementation, the front section is made of a ceramic material, and the connection section is made of a non-ceramic material. Specifically, the front section is configured to closely cooperate with a ceramic ferrule in the ferrule sleeve in the fiber adapter, and the connection section is made of a metal material. In this implementation, the front section made of the ceramic material in the ferrule is limited to be exposed outside the main housing, and such a connector main part necessarily cooperate with a kit to form a fiber connector plug. When the connector main part is not used, that is, when the connector main part does not need to be connected to any kit, a protective structure similar to a dustproof cap or a traction cap or the like needs to be mounted at a front-end of the connector main part to protect the front section of the ferrule.

In this application, the connector main part is arranged as follows: the connector main part may be combined with different kits to form fiber connector plug assemblies of different forms. A part of the connector main part close to a front-end, namely, the front section of the ferrule, is in an exposed state, which may be understood as that a periphery of the front section of the ferrule has no kit or coating structure. In this way, the connector main part can more freely cooperate with kits of different forms, and can be assembled with a kit of a smaller size to form an integrated miniaturized fiber connector plug. Therefore, a combination manner of the fiber connector plug assembly provided in this application is more flexible. Assuming that a sleeve structure is fastened on the periphery of the front section of the ferrule in the connector main part, the sleeve structure makes it impossible to make a size of the fiber connector main part very small. Because a slot space is required between the sleeve structure and the ferrule, if such a connector assembly is combined with another kit, a fiber connector plug of a smaller size cannot be implemented.

Specifically, the connection section includes a middle section and a rear section. Both the front section and the rear section are of a centrosymmetric structure. The rear section is configured to fasten a fiber. The middle section includes a first limiting structure and a first stop structure, and the first limiting structure is located between the first stop structure and the front section in an axial direction. The first limiting structure is configured to limit the ferrule in a circumferential direction, that is, prevent the ferrule from rotating relative to the main housing. The first limiting structure includes a first plane, and the first plane may have a limiting function in the circumferential direction, provided that arrangement of the first plane enables the middle section to be of a non-rotary symmetric structure. The first stop structure is a columnar structure connected to the first limiting structure, the first stop structure includes a first limiting face, and the first limiting face faces a front-end face of the ferrule. In a process of manufacturing the ferrule, a piece is cut off from an outer surface of a cylindrical entity in a cutting manner, and the first plane and the first limiting face are simultaneously formed.

In a possible implementation, the at least two kits include an integrated kit, the integrated kit includes a front-end face and a rear end face, the ferrule includes a front-end face located at an end of the front section away from the connection section, and when the integrated kit is connected to the connector main part, the rear end face of the integrated kit is connected to the main housing, and the front-end face of the ferrule is flush with the front-end face of the integrated kit, or the front-end face of the ferrule is located between the front-end face of the integrated kit and the rear end face of the integrated kit in an axial direction. In this implementation, the front-end face of the integrated kit protects the front-end face of the ferrule, and can prevent the front-end face of the ferrule from being scratched. Specifically, the integrated kit can protect the front-end face of the ferrule in a process of turnover, transportation, and insertion into and removal from the fiber adapter. During subsequent connection to a ferrule of a peer connector plug, it is ensured that an optical signal can be stably and reliably transmitted between the two connector plugs.

When the integrated kit is connected to the connector main part, the slot that cooperates with the ferrule sleeve of the fiber adapter is formed between an inner side of the integrated kit and the ferrule. Specifically, the slot is configured to accommodate an end of the ferrule sleeve, and an end face of the ferrule sleeve needs to extend into the slot. In this way, the integrated kit has functions of protecting the front-end face of the ferrule and cooperating with the fiber adapter. No other element needs to be arranged at a periphery of the integrated kit, an outer surface of the integrated kit is also an outer surface of the entire fiber connector plug, and the integrated kit is a unique structural member arranged on the periphery of the front section of the ferrule. In this application, a protection feature (the front-end face of the integrated kit) and an insertion and removal cooperation feature (the slot formed between an inner surface of the integrated kit and the ferrule and the outer surface of the integrated kit are in contact cooperation with an inner surface of the fiber adapter) that are arranged on a periphery of the ferrule are centralized on the integrated kit. In this way, a radial size of the fiber connector plug can be small enough, and more fiber connection ports can be arranged in a limited space of the communication device.

In a possible implementation, the main housing of the connector main part includes a main shaft, and a sealing structure, a locking portion, and a sliding member that are arranged on an outer surface of the main shaft, and the ferrule is connected to a front-end of the main housing; the sliding member is slidably connected to the main housing between a first position and a second position; the locking portion is located between the sliding member and the ferrule in an axial direction of the main housing, and the sealing structure is located between the locking portion and the ferrule; and when the connector main part is connected to the integrated kit to form the fiber connector plug, the locking portion and the sliding member are configured to cooperate with a corresponding fiber adapter, when the sliding member is at the first position, the sliding member and the locking portion cooperate to jointly lock the fiber adapter, and when the sliding member is at the second position, unlocking between the fiber connector plug and the fiber adapter is implemented. In this implementation, an outdoor fiber connector plug is limited. A structure of the fiber connector plug is simplified through a fit between the sealing structure and a first locking structure. Only one sealing structure located between the first locking structure and the ferrule needs to be configured, to facilitate miniaturization of the structure of the fiber connector plug. In addition, the first locking structure cooperates with the fiber adapter in a direct insertion manner, so that the fiber connector plug can have a small operation space, thereby reducing space occupation of the fiber connector plug.

In a possible implementation, a locking groove is formed between the sliding member and the main housing, the locking groove is configured to fit an elastic arm of the fiber adapter, an opening of the locking groove is located between an end of the sliding member and the main housing, the sliding member includes a fitting surface formed on an inner wall of the locking groove, the fitting surface faces the main housing, the fitting surface includes a first region and a second region, the first region is located between the second region and the opening of the locking groove, and a vertical distance between the first region and the main housing is greater than a vertical distance between the second region and the main housing; when the sliding member is at the first position, the first region is arranged opposite to the locking portion, and the second region is arranged opposite to an outer surface of the main housing; and when the sliding member is at the second position, the fitting surface is arranged opposite to the outer surface of the main housing. In this implementation, the vertical distance between the first region and the main housing is set to be different from the vertical distance between the second region and the main housing, so that the fitting surface is designed to be similar to a two-step structure or a structure obliquely extending relative to an axial direction. In a state of a fit between the fitting surface and a second locking portion, the fitting surface presses an elastic arm of the second locking structure into the locking groove. Both the first region and the second region exert pressure on the elastic arm, and the first region and the second region form a two-step architecture or an architecture obliquely extending in a radial direction. This not only helps increase a contact area between the fitting surface and the elastic arm, but also implements a function of radially pressing the elastic arm. Clamping force and locking force on the elastic arm can ensure that the elastic arm is stably locked in the locking groove and is not easy to be pulled out.

In a possible implementation, an axial extension size of the fitting surface is a first size, and an axial extension size of the first region is a second size. Apparently, the second size is less than the first size, and the second size may be even less than half of the first size. In a locked state, a mutual pressing region between the fitting surface and the elastic arm may be a region in which the entire fitting surface is located. However, in an unlocking process, only the first region needs to be moved to a position in which the second region in the locked state is located, and the second region is synchronously moved out of the elastic arm. In this case, both the first region and the second region detach from the elastic arm, and the elastic arm is not pressed, so that unlocking is implemented. It can be learned that, during moving in the unlocking process, the sliding member needs to travel only a distance of the second size, and does not need to travel a distance of the first size. Therefore, this implementation has advantages of stable locking and easy unlocking.

In a possible implementation, when the sliding member is at the first position, the first region is arranged opposite to the locking portion, and the second region is arranged opposite to the outer surface of the main housing; and when the sliding member is at the second position, the fitting surface is arranged opposite to the outer surface of the main housing. In this application, corresponding position relationships between the sliding member and the main housing when the sliding member is at the first position and the second position are limited, so that accurate positioning of the sliding member on the main housing can be ensured and efficiency of locking and unlocking can be improved.

In a possible implementation, the fitting surface is in a stepped shape, and an extension direction of the first region in a direction from a front-end face to a rear end face of the sliding member is parallel to a central axis of the sliding member.

In a possible implementation, the fitting surface is in a bevel shape, and an included angle is formed between an extension direction of the first region in a direction from a front-end face to a rear end face of the sliding member and a central axis of the sliding member.

In a possible implementation, the at least two kits further include an assembly kit, and a radial size of an outer surface of the assembly kit is greater than a radial size of the outer surface of the integrated kit. In this implementation, the connector main part may be connected to the integrated kit, or may be connected to the assembly kit, to form fiber connector plugs of different radial sizes, and adapt to fiber adapters of different sizes, thereby achieving better universality.

In a possible implementation, the assembly kit includes an intermediate member and a plug-in member that are both in a sleeve shape; and when the assembly kit is connected to the connector main part, the intermediate member surrounds the front section, when the assembly kit is connected to the connector main part, the slot is formed between the intermediate member and the front section, the plug-in member is sleeved on a periphery of the intermediate member, and the plug-in member is configured to cooperate with the fiber adapter, to connect the fiber connector plug assembly to the fiber adapter. In this implementation, the intermediate member of the assembly kit cooperates with the connector main part, and the intermediate member is configured to form the slot between the intermediate member and the ferrule, to cooperate with the ferrule sleeve of the fiber adapter. The plug-in member is connected to the connector main part, and the plug-in member is configured to cooperate with a connection structure of the fiber adapter, to implement plugging-in and locking between the fiber connector plug and the fiber adapter. The plug-in member may be integrated with a guide structure and a locking structure, and the plug-in member may further have a functional structure for protecting the front-end face of the ferrule.

In a possible implementation, there are at least two assembly kits, forms of intermediate members of different assembly kits may be the same or may be different, and forms of plug-in members of different assembly kits are different. The intermediate member may be used as a common standard member between different assembly kits, which may be understood as that the intermediate members of different assembly kits may be the same. When different assembly kits are replaced, only the plug-in members need to be replaced. Different assembly kits may use a same intermediate member.

In a possible implementation, the plug-in member includes an outer sleeve and a guide sleeve, the outer sleeve is connected to a periphery of the guide sleeve and surrounds the guide sleeve, the guide sleeve is sleeved on the periphery of the intermediate member, and the guide sleeve cooperates with the sliding member on the connector main part, to connect the plug-in member to the connector main part. The plug-in member in this implementation is formed by two tubular structures. The guide sleeve is configured to guide and protect the ferrule. The outer sleeve is connected to the fiber adapter to implement locking. The outer sleeve may be sleeved on a periphery of the fiber adapter and cooperate with a related structure on the periphery of the fiber adapter.

In a possible implementation, the guide sleeve includes a limiting convex ring and a limiting section, the limiting convex ring is located at an end of the limiting section, the limiting section includes a first elastic arm and a second elastic arm that extend axially and that are arranged at intervals in a circumferential direction, the first elastic arm is provided with a clamping hook structure that protrudes radially and outwardly, the second elastic arm is provided with a clamping portion that protrudes radially and inwardly, the clamping hook structure and the limiting convex ring jointly function to fasten the plug-in member, and the clamping portion is configured to cooperate with the locking groove of the sliding member and the fitting surface, to connect the plug-in member to the connector main part. In this implementation, the guide sleeve cooperates with the sliding member on the connector main part, to implement fastening between the guide sleeve and the connector main part. It can be learned that the sliding member on the connector main body in this application has multifunctionality. When the connector main part is in a state of cooperating with the integrated kit, the sliding member is configured to cooperate with the fiber adapter to implement locking. When the connector main part is in a state of cooperating with the assembly kit in this implementation, the sliding member may cooperate with the guide sleeve to lock the guide sleeve. It can be learned that the connector main part provided in this application has universality.

In a possible implementation, the plug-in member is of an integrated tubular structure, the plug-in member is slidably connected to the intermediate member and surrounds the intermediate member, the plug-in member is provided with a hollow region, an outer surface of the intermediate member is provided with a clamping portion, the clamping portion is correspondingly arranged in the hollow region, the clamping portion is configured to cooperate with a clamping hook of the fiber adapter to implement a locked state, and through axial sliding of the plug-in member relative to the intermediate member, the clamping portion is driven to detach from the clamping hook of the fiber adapter to implement unlocking. The plug-in member provided in this implementation is of the integrated structure. The fiber adapter cooperates with the clamping portion on the intermediate member to perform locking between the fiber connector plug assembly and the fiber adapter, and unlocking is implemented by sliding the plug-in member. This implementation has an advantage of a simple structure, and can implement a miniaturization design of the fiber connector plug assembly.

In a possible implementation, the plug-in member is of an integrated tubular structure, the plug-in member is fastened to the connector main part, the plug-in member encloses a part of the intermediate member, a remaining part of the intermediate member is located outside the plug-in member, and the plug-in member includes an external thread for connecting to the fiber adapter. Specifically, a guide structure is arranged on a part of the intermediate member located outside the plug-in member, to guide a process of insertion between the plug-in member and the fiber adapter. A sealing structure is arranged on an outer surface of a part of the intermediate member located outside the plug-in member, and a sealing connection between the intermediate member and the fiber adapter is implemented by using the sealing structure. A sealing structure is easily arranged between the intermediate member and the connector main part.

In a possible implementation, the fiber connector assembly further includes a traction cap, and the traction cap is configured to cover a periphery of the integrated kit and is fastened to the main housing. The traction cap is fastened to the main housing in a threaded connection manner. An inner surface of the traction cap is in contact with the outer surface of the integrated kit, and is also in contact with an outer surface of a part of the main housing. A sealing structure is arranged between the traction cap and the main housing. Connection strength between the traction cap and the main housing is greater than connection strength between the integrated kit and the main housing. Therefore, in this application, the traction cap is connected to the main housing, so that the fiber connector plug can be pulled and protected in a scenario in which the fiber connector plug is threaded. In this application, the traction cap may also be directly assembled to the connector main part, that is, the traction cap is directly mounted when the connector main part is not assembled with the integrated kit. After the connector main part is threaded through the traction cap, the traction cap is removed, and then the integrated kit is mounted to the connector main part.

In a possible implementation, the integrated kit is provided with a hole, the main housing is provided with an elastic clamping hook, the elastic clamping hook cooperates with the clamping hole to implement a locked state between the integrated kit and the main housing, an avoidance space is provided on a side of the elastic clamping hook away from the integrated kit, and when the integrated kit is subjected to force, the elastic clamping hook is capable of moving into the avoidance space, so that a buckle detaches from the hole, to implement unlocking between the integrated kit and the main housing. A detachable connection structure between the integrated kit provided in this implementation and the main housing is also applicable to a detachable connection structure between the intermediate member of the assembly kit and the main housing.

In a possible implementation, the intermediate member of the assembly kit is provided with a hole, the main housing is provided with an elastic clamping hook, the elastic clamping hook cooperates with the hole to implement a locked state between the intermediate member and the main housing, an avoidance space is provided on a side of the elastic clamping hook away from the intermediate member, and when the intermediate member is subjected to force, the elastic clamping hook is capable of moving into the avoidance space, so that a buckle detaches from the hole, to implement unlocking between the intermediate member and the main housing. In a possible implementation, the integrated kit includes a main body and an elastic arm, the elastic arm includes a first end and a second end that are opposite to each other, the first end is connected to the main body, a clamping hook is arranged on the second end, the elastic arm further includes a first side edge and a second side edge that are connected between the first end and the second end, a gap is provided between the first side edge and the main body, a gap is also provided between the second side edge and the main body, the main housing is provided with a lock hole or a lock slot, the clamping hook cooperates with the lock hole or the lock slot to implement a locked state between the integrated kit and the main housing, and when the elastic arm is opened by external force, the clamping hook detaches from the lock hole or the lock slot, to implement unlocking between the integrated kit and the main housing. A detachable connection structure between the integrated kit provided in this implementation and the main housing is also applicable to a detachable connection structure between the intermediate member of the assembly kit and the main housing.

In a possible implementation, the intermediate member of the assembly kit includes a main body and an elastic arm, the elastic arm includes a first end and a second end that are opposite to each other, the first end is connected to the main body, a clamping hook is arranged on the second end, the elastic arm further includes a first side edge and a second side edge that are connected between the first end and the second end, a gap is provided between the first side edge and the main body, a gap is also provided between the second side edge and the main body, the main housing is provided with a lock hole or a lock slot, the clamping hook cooperates with the lock hole or the lock slot to implement a locked state between the intermediate member and the main housing, and when the elastic arm is opened by external force, the clamping hook detaches from the lock hole or the lock slot, to implement unlocking between the intermediate member and the main housing.

In a possible implementation, the at least two kits include at least two assembly kits, and each assembly kit includes an intermediate member and a plug-in member that are both in a sleeve shape; and when the assembly kit is connected to the connector main part, the intermediate member is sleeved on a periphery of the front section of the ferrule and the intermediate member is detachably connected to the main housing, the plug-in member is sleeved on a periphery of the intermediate member, the plug-in member is fastened to the intermediate member or the main housing, the plug-in member is configured to be connected to the fiber adapter, forms of intermediate members of different assembly kits are the same, and forms of plug-in members of different assembly kits are different. In this implementation, the fiber connector plug assembly may include only the connector main part and at least two assembly kits, that is, does not include an integrated kit, and is formed by combining the connector main part and the at least two assembly kits.

In a possible implementation, the kits provided in this application do not include an integrated kit, and include at least two assembly kits. A configuration of the assembly kit is the same as a structure of the assembly kit summarized in the foregoing possible implementations, and the assembly kit may cooperate with the connector main part to form the fiber connector plug assembly.

According to a second aspect, this application provides a fiber connector assembly, including at least two fiber adapters and the fiber connector assembly according to any one of the possible implementations of the first aspect. Structures of the at least two fiber adapters are different, and at least two kits are configured for one-to-one plug-in cooperation with the at least two fiber adapters.

According to a third aspect, this application provides a communication device, including the fiber connector assembly according to the second aspect.

DETAILED DESCRIPTION OF ILLUSTRATIVE EMBODIMENTS

For ease of understanding, the following explains and describes related technical terms used in the embodiments of this application.

Axial direction: The axial direction may be understood as an axial direction of a fiber connector plug, and is equivalent to an extension direction of a fiber and a ferrule, that is, a direction in which a tail end of the fiber extends to a front-end of the fiber and then continues to extend to a front-end of the ferrule, and is equivalent to an axial direction of a housing assembly that is over a periphery of the fiber and that is in the fiber connector plug.

Radial direction: The radial direction is a direction perpendicular to the axial direction.

Sleeve-shaped: It means sleeving over an outer surface of an elongated object for a purpose of protection, reinforcing and fixing, or connection. A sleeve-shaped element includes a cylindrical (or tubular) housing, there is a hollow space in the housing, and openings are provided at both end faces of the cylindrical (or tubular) housing. The elongated object may pass through the sleeve-shaped element via the two openings. For example, the fiber extends into the housing assembly from an opening at one end of the housing assembly and can extend out of the housing assembly from an opening at the other end of the housing assembly. The end face of the sleeve-shaped element includes an inner edge and an outer edge. An inner surface of the sleeve-shaped element is connected between inner edges of the two end faces and faces the hollow space inside the sleeve-shaped element. An outer surface of the sleeve-shaped element is connected between outer edges of the two end faces and faces an external space of the sleeve-shaped element. An axial direction of the sleeve-shaped element is a direction extending from one end face to the other end face. A radial direction of the sleeve-shaped element is a direction extending perpendicularly from the inner surface to the outer surface, and may be understood as being perpendicular to the axial direction of the sleeve-shaped element. An outer contour of a cross section of the sleeve-shaped element may be a circle, a polygon, a triangle, or another regular or irregular shape. This is not limited in this application.

The following describes embodiments of this application with reference to the accompanying drawings in embodiments of this application.

Figure 1:
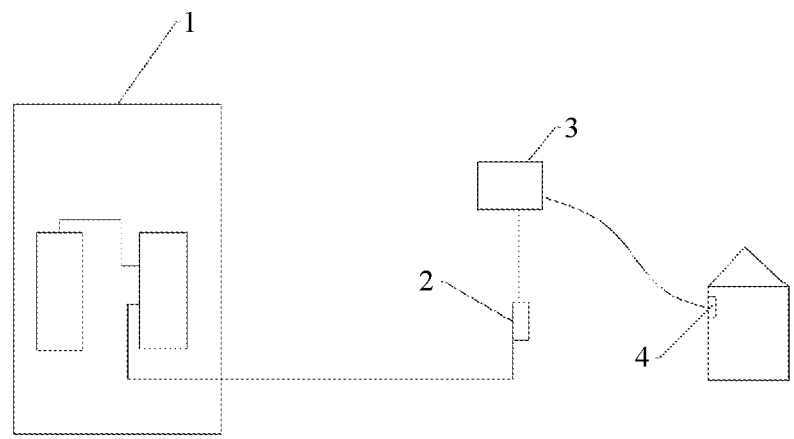
FIG. 1 is a schematic view of a specific application scenario of a fiber connector plug assembly according to this application, and specifically, a schematic view of an FTTH network.

A fiber connector plug assembly and a communication device that are provided in this application are applied to an FTTx system. The FTTx system may be but is not limited to FTTH (fiber to the home), FFTC (fiber to the curb), FTTP (fiber to the premises), FTTN (fiber to the node or neighborhood), FTTO (fiber to the office), or FTTSA (fiber to the service area). Embodiments of this application are described by using an example in which the communication device is applied to a FTTH system. FIG. 1 is a schematic view of an FTTH network. Refer to FIG. 1. A connectorized fiber distribution point (CFDP) 2 and a fiber distribution box 3 are arranged between a central office (CO) 1 and a customer terminal box (CSP) 4. A communication device in the central office 1 is connected to the connectorized fiber distribution point 2 through an optical cable, to distribute a signal to the connectorized fiber distribution point 2. The connectorized fiber distribution point 2 transmits the signal to the fiber distribution box 3 through the optical cable, and then the fiber distribution box 3 outputs the signal (transmits the signal through an optical cable) to the customer terminal box 4.

The communication device provided in this application may be but is not limited to a fiber access terminal (FAT) or a splitting and splicing closure (SSC).

Figure 2:
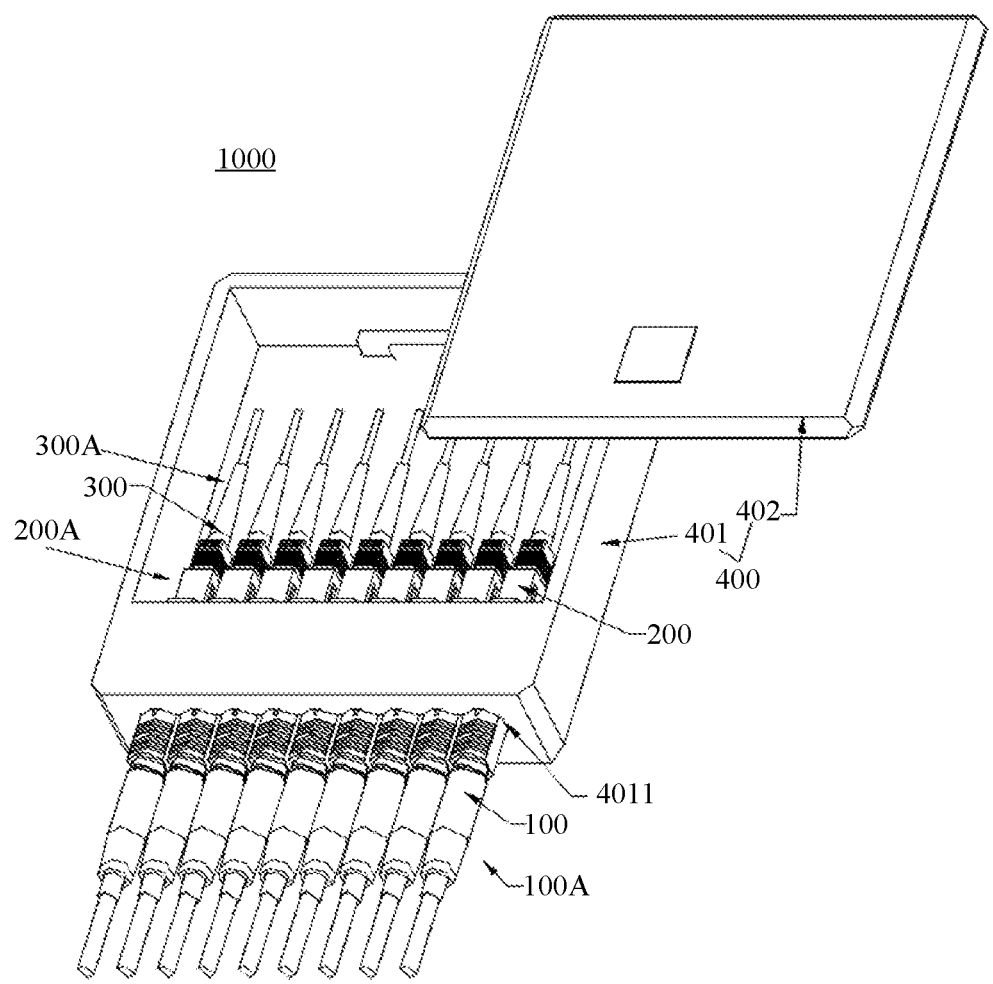
FIG. 2 is a schematic view of a specific implementation of a communication device in which a fiber connector plug assembly is located according to this application.

FIG. 2 is a schematic view of a communication device 1000 according to an implementation. The communication device 1000 includes a housing 400, an adapter assembly 200A, an indoor connector assembly 300A, and an outdoor connector assembly 100A. The adapter assembly 200A is fastened to the housing 400. The indoor connector assembly 300A is accommodated inside the housing 400. The outdoor connector assembly 100A is located outside the housing 400. The outdoor connector assembly 100A and the indoor connector assembly 300A can be connected to the adapter assembly 200A to implement insertion and further implement optical signal transmission.

It should be understood that a difference between the indoor connector assembly 300A and the outdoor connector assembly 100A lies in different application scenarios. The indoor connector assembly 300A may be understood as being located in a relatively closed space inside the housing 400, and can be effectively isolated from external dust, water vapor, and the like. The outdoor connector assembly 100A may be understood as being located in a relatively open space outside the housing 400, and needs to have better environment adaptability to adapt to a complex and changing external environment.

Specifically, the housing 400 includes a box body 401 and a top cover 402 that covers the box body 401. The box body 401 is arranged with a plurality of sockets 4011 that are arranged side by side. The sockets 4011 may be arranged in one row or a plurality of rows. The adapter assembly 200A includes a plurality of fiber adapters 200. A quantity of fiber adapters 200 is equal to or less than a quantity of sockets 4011 (a case in which the quantity of fiber adapters 200 is less than the quantity of sockets 4011 means that a part of the sockets can be reserved for other purposes). In another implementation, the sockets 4011 may alternatively be arranged on the top cover 402. Each fiber adapter 200 can be correspondingly arranged at a position of a corresponding socket 4011.

The indoor connector assembly 300A includes a plurality of indoor fiber connector plugs 300, and the plurality of indoor fiber connector plugs 300 are all accommodated in the housing 400. In addition, a quantity of indoor fiber connector plugs 300 is the same as the quantity of fiber adapters 200, or may be less than the quantity of fiber adapters 200, so that each indoor fiber connector plug 300 can be inserted into a corresponding fiber adapter 200.

The outdoor connector assembly 100A includes a plurality of outdoor fiber connector plugs 100. A quantity of outdoor fiber connector plugs 100 may be the same as the quantity of fiber adapters 200, or may be less than the quantity of fiber adapters 200. Each outdoor connector plug 100 may be inserted into a corresponding fiber adapter 200 from the outside of the housing 400.

It may be understood that an opening adapted to the indoor fiber connector plug 300 and an opening adapted to the outdoor fiber connector plug 100 are arranged at two ends of the fiber adapter 200. The indoor fiber connector plug 300 and the outdoor fiber connector plug 100 are plugged in the two openings of the fiber adapter 200. In this way, ferrules of the indoor fiber connector plug 300 and the outdoor fiber connector plug 100 are connected in the fiber adapter 200, that is, connection between two fibers that need to be connected is implemented, and an optical signal output by a transmit fiber can be coupled to a receive fiber to a maximum extent.

Therefore, each indoor fiber connector plug 300 can be plugged in the corresponding fiber adapter 200 from the inside of the housing 400, and each outdoor fiber connector plug 100 can be plugged in the corresponding fiber adapter 200 from the outside of the housing 400, so that each indoor fiber connector plug 300 can be inserted into the corresponding outdoor fiber connector plug 100, to implement link transmission of one optical signal.

The fiber connector plug assembly provided in this application may include the outdoor fiber connector plug 100 in the communication device 1000 in the implementation shown in FIG. 2, or may include the indoor fiber connector plug 300 in the communication device 1000 in the implementation shown in FIG. 2. The following describes in detail a specific architecture of the connector assembly provided in this application by using a specific implementation of the outdoor connector plug.

The fiber connector plug assembly provided in this application includes a connector main part and at least two kits. Any one of the at least two kits may be combined with the connector main part to form a fiber connector plug. Different kits and the connector main part may form different fiber connector plugs, and different fiber connector plugs are configured to cooperate with fiber adapters of different models. The fiber connector plug assembly provided in this application and at least two fiber adapters form a fiber connector assembly. The fiber connector assembly may be applied to a communication device, which may be understood as that a communication device may include at least two fiber adapters of different structural forms. Certainly, the fiber connector plug assembly may also be independently applied to a communication device. It may be understood that fiber adapters in the communication device is of a model, that is, of a structural form. A fiber connector plug formed by the connector main part and one of the kits in the fiber connector plug assembly provided in this application may be applied to the communication device, and a fiber connector plug formed by combining the connector main part and another of the kits may be applied to another communication device. In this way, the fiber connector plug assembly provided in this application may be commonly used for the communication device and another communication device.

Figure 3:
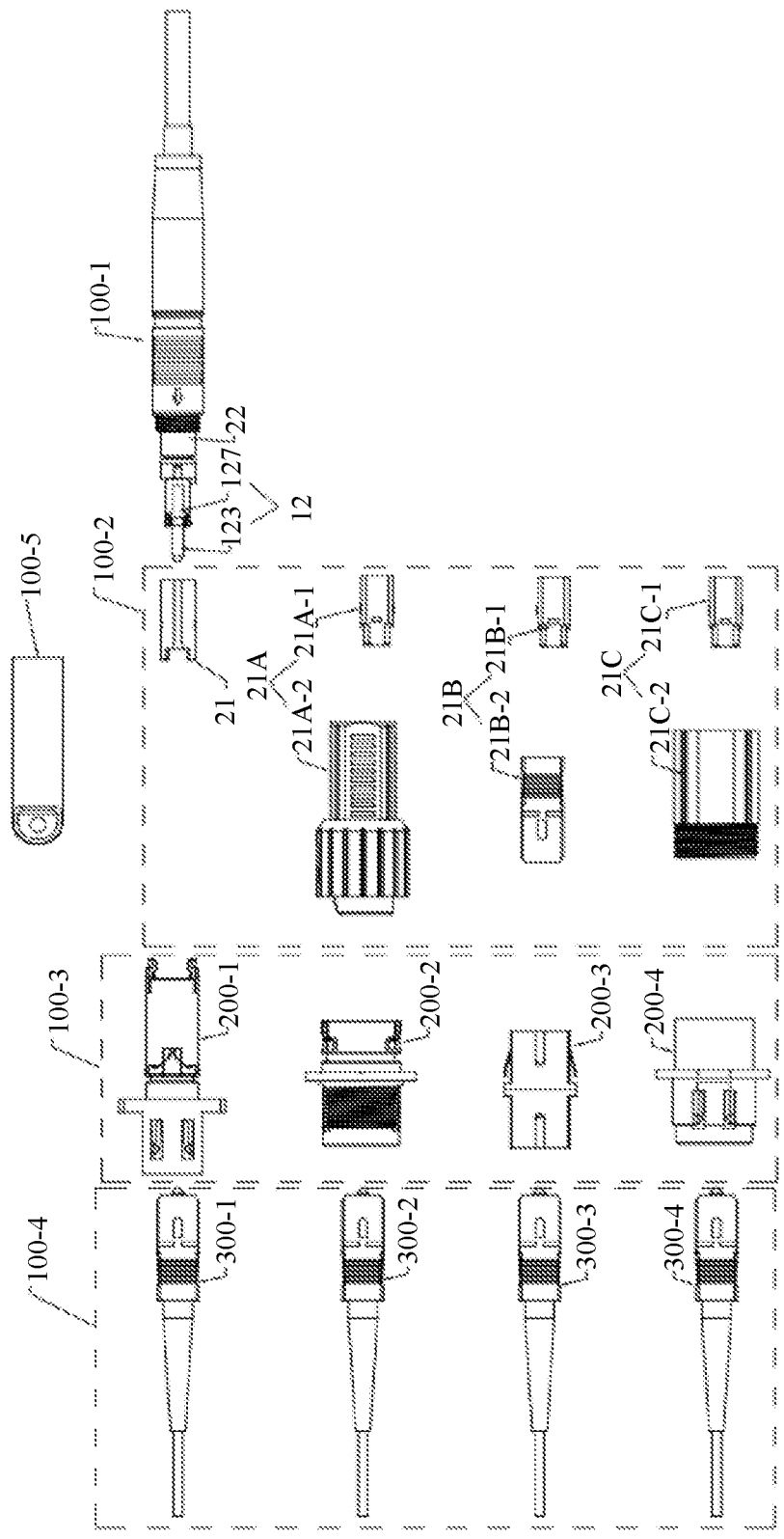
FIG. 3 is a schematic view in which a fiber connector plug assembly is combined with fiber adapters of different models according to an implementation of this application.

Refer to FIG. 3. FIG. 3 schematically describes a design idea of this application, that is, one connector main part may cooperate with different kits, to form fiber connector plugs of different forms, to cooperate with different fiber adapters. As shown in FIG. 3, a connector main part 100-1 is at a rightmost side, a kit 100-2 and a traction cap 100-5 are arranged at a left side of the connector main part 100-1, the kit 100-2 includes four kits of different forms (where a quantity of the kits is not limited to four, and may also be two, three, or more), an adapter group 100-3 is at a left side of the kit 100-2, and the adapter group 100-3 includes four fiber adapters of different forms (where a quantity of the fiber adapters is similarly not limited to four, and may also be two, three, or more). A peer fiber connector plug group 100-4 is at a left side of the adapter group 100-3, the peer fiber connector plug group 100-4 includes four peer fiber connector plugs, and structures of the four peer fiber connector plugs may be the same or may be different. A peer fiber connector plug for cooperation is selected based on a structure of a fiber adapter.

The connector main part 100-1 includes a ferrule 12 and a main housing 22, and the ferrule 12 includes a front section 123 and a connection section 127. The connection section 127 is at least partially located inside the main housing 22. Certainly, the connection section 127 may also be entirely located inside the main housing 22. The connection section 127 is in positioning connection to the main housing 22, to radially fasten the ferrule 12 and restrict the ferrule 12 from axially moving out of the main housing 22, and the front section 123 is entirely located outside the main housing 22. The front section 123 is made of a ceramic material, and the connection section 127 is made of a non-ceramic material. For example, the connection section 127 is made of a metal.

In an implementation shown in FIG. 3, the kit 100-2 includes one integrated kit 21 and three assembly kits 21A, 21B, and 21C. The adapter group 100-3 includes four fiber adapters 200-1, 200-2, 200-3, and 200-4. The peer fiber connector plug group 100-4 includes four peer fiber connector plugs 300-1, 300-2, 300-3, and 300-4.

The integrated kit 21 is of an integrated structure, and the integrated kit 21 is detachably connected to the main housing 22 of the connector main part 100-1, to block the front section 123 of the ferrule 12. After the integrated kit 21 is connected to the connector main part 100-1, a fiber connector plug is formed, and is connected to the fiber adapter 200-1 through the integrated kit 21.

Each of the assembly kits 21A, 21B, and 21C is of a split structure and includes an intermediate member and a plug-in member. For example, the assembly kit 21A includes an intermediate member 21A-1 and a plug-in member 21A-2, the assembly kit 21B includes an intermediate member 21B-1 and a plug-in member 21B-2, and the assembly kit 21C includes an intermediate member 21C-1 and a plug-in member 21C-2. The intermediate members 21A-1, 21B-1, and 21C-1 can be detachably connected to the main housing 22 of the connector main part 100-1 and surround a periphery of the front section 123 of the ferrule 12. The plug-in members 21A-2, 21B-2, and 21C-2 are configured to be sleeved on peripheries of the corresponding intermediate members 21A-1, 21B-1, and 21C-1, and are configured to be connected to the corresponding fiber adapters 200-2, 200-3, and 200-4. In the assembly kits 21A, 21B, and 21C, forms of the intermediate members 21A-1, 21B-1, and 21C-1 may be the same, and forms of the plug-in members 21A-2, 21B-2, and 21C-2 are different. The plug-in members 21A-2, 21B-2, and 21C-2 of different forms and the connector main part 100-1 form fiber connector plugs of different forms, to cooperate with the fiber adapters 200-2, 200-3, and 200-4 of different forms. Radial sizes of outer surfaces of the assembly kits 21A, 21B, and 21C are greater than a radial size of an outer surface of the integrated kit 21. The integrated kit 21 has a small size, and the integrated kit 21 is integrated with functions of the intermediate members 21A-1, 21B-1, and 21C-1 and the plug-in members 21A-2, 21B-2, and 21C-2 of the assembly kits 21A, 21B, and 21C, so that a miniaturized fiber connector plug can be provided, to adapt to the fiber adapter 200-1 with a small size.

The implementation shown in FIG. 3 may form four connection solutions, which are specifically as follows.

First solution: The connector main part 100-1 and the integrated kit 21 are assembled into a fiber connector plug to cooperate with the fiber adapter 200-1, and the peer fiber connector plug 300-1 cooperates with the fiber adapter 200-1.

Second solution: The connector main part 100-1 and the assembly kit 21A are assembled into a fiber connector plug to cooperate with the fiber adapter 200-2, and the peer fiber connector plug 300-2 cooperates with the fiber adapter 200-2.

Third solution: The connector main part 100-1 and the assembly kit 21B are assembled into a fiber connector plug to cooperate with the fiber adapter 200-3, and the peer fiber connector plug 300-3 cooperates with the fiber adapter 200-3.

Fourth solution: The connector main part 100-1 and the assembly kit 21C are assembled into a fiber connector plug to cooperate with the fiber adapter 200-4, and the peer fiber connector plug 300-4 cooperates with the fiber adapter 200-4.

The following separately describes specific implementations of the foregoing four solutions.

In the first solution, a specific implementation of the fiber connector plug formed by the integrated kit 21 and the connector main part 100-1 is described in detail as follows.

Figure 4:
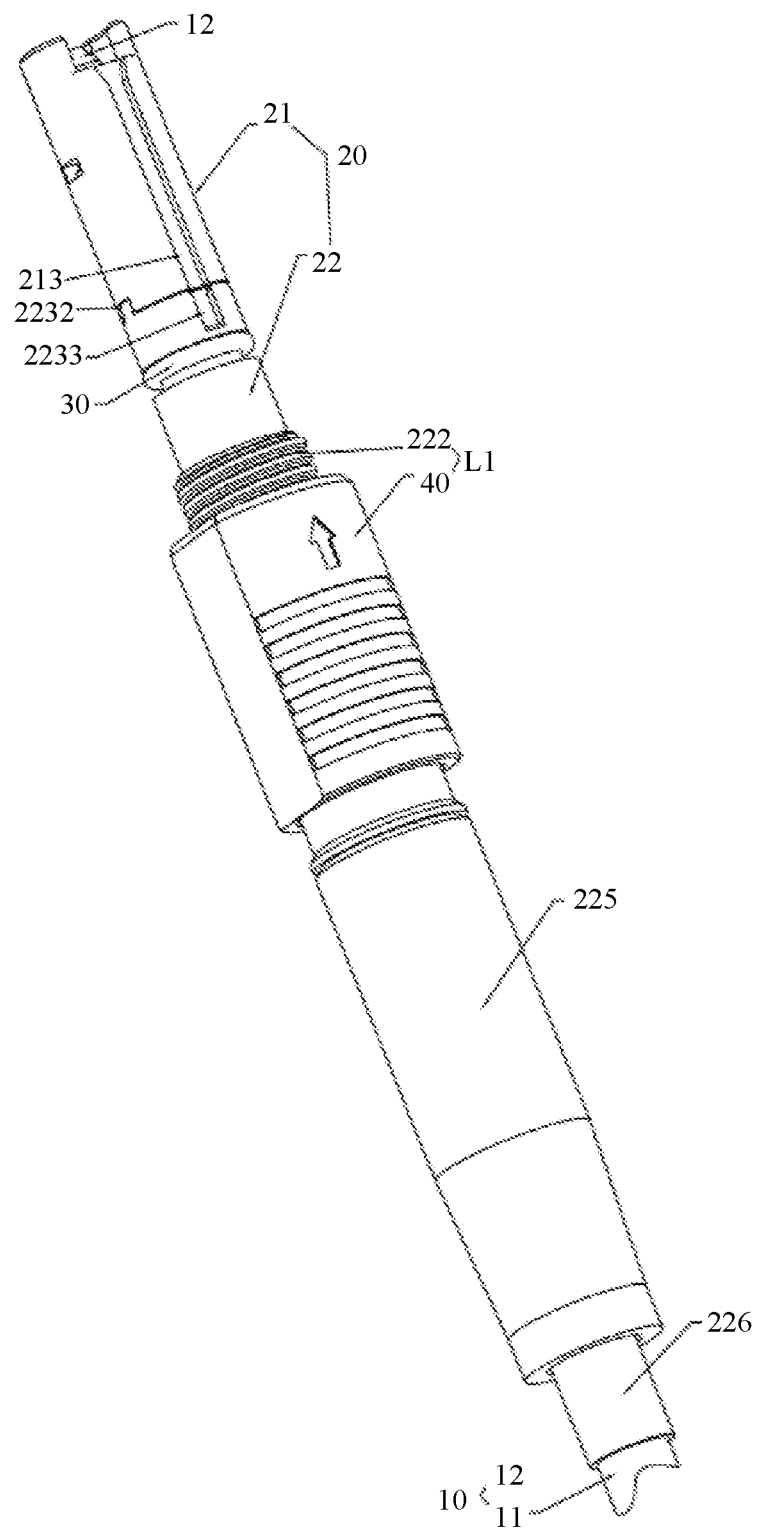
FIG. 4 is a schematic three-dimensional view of a fiber connector plug formed by combining a connector main part and an integrated kit in a fiber connector plug assembly according to an implementation of a first solution.
Figure 5:
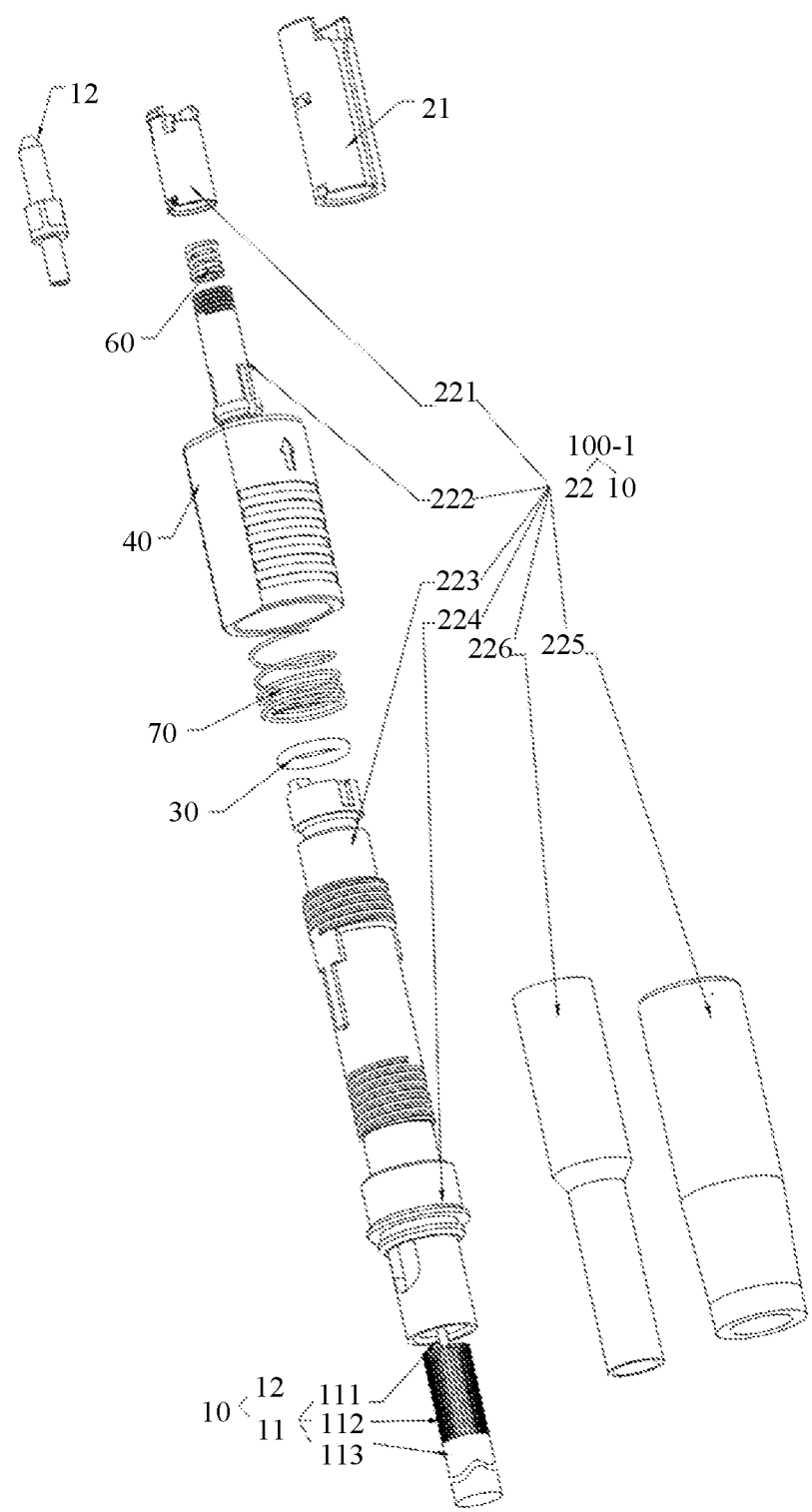
FIG. 5 is a schematic three-dimensional exploded view of the fiber connector plug assembly shown in FIG. 4.
Figure 6:
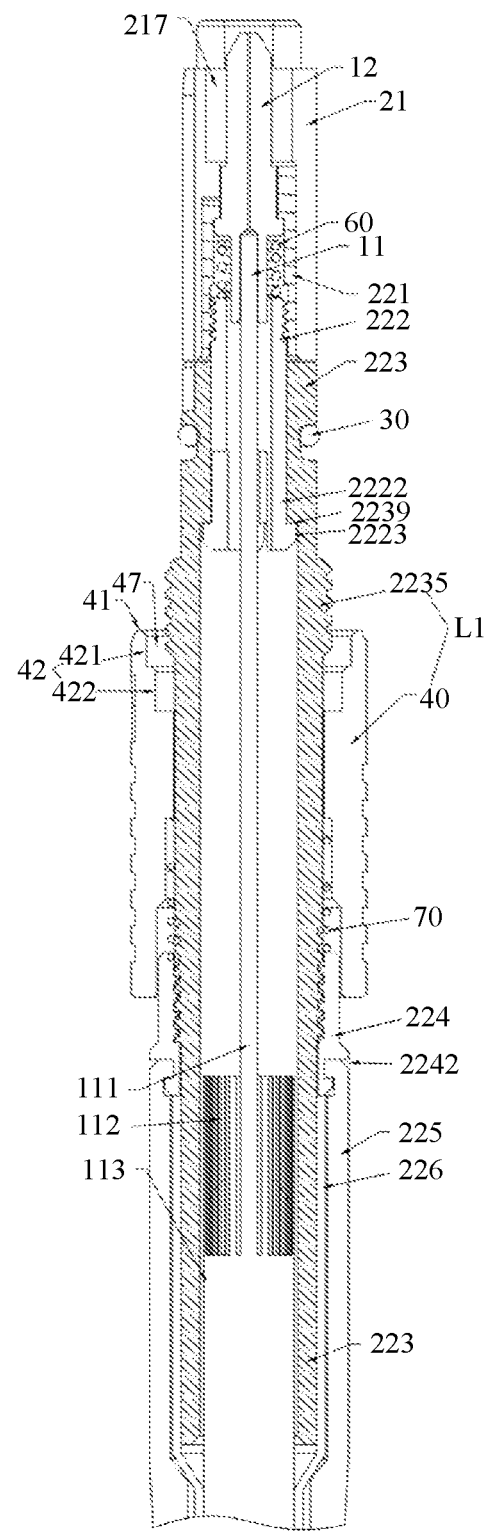
FIG. 6 is a sectional view of the fiber connector plug assembly shown in FIG. 4.
Figure 7:
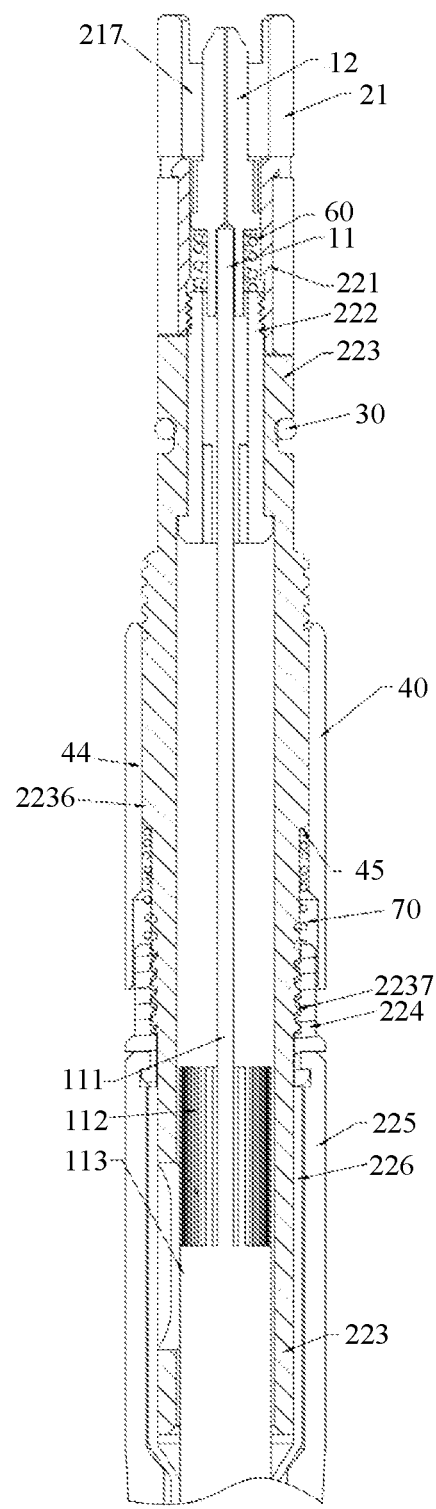
FIG. 7 is a sectional view of the fiber connector plug assembly shown in FIG. 4 in another direction.

Refer to FIG. 4, FIG. 5, FIG. 6, and FIG. 7. FIG. 4 is a schematic three-dimensional assembly view of a fiber connector plug formed by an integrated kit 21 and a connector main part 100-1, FIG. 5 is a schematic three-dimensional exploded view of the fiber connector plug shown in FIG. 4, and FIG. 6 and FIG. 7 are sectional views of the fiber connector plug in different directions. In this implementation, the fiber connector plug includes a transmission member 10, a housing assembly 20, a sealing structure 30, a sliding member 40, a first elastic member 60, and a second elastic member 70. The housing assembly 20 is sleeved on a periphery of the transmission member 10, is configured to protect the transmission member 10, and is configured to insert and remove the fiber connector plug. The sliding member 40 is slidably connected to an outer surface of the housing assembly 20, and is configured to implement locking and unlocking between the fiber connector plug and the corresponding fiber adapter. The sealing structure 30 is arranged on the outer surface of the housing assembly 20, and is located on a front-end of the sliding member 40 in an axial direction. The sealing structure 30 is configured to be sealingly connected to an inner surface of the fiber adapter. For the fiber connector plug, a front-end is an end plugged in the fiber adapter (which may be understood as an end at which a ferrule is located), and a tail end or a rear end is an end away from the ferrule.

Refer to FIG. 5, FIG. 6, and FIG. 7. The transmission member 10 includes a fiber 11 and a ferrule 12, and the ferrule 12 is connected to a front-end of the fiber 11. The housing assembly 20 includes a front frame sleeve 21 (where the front frame sleeve is the integrated kit 21 shown in FIG. 3, and for ease of description, an integrated kit is uniformly referred to as a front frame sleeve in this implementation) and a main housing 22. As shown in FIG. 6, the main housing 22 and the transmission member 10 jointly form a connector main part 100-1 (that is, the main housing 22 and the transmission member 10 in FIG. 6 are assembled as the connector main part 100-1 shown in FIG. 3). The front frame sleeve 21 is of a sleeve-shaped structure, and surrounds the ferrule 12, that is, is sleeved on a periphery of the ferrule 12. Certainly, an internal space of the front frame sleeve 21 may also accommodate a part of the fiber 11. The front frame sleeve 21 is configured to protect the ferrule 12 and is configured to perform plug-in cooperation with a fiber adapter (that is, the fiber adapter 200-1 shown in FIG. 3). The main housing 22 includes a mounting member 221, a fastener 222, a main shaft 223, a fastening base 224, a tail sleeve 225, and a heat shrink tube 226. The main housing 22 is in a sleeve shape as a whole, and is configured to accommodate the fiber 11. All components in the main housing 22 are also in a sleeve shape. In this implementation, the main housing 22 is formed by assembling and connecting six elements, and all the elements are fastened. Therefore, some elements may be of an integrated structure, for example, the fastener 222 may be integrally formed on a front-end face of the main shaft 223. Therefore, the fastener 222 may be considered as a part of the main shaft 223.

Refer to FIG. 5, FIG. 6, and FIG. 7. The fiber 11 includes a fiber core 111, a reinforced layer 112 wrapped on a periphery of the fiber core 111, and an outer layer 113 wrapped on a periphery of the reinforced layer 112. A part of the fiber core 111 extends out of the reinforced layer 112 and is fastened to the ferrule 12. A part of the reinforced layer 112 of the fiber is not wrapped by the outer layer. A part of the outer layer is also located inside the housing assembly 20. The reinforced layer 112 may be made of a metal or non-metal material. The metal material of the reinforced layer 112 may be a steel wire. The non-metal material of the reinforced layer 112 may be an FRP (fiber reinforced composite material). The reinforced layer 112 is mainly used to enhance tensile strength and balance of the fiber. An outer surface of the reinforced layer 112 is not as smooth as an outer surface of the outer layer. The outer surface of the reinforced layer 112 may have a concave-convex structure, similar to a tooth-shaped structure. A purpose of exposing the reinforced layer 112 (that is, being not wrapped by the outer layer) is to fasten the reinforced layer 112 to the housing assembly 20. The fiber core 11 of the fiber 11 is fastened to the ferrule 12 by using curing glue. The following describes a structure of the ferrule 12 in detail.

Figure 8:
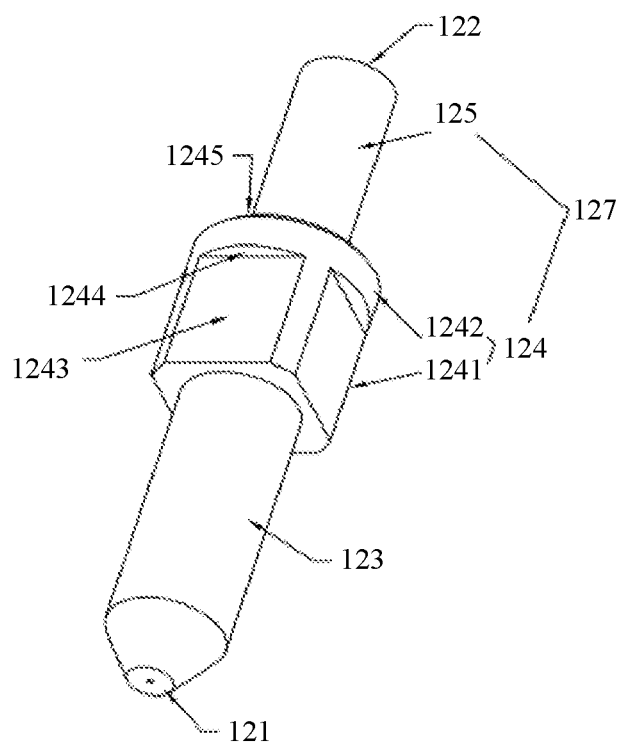
FIG. 8 is a schematic three-dimensional view of a ferrule in a connector main part in a fiber connector plug assembly according to an implementation of a first solution.
Figure 9:
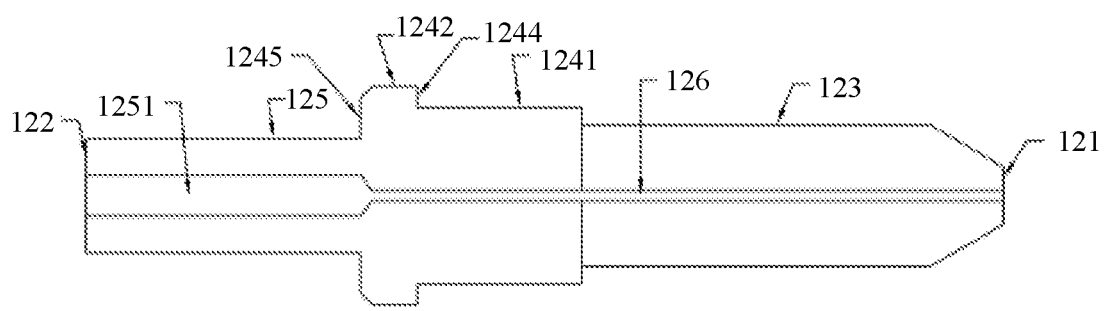
FIG. 9 is a sectional view of the ferrule shown in FIG. 8.

Refer to FIG. 8 and FIG. 9. The ferrule 12 includes a front-end face 121, a rear end face 122, and a front section 123, a middle section 124, and a rear section 125 that are sequentially connected between the front-end face 121 and the rear end face 122. The middle section 124 and the rear section 125 jointly form a connection section 127 of the ferrule 12. The front section 123 is made of a ceramic material, and the front section 123 is configured to closely cooperate with a ceramic ferrule in a ferrule sleeve in the fiber adapter. The connection section 127 is made of a non-ceramic material, for example, a metal material. Both the front section 123 and the rear section 125 are of a centrosymmetric structure. For example, the rear section 125 is in a cylindrical shape, and the front section 123 is a combination of a cylindrical shape and a circular table shape. The middle section 124 includes a first limiting structure 1241 and a first stop structure 1242. In the axial direction, the first limiting structure 1241 is located between the first stop structure 1242 and the front section 123. The first limiting structure 1241 is configured to fit the housing assembly 20, to limit the ferrule 12 in a circumferential direction, that is, prevent the ferrule 12 from rotating relative to the housing assembly 20. The first limiting structure 1241 includes a first plane 1243. There may be one, two, or more first planes 1243. The first plane 1243 may have a limiting function in the circumferential direction, provided that arrangement of the first plane 1243 enables the middle section 124 to be of a non-rotary symmetric structure. As shown in FIG. 8, there are four first planes 1243 spaced apart and symmetrically distributed on an outer surface of the middle section 124. The first stop structure 1242 is a columnar structure connected to the first limiting structure 1241, the first stop structure 1242 includes a first limiting face 1244, and the first limiting face 1244 faces the front-end face 121 of the ferrule 12. In this implementation, a quantity of arranged first limiting faces 1244 also corresponds to a quantity of arranged first planes 1243, and the first limiting faces 1244 are vertically connected to the first planes 1243. In a process of manufacturing the ferrule 12, a piece is cut off from an outer surface of a cylindrical entity in a cutting manner, and the first plane 1243 and the first limiting face 1244 are simultaneously formed. An outer surface of the rear section 125 is configured to sleeve the first elastic member 60 (for example, a spring). A surface that is of the first stop structure 1242 and that faces the rear section 125 is a positioning face 1245, and the positioning face 1245 is configured to abut against the first elastic member 60. A fiber core fastening hole 1251 is arranged in the rear section 125. On the rear end face 122, the fiber core fastening hole 1251 forms an opening for inserting the fiber core 11. A light-through hole 126 is formed between a bottom of the fiber core fastening hole 1251 and the front-end face 121 of the ferrule 12. In the fiber core fastening hole 1251, the bottom is a position directly facing the opening.

When the fiber connector plug is connected to a peer fiber connector plug in the fiber adapter, the connection is implemented by using the front-end face 121 of the ferrule 12. In this way, optical signal transmission between the two fiber connector plugs is implemented. Therefore, for the fiber connector plug, the front-end face 121 of the ferrule 12 needs to be protected by the housing assembly 20, to ensure that the front-end face 121 of the ferrule 12 is not scratched and ensure quality of light transmission.

In this implementation, the front frame sleeve 21 on the housing assembly 20 can protect the front-end face of the ferrule 12. The front frame sleeve 21 is described below in detail (described with reference to FIG. 10 to FIG. 17).

Figure 10:
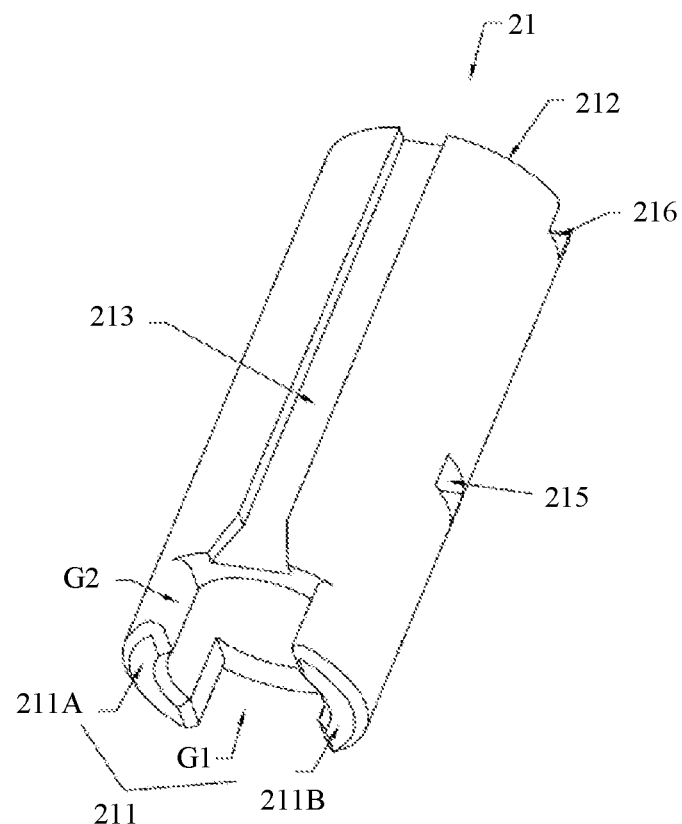
FIG. 10 is a schematic three-dimensional view of an implementation of an integrated kit (that is, a front frame sleeve) in a fiber connector plug assembly according to an implementation of a first solution.
Figure 11:
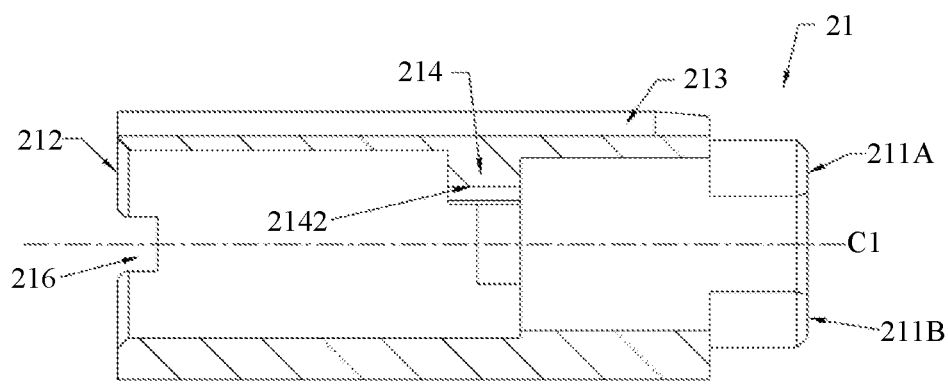
FIG. 11 is a sectional view of an implementation of an integrated kit (that is, a front frame sleeve) in a fiber connector plug assembly according to an implementation of a first solution.

Refer to FIG. 10 and FIG. 11. The front frame sleeve 21 is in a sleeve shape and includes a front-end face 211 and a rear end face 212. With reference to FIG. 4 to FIG. 6, in the fiber connector plug, the front frame sleeve 21 is located at a most front-end of the housing assembly 20, and the rear end face 212 of the front frame sleeve 21 is configured to be connected to the main housing 22.

Figure 12:
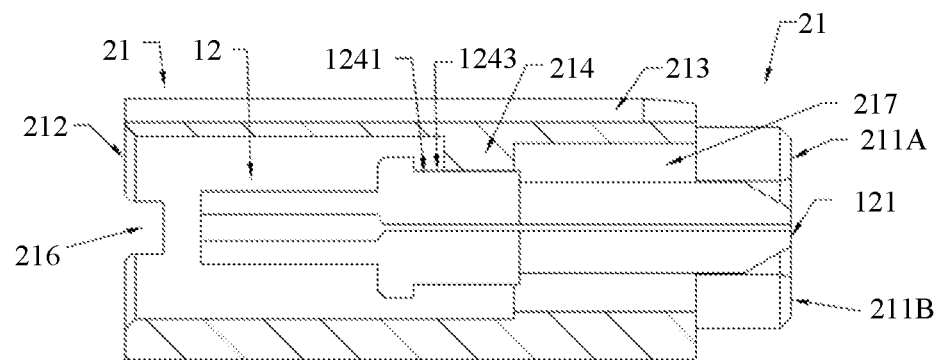
FIG. 12 is a schematic sectional view of a first position relationship between an integrated kit (that is, a front frame sleeve) and a ferrule in a fiber connector plug assembly according to an implementation of a first solution.
Figure 13:
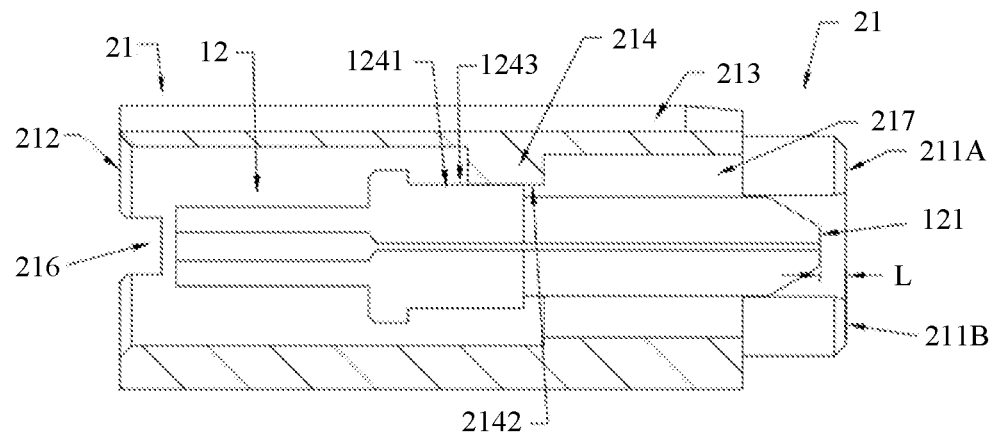
FIG. 13 is a schematic sectional view of a second position relationship between an integrated kit (that is, a front frame sleeve) and a ferrule in a fiber connector plug assembly according to an implementation of a first solution.

Refer to FIG. 12. In an implementation, the front-end face 211 of the front frame sleeve 21 is flush with the front-end face 121 of the ferrule 12. Refer to FIG. 13. In another implementation, the front-end face 121 of the ferrule 12 is enclosed by an inner surface of the front frame sleeve 21, that is, the front-end face 121 of the ferrule 12 retracts into the front frame sleeve 21, the front-end face 211 of the front frame sleeve 21 protrudes from the front-end face 121 of the ferrule 12 in an axial direction, and a distance between the front-end face 121 of the ferrule 12 and the front-end face 211 of the front frame sleeve 21 in the axial direction is L. This implementation may also be understood as follows: A vertical projection of the front-end face 121 of the ferrule 12 on the front frame sleeve 21 is located on the front-end face 211 of the front frame sleeve 21 or the inner surface of the front frame sleeve 21, to protect the front-end face of the ferrule 12. In the implementations in FIG. 12 and FIG. 13, the front-end face 211 of the front frame sleeve 21 can protect the front-end face of the ferrule 12. Specifically, the front frame sleeve 21 can protect the front-end face of the ferrule in a process of turnover, transportation, and insertion into and removal from the fiber adapter. During subsequent connection to a ferrule of a peer connector plug, it is ensured that an optical signal can be stably and reliably transmitted between the two connector plugs.

Refer to FIG. 12 and FIG. 13. A slot 217 is formed between the inner surface of the front frame sleeve 21 and the ferrule 12, the slot 217 forms an opening between the front-end face 211 of the front frame sleeve 21 and the front-end face 121 of the ferrule 12, and the slot 217 is configured to cooperate with the ferrule sleeve of the fiber adapter. That is, when the fiber connector plug is inserted into the fiber adapter, the ferrule is inserted into the ferrule sleeve, and the ferrule sleeve is inserted into the slot 217 simultaneously. An end of the ferrule sleeve needs to entirely extend into the slot 217. That is, an end face of the ferrule sleeve is located in the slot 217, and is arranged opposite to a slot bottom of the slot 217. The slot bottom of the slot 217 is an end opposite to the opening of the slot 217.

In an implementation shown in FIG. 10, two notches G1 and G2 arranged opposite to each other are arranged at positions close to the front-end face 211 of the front frame sleeve 21, and the front-end face 211 of the front frame sleeve 21 is formed between the two notches G1 and G2. That is, the front-end face 211 includes a first face 211A and a second face 211B, and the first face 211A and the second face 211B are symmetrically arranged on two sides of a central axis of the front frame sleeve 21. Specifically, if the first surface 211A and the second surface 211B are connected to form a completed ring, the first surface 211A and the second surface 211B are both less than or equal to a quarter of the ring, so that positions of the two notches G1 and G2 can accommodate a part of a side wall on which a front-end face of a front frame sleeve on another fiber connector plug is located. It may be understood that, when same fiber connector plugs are inserted into a same fiber adapter, because a front-end face of a front frame sleeve 21 protrudes from a front-end face 121 of a ferrule 12, if two ferrules 12 need to be connected, two front frame sleeves 21 need to have interference and cooperation. The two notches G1 and G2 are used to resolve such a problem of connection, interference, and cooperation. The positions of the two notches G1 and G2 may accommodate a part of a region in which a front-end face 211 of the other front frame sleeve 21 is located.

Specifically, the two notches G1 and G2 may be symmetrically arranged on the two sides of the central axis of the front frame sleeve 21. Due to the form of symmetric arrangement, force received by the exterior sleeve during the insertion can be relatively even and balanced, overall strength of the outer frame sleeve is high, and a possibility of a connection failure caused by force imbalance can be minimized.

In the implementations shown in FIG. 10 to FIG. 13, a first guide structure 213 is arranged on an outer surface of the front frame sleeve 21, and the first guide structure 213 extends in the axial direction. The first guide structure 213 may extend from the front-end face 211 of the front frame sleeve 21 to the rear end face 212 of the front frame sleeve 21, or may extend from the front-end face 211 of the front frame sleeve 21 to a middle position of the front frame sleeve 21. The middle position is a position located between the front-end face 211 and the rear end face 212, which not only represents a central position between the front-end face 211 and the rear end face 212, but may be a position close to the front-end face 211, or may be a position close to the rear end face 212. In a radial direction, the first guide structure 213 may be a groove structure recessed on the outer surface of the front frame sleeve 21, that is, the first guide structure 213 does not penetrate to the inner surface of the front frame sleeve 21.

In an axial direction, the first guide structure 213 may be arranged corresponding to a position of the notch G1 or G2. The first guide structure 213 and the notch G1 or G2 can provide an eye-catching reminder function for alignment of the fiber connector plug in a plug-in process, thereby facilitating alignment between the fiber connector plug and the fiber adapter, improving precision of plug-in connection, preventing a ferrule assembly of the fiber connector plug from being damaged or invalid due to multiple collisions caused by false insertion of the fiber connector plug, and effectively prolonging the service life of the fiber connector plug.

The outer surface of the front frame sleeve 21 is in a cylindrical shape. Because the outer surface needs to be in plug-in cooperation with the fiber adapter 200-1 and has a guide structure, the outer surface of the front frame sleeve 21 is also an outer surface of the fiber connector plug. When the fiber connector plug is not plugged in the fiber adapter, the outer surface of the front frame sleeve 21 is directly exposed outside the fiber connector plug, and no other element blocks the front frame sleeve 21.

In an implementation, refer to FIG. 11, FIG. 12, and FIG. 13. A second limiting structure 214 is arranged on the inner surface of the front frame sleeve 21, and is configured to cooperate with the first limiting structure 1241 on the ferrule 12, to prevent the ferrule 12 from rotating in the front frame sleeve 21. Specifically, the front frame sleeve 21 includes a central axis C1 connected between a central position of the front-end face 211 and a central position of the rear end face 212. The second limiting structure 214 is protrudingly arranged on the inner surface of the front frame sleeve 21. The second limiting structure 214 includes a second plane 2142. The second plane 2142 faces the central axis C1. It may also be understood that the second plane 2142 is a surface on a side that is of the second limiting structure 214 and that is away from the outer surface of the front frame sleeve 21. The second plane 2142 is configured to fit the first plane 1243 of the first limiting structure 1241 of the ferrule 12. The first plane 1243 and the second plane 2142 are not limited to theoretical plane features in this application. It may be understood that the first plane may alternatively be approximately a plane, for example, an arc surface approximate to a plane. Alternatively, a concave-convex structure may be arranged on the first plane and the second plane.

Figure 14:
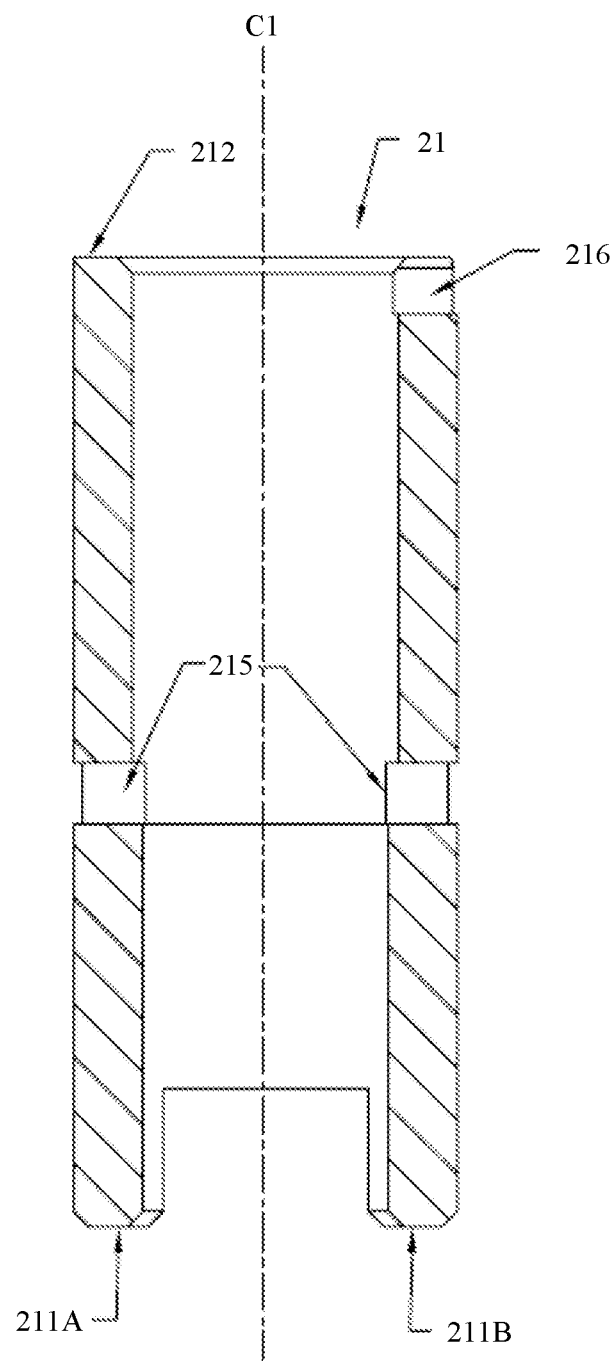
FIG. 14 is a sectional view of an implementation of an integrated kit (that is, a front frame sleeve) in a fiber connector plug assembly according to an implementation of a first solution in another direction.

In an implementation, refer to FIG. 14. The front frame sleeve 21 is provided with a hole 215. The hole 215 is a hole-like structure that penetrates the inner surface and the outer surface of the front frame sleeve 21, or the hole 215 may be a clamping groove structure recessed on the inner surface of the front frame sleeve 21. The hole 215 is configured to fasten the mounting member 221 of the main housing 22. There may be one, two, or more holes 215. In the implementation shown in FIG. 14, there are two holes 215 arranged opposite to each other on two sides of the central axis C1 of the front frame sleeve 21.

In the implementations shown in FIG. 10 to FIG. 14, the rear end face 212 of the front frame sleeve 21 is provided with a first cut 216, and the first cut 216 forms openings on all of the rear end face 212, the inner surface, and the outer surface of the front frame sleeve 21. The first cut 216 is configured to fit a bump 2232 on the main housing 22, to position the front frame sleeve 21 and the main housing 22 in the circumferential direction and prevent the front frame sleeve 21 from rotating relative to the main housing 22.

The front-end face 211 of the front frame sleeve 21 provided in this implementation can protect the front-end face 121 of the ferrule 12, the inner surface of the front frame sleeve 21 can be limitedly connected to the ferrule 12, the outer surface of the front frame sleeve 21 is configured to fit the inner surface of the fiber adapter 200-1 and has the first guide structure 213, and the rear end face of the front frame sleeve 21 is connected to the main housing 22 for positioning. A structure of a front frame sleeve 21 is used to implement a plurality of functions, and an outer surface of the front frame sleeve 21 is exposed, that is, the outer surface of the front frame sleeve 21 is an outer surface of a fiber connector plug, that is, there is only one structural member on a periphery of the ferrule 12: the front frame sleeve 21. In this application, a protection feature (the front-end face 211 of the front frame sleeve 21) and an insertion and removal cooperation feature (the slot formed between the inner surface of the front frame sleeve 21 and the ferrule 12 and the outer surface of the front frame sleeve 21 are in contact cooperation with the inner surface of the fiber adapter) that are arranged on the periphery of the ferrule 12 are centralized on the front frame sleeve 21, which not only can reduce parts and simplify a structure of the fiber connector plug, but also facilitates a miniaturization design for a radial size.

A rear end of the front frame sleeve 21 is in a fully enclosed cylindrical architecture, that is, the rear end of the front frame sleeve 21 is in a circumferentially closed architecture. Even if the first cut 216 is arranged, after the front frame sleeve 21 and the main shaft 223 are assembled, the first cut 216 is also filled with the corresponding bump on the main shaft 223. Therefore, on a fiber connector plug obtained through assembly, the rear end of the front frame sleeve 21 is still in a fully enclosed and circumferentially closed architecture. This can improve structural strength of the front frame sleeve on one hand, and can also improve connection strength between the front frame sleeve and the main shaft on the other hand. In addition, the front frame sleeve is used as an exterior part of the fiber connector plug, and the circumferentially fully enclosed structure can bring exterior integrity and improve user experience.

The mounting member 221 and the front frame sleeve 21 are stacked in the radial direction, and the front frame sleeve 21 is sleeved on a periphery of the mounting member 221. The following describes the mounting member 221 in detail.

Figure 15:
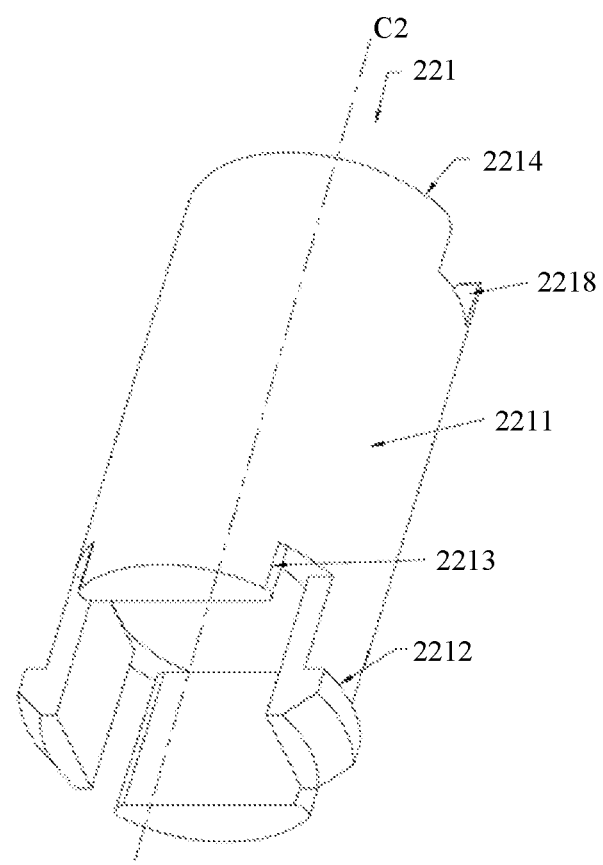
FIG. 15 is a schematic three-dimensional view of a mounting member in a main housing in a connector main part in a fiber connector plug assembly according to an implementation of a first solution.
Figure 16:
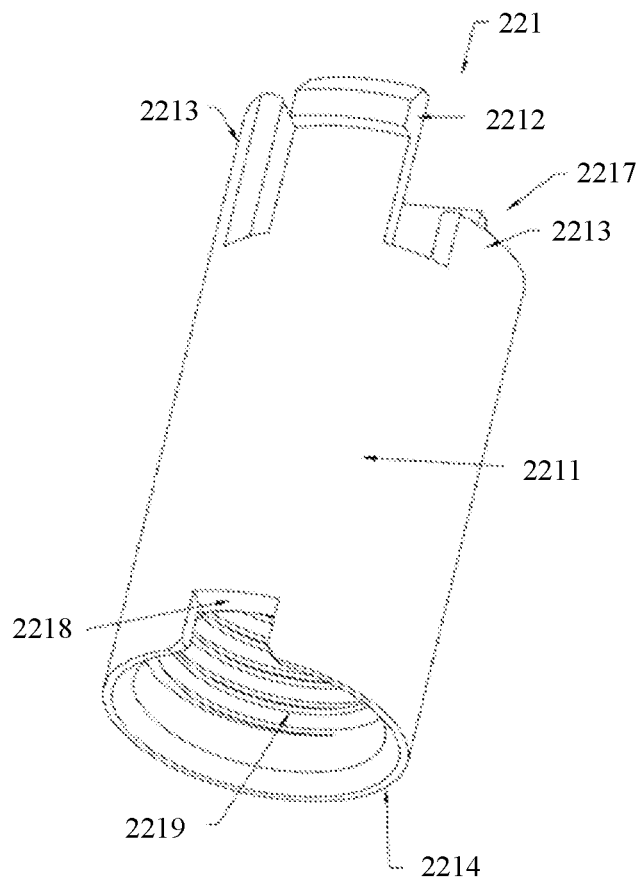
FIG. 16 is a schematic three-dimensional view of a mounting member in a main housing in a connector main part in a fiber connector plug assembly according to an implementation of a first solution in another direction.

Refer to FIG. 15 and FIG. 16. The mounting member 221 includes a mounting member main body 2211, an elastic clamping hook 2212, and a second stop structure 2213. The elastic clamping hook 2212 and the second stop structure 2213 are formed at a front-end of the mounting member main body 2211. A rear end face 2214 of the mounting member main body 2211 is configured to be connected to the main shaft 223.

Figure 17:
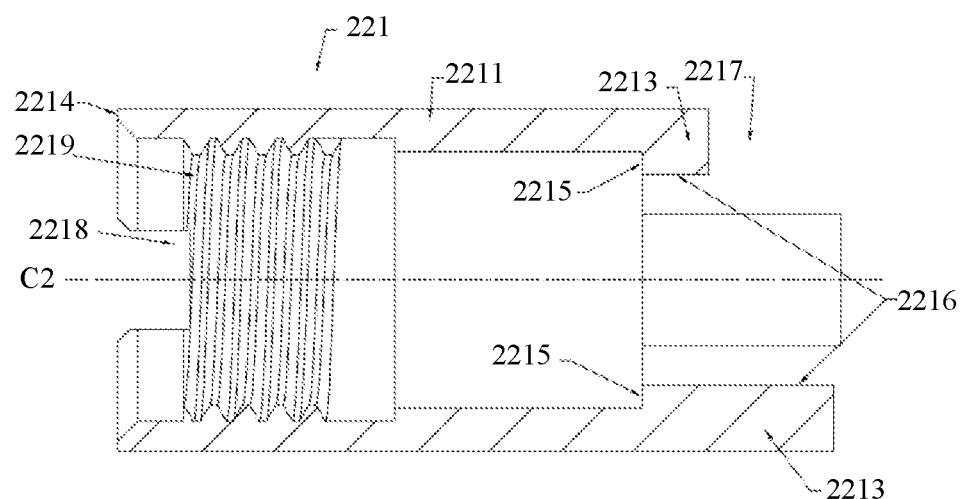
FIG. 17 is a sectional view of a mounting member in a main housing in a connector main part in a fiber connector plug assembly according to an implementation of a first solution.

Refer to FIG. 17. The mounting member main body 2211 is in a sleeve shape and includes a central axis C2. The second stop structure 2213 protrudes from an inner surface of the mounting member main body 2211, and the second stop structure 2213 includes a second limiting face 2215 and a contact face 2216. The second limiting face 2215 faces a rear end of the mounting member main body 2211, and the contact face 2216 faces the central axis C2 of the mounting member main body 2211. Specifically, the second limiting face 2215 is vertically connected to the contact face 2216, and both the second limiting face 2215 and the contact face 2216 are planar. The second limiting face 2215 is configured to fit the first limiting face 1244 of the first stop structure 1242 of the ferrule 12, and the contact face 2216 is configured to fit the first plane 1243 of the first limiting structure 1241 of the ferrule 12.

Refer to FIG. 17. There are two second stop structures 2213 arranged opposite to each other on two sides of the central axis C2 of the mounting member main body. A size of one of the second stop structures 2213 in an axial direction is less than a size of the other of the second stop structures 2213 in the axial direction. A mounting member notch 2217 is formed on a side of one of the second stop structures 2213 away from the mounting member main body 2211, a position of the mounting member notch 2217 is opposite to a part of a contact face 2216 of the other of the second stop structures 2213, and the mounting member notch 2217 is configured to accommodate the second limiting structure 214 of the front frame sleeve 21.

Figure 18:
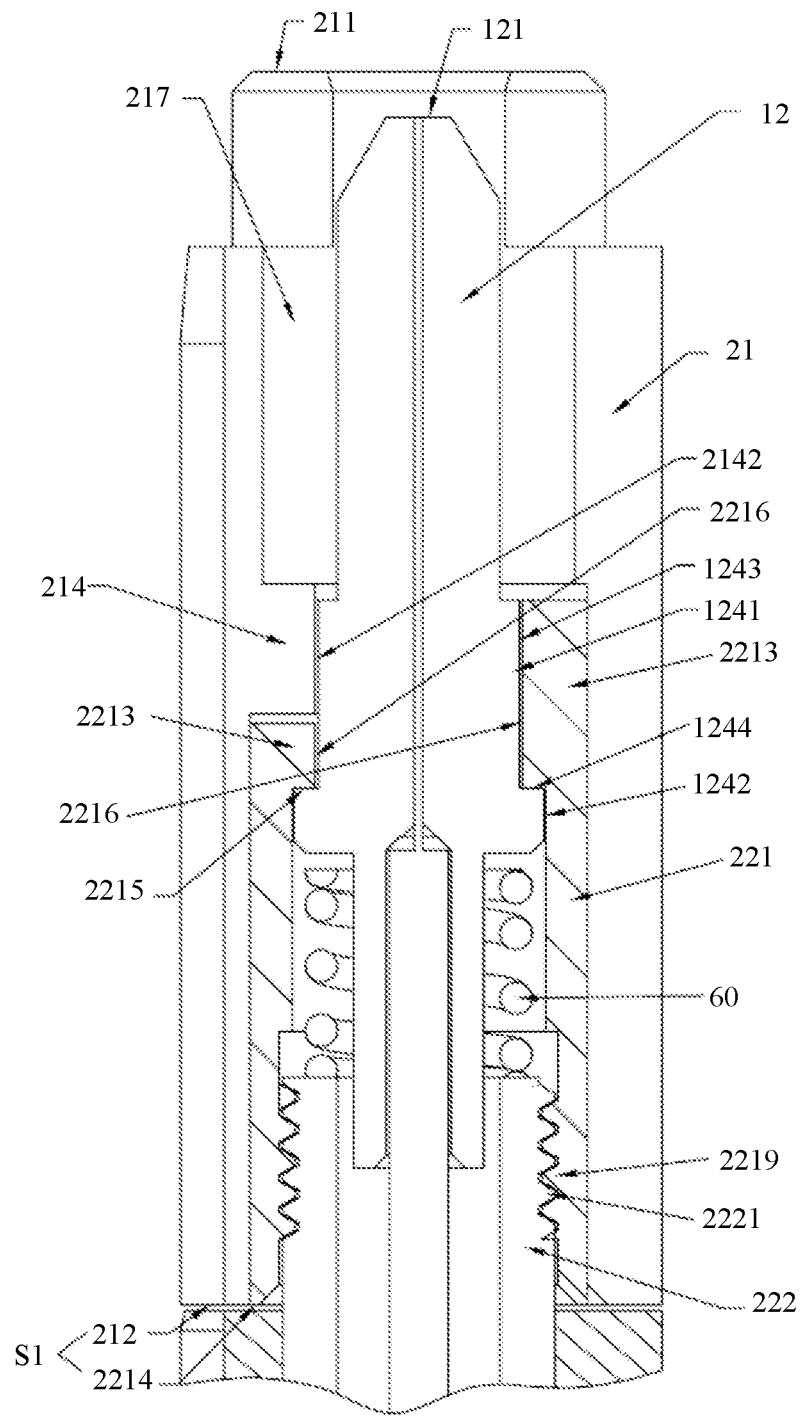
FIG. 18 is a partial sectional view of a fiber connector plug formed by mounting an integrated kit to a connector main part in a fiber connector plug assembly according to an implementation of a first solution.

Refer to FIG. 18. The second plane 2142 of the second limiting structure 214 of the front frame sleeve 21 is coplanar with a contact face 2216 of one of the second stop structures 2213, and is arranged opposite to a contact face 2216 of the other of the second stop structures 2213.

Figure 19:
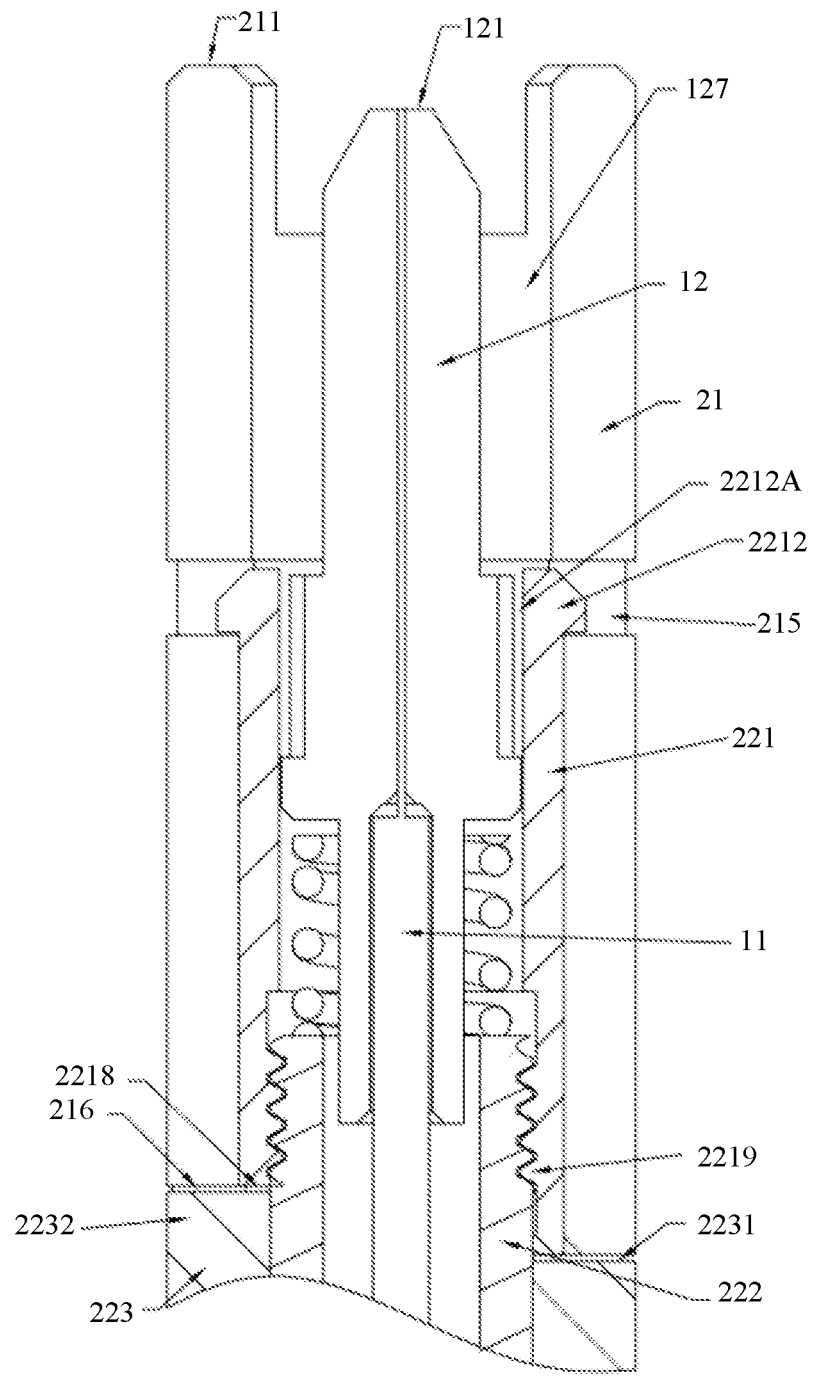
FIG. 19 is a partial sectional view of a fiber connector plug formed by mounting an integrated kit to a connector main part in a fiber connector plug assembly according to an implementation of a first solution in another direction.

Refer to FIG. 19. An outer surface of the mounting member main body 2211 is in contact with the inner surface of the front frame sleeve 21, and the inner surface of the mounting member main body 2211 is in contact with the ferrule 12. The elastic clamping hook 2212 is configured to cooperate with the hole 215 on the front frame sleeve 21, to fasten the mounting member 221 and the front frame sleeve 21. An avoidance space 2212A is provided on a side of the elastic clamping hook 2212 away from the front frame sleeve 21. When the front frame sleeve 21 needs to be removed from the connector main part 100-1, force is applied to the front frame sleeve 21, and the force on the front frame sleeve 21 forces the elastic clamping hook 2212 to move into the avoidance space 2212A, so that the elastic clamping hook 2212 detaches from the hole 215. As shown in FIG. 17, there are two elastic clamping hooks 2212 symmetrically distributed on the two sides of the central axis C2 of the mounting member main body 2211. The two second stop structures 2213 are located on two sides of the elastic clamping hooks 2212, and the two second stop structures 2213 are distributed between the two elastic clamping hooks 2212 in the circumferential direction. In another implementation, alternatively, there may be only one elastic clamping hook 2212, or there may be three or more elastic clamping hooks 2212. This is not specifically limited in this application.

A fastening manner between the mounting member 221 and the front frame sleeve 21 is not limited to cooperation between the elastic clamping hook 2212 and the hole 215 for fastening. In another implementation, the mounting member 221 and the front frame sleeve 21 may be fastened in another manner. For example, the mounting member 221 may not be provided with the elastic clamping hook 2212, the mounting member 221 and the front frame sleeve 21 may be fastened by using a screw, and the screw passes through the front frame sleeve 21 and is fastened in the mounting member 221. Alternatively, the front frame sleeve 21 is provided with a clamping hook, the mounting member 221 is provided with a clamping groove or a hole, and the mounting member 221 and the front frame sleeve 21 are fastened through cooperation between the clamping hook and the clamping groove or the hole.

Refer to FIG. 15, FIG. 16, and FIG. 17. The rear end face 2214 of the mounting member main body 2211 is provided with a second cut 2218. The second cut 2218 forms openings on all of the rear end face 2214, the inner surface, and the outer surface of the mounting member main body 2211. The second cut 2218 is configured to implement positioning between the mounting member 221 and the main shaft 223, position the mounting member 221 and the main shaft 223 in the circumferential direction, and prevent the mounting member 221 from rotating relative to the main shaft 223. Refer to FIG. 18 and FIG. 19. After the front frame sleeve 21 is mounted on the mounting member 221, the rear end face 2214 of the mounting member main body 2211 and the rear end face 212 of the front frame sleeve 21 are coplanar and jointly form a connecting face S1. The connecting face S1 is connected to an end face of the main shaft 223. In this implementation, a structural design in which the connecting face S1 is connected to the end face of the main shaft 223 is used, so that the connection between the front frame sleeve 21 and the main shaft 223 occupies only a space of the end face of the main shaft 223, and does not extend to an outer surface of the main shaft 223. In addition, in this implementation, the outer surface of the front frame sleeve 21 and the outer surface of the main shaft 223 may be coplanar, or may be connected in a smooth transition manner. For example, the outer surface of the front frame sleeve 21 is a cylindrical surface, and the outer surface of the main shaft 223 is also a cylindrical surface. When the front frame sleeve 21 is connected to the end face of the main shaft 223, the two cylindrical outer surfaces with a same radial size are connected to form a complete cylindrical outer surface. The connecting face S1 and the end face of the main shaft 223 implement positioning in the circumferential direction by using a cut-bump fitting structure. Specifically, the first cut 216 and the second cut 2218 directly face each other in the radial direction, and are configured to implement positioning of the front frame sleeve 21 and the mounting member 221 to the main shaft 223.

A sealing connection may be formed at a joint between the connecting face S1 and the main shaft 223. A function of the sealing connection is to isolate an internal space of the main shaft 223 from an external space in a sealing manner. In this way, the fiber core and the ferrule can be protected from erosion by dust, moisture, and the like, the service life of the fiber connector plug is prolonged, and efficiency and quality of light transmission are enhanced.

Refer to FIG. 16 to FIG. 19. The inner surface of the mounting member main body 2211 is further provided with a threaded portion 2219, and the threaded portion 2219 is configured to be fastened to the fastener 222. Refer to FIG. 19. The fastener 222 is also in a sleeve shape, an external thread 2221 is arranged on a periphery of a front-end of the fastener 222, and the front-end of the fastener 222 extends into the mounting member 221 and is fastened to the threaded portion 2219 on the mounting member 221. A rear end of the fastener 222 extends into the main shaft 223 and is fastened to an inner surface of the main shaft 223.

Figure 20:
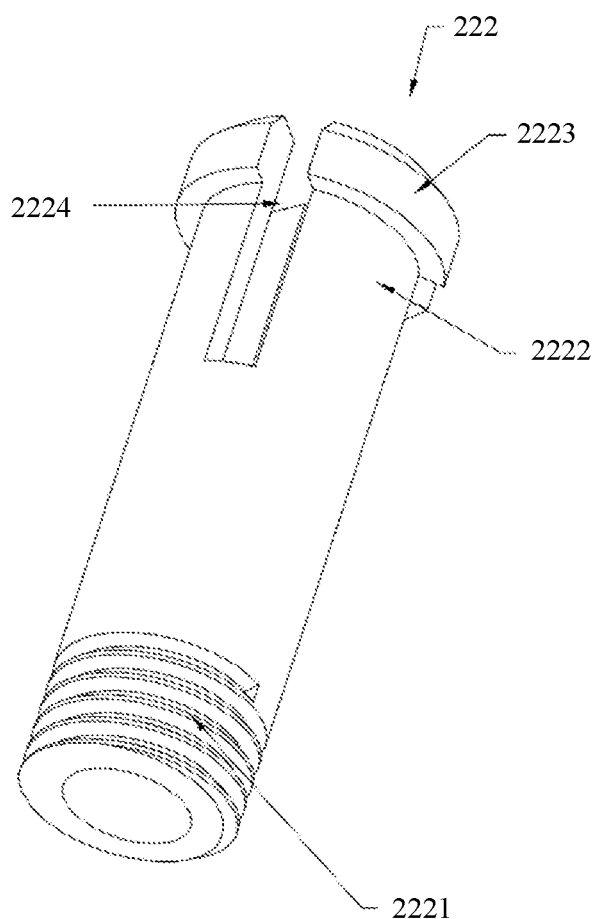
FIG. 20 is a schematic three-dimensional view of a fastener in a main housing in a connector main part in a fiber connector plug assembly according to an implementation of a first solution.

Specifically, refer to FIG. 20. An elastic clasp arm 2222 is formed on the rear end of the fastener 222. The elastic clasp arm 2222 extends in the axial direction. A clasp portion 2223 is protrudingly arranged on an outer surface of the elastic clasp arm 2222. The clasp portion 2223 is configured to fit a limiting step on the inner surface of the main shaft 223, to fasten the fastener 222 to the main shaft 223. Three elastic clasp arms 2222 are arranged on the rear end of the fastener 222, and a gap 2224 is formed between adjacent elastic clasp arms 2222. The gap 2224 is formed to enable the elastic clasp arms 2222 to elastically swing in the radial direction. In another implementation, there may be one, two, or more elastic clasp arms 2222. This is not limited in this application.

Refer to FIG. 18, FIG. 19, and FIG. 20. In a possible implementation, one part of the fastener 222 is located inside the main shaft 223, and the other part is located inside the mounting member 221. That is, the fastener 222 is in a fully enclosed state. On a periphery of the fastener 222, the main shaft 223 and the mounting member 221 are connected.

Figure 21A:
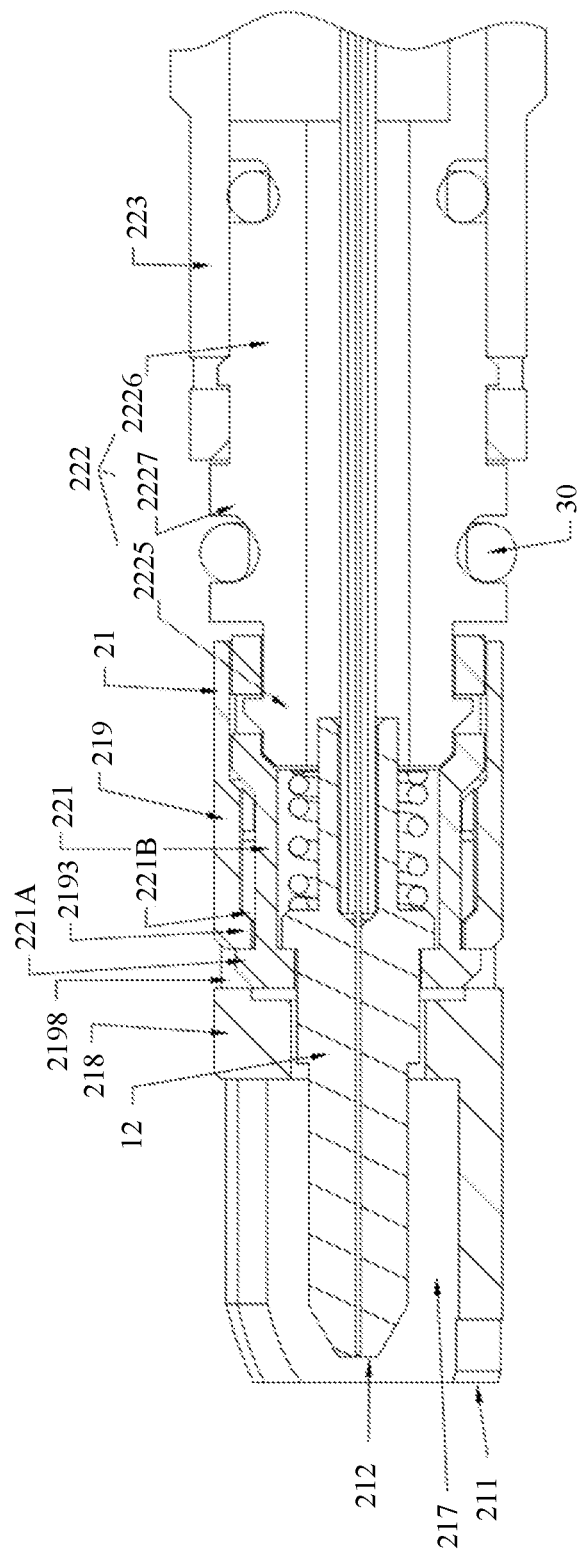
FIG. 21A is a partial enlarged schematic sectional view of a fiber connector plug formed by mounting an integrated kit to a connector main part in a fiber connector plug assembly according to an implementation of a first solution, which mainly expresses a position relationship among a mounting member, a fastener, and a main shaft.

In another implementation, the fastener 222 may alternatively be partially exposed as an exterior face of the fiber connector plug. Refer to FIG. 21A. In this implementation, the fastener 222 is of a sleeve-shaped structure. The fastener 222 includes a front-end 2225, a rear end 2226, and a middle portion 2227 connected between the front-end 2225 and the rear end 2226. The front-end 2225 of the fastener 222 extends into an inner side of the mounting member 221 and is fastened to the mounting member 221. The rear end 2226 of the fastener 222 extends into an inner side of the main shaft 223 and is fastened to the main shaft 223. The middle portion 2227 is located between a front-end of the main shaft 223 and a rear end of the mounting member 221, which may also be understood as that the middle portion 2227 is located between the front-end of the main shaft 223 and the rear end of the front frame sleeve 21, and an outer surface of the middle portion 2227 forms an exterior face of the fiber connector plug.

Specifically, the front-end 2225 is detachably connected to the mounting member 221 in a manner of a fit between a buckle and a hole. A buckle is arranged in a periphery of the front-end 2225. A hole that penetrates the inner surface and the outer surface is arranged on the mounting member 221. The buckle of the front-end 2225 is accommodated in the hole of the mounting member 221. The rear end 2226 is also detachably connected to the main shaft 223 in a manner of a fit between a buckle and a hole. A buckle is arranged in a periphery of the rear end 2226. A hole that penetrates the inner surface and the outer surface is arranged on the main shaft 223. The buckle of the rear end 2226 is accommodated in the hole of the main shaft 223.

In this implementation, a sealing groove is arranged in a periphery of the middle portion 2227 and is configured to accommodate a sealing member 30. Certainly, in the architecture in this implementation, the sealing groove may not be arranged in the periphery of the middle portion 2227, but the sealing groove is arranged on the outer surface of the main shaft 223. When the fiber connector plug is inserted into the fiber adapter, the middle portion 2227 is located inside the fiber adapter, and the front-end of the main shaft 223 also extends into the fiber adapter.

A sealing structure may also be arranged between the rear end 2226 of the fastener 222 and the main shaft 223.

It may be understood that a guide structure may also be arranged in the periphery of the middle portion 2227. The guide structure communicates with or continuously extends to the first guide structure 213 on the front frame sleeve 21. The guide structure and the first guide structure 213 on the front frame sleeve 21 jointly fit a guide key on the fiber adapter. In another implementation, a guide structure is arranged in each of the periphery of the middle portion 2227 and the periphery of the main shaft 223. The two guide structures are arranged on an extension path of the first guide structure 213 on the front frame sleeve 21. The two guide structures and the first guide structure 213 on the front frame sleeve 21 jointly form a guide structure of the fiber connector plug.

Figure 21B:
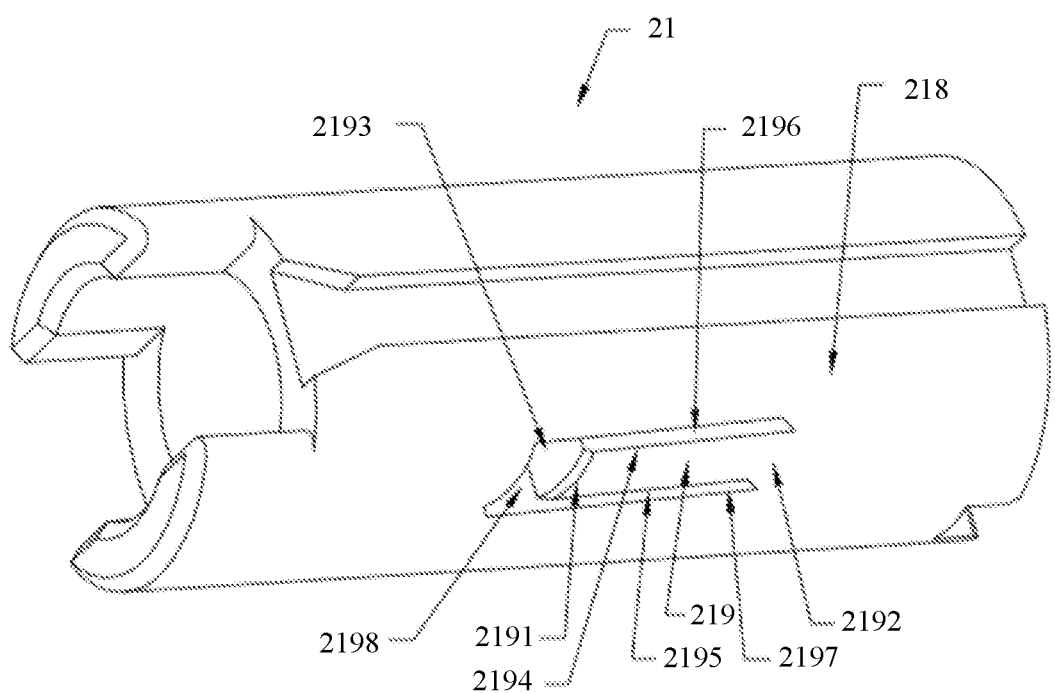
FIG. 21B is a schematic view of a front frame sleeve (that is, an integrated kit in this application) in the implementation shown in FIG. 21A.

Refer to FIG. 21B and FIG. 21A. FIG. 21B is a schematic view of an implementation of the front frame sleeve 21 in the implementation shown in FIG. 21A. In this implementation, the front frame sleeve 21 includes a main body 218 and an elastic arm 219. FIG. 21B shows only one elastic arm 219. It may be understood that two elastic arms 219 may be arranged on the main body 218 and symmetrically distributed on the main body 218. The elastic arm 219 includes a first end 2191 and a second end 2192 that are opposite to each other, the first end 2191 is connected to the main body 218, a clamping hook 2193 is arranged on the second end 2192, the elastic arm 219 further includes a first side edge 2194 and a second side edge 2195 that are connected between the first end 2191 and the second end 2192, a gap 2196 is provided between the first side edge 2194 and the main body 218, a gap 2197 is also provided between the second side edge 2195 and the main body 218, and a lock catch hole 2198 is formed between the second end 2192 of the elastic arm 219 of the front frame sleeve 21 and the main body. In an implementation, a detachable connection between the front frame sleeve 21 and the main housing 22 is implemented through cooperation between a buckle 221A on the main housing 22 and the lock catch hole 2198, or through cooperation between a lock hole (or lock slot) 221B on the main housing 22 and the clamping hook 2193 on the elastic arm 219. The buckle 221A and the lock hole (or lock slot) 221B on the main housing 22 may coexist. As shown in FIG. 21A, a part that is on the main housing 22 and cooperates with the front frame sleeve 21 is the mounting member 221. The buckle 221A and the lock hole (or lock slot) 221B are arranged on the mounting member 221, where the lock hole (or lock slot) 221B is a position that is at a right side of the buckle 221A and that is configured to accommodate the clamping hook 2193 on the elastic arm 219. The clamping hook 2193 cooperates with the lock hole (or lock slot) 221B, and the buckle 221A is also fastened in the lock catch hole 2198, to implement a locked state between the integrated kit and the main housing. When the elastic arm 219 is opened by external force, the clamping hook 2193 detaches from the lock hole (or lock slot) 221B, and the buckle 221A detaches from the lock catch hole 2198, to implement unlocking between the integrated kit 21 and the main housing 22.

Specifically, the elastic arm 219 may be opened by using a tool, so that the elastic arm 219 opens relative to the main body 218. In another implementation, a structure of which the elastic arm 219 cooperates with the main housing 22 may also be designed as an oblique surface. When the front frame sleeve 21 is pulled out from the main housing 22 by force, the elastic arm 219 may be forced to open through cooperation of the oblique surface, to implement unlocking between the integrated kit 21 and the main housing 22.

Figure 22:
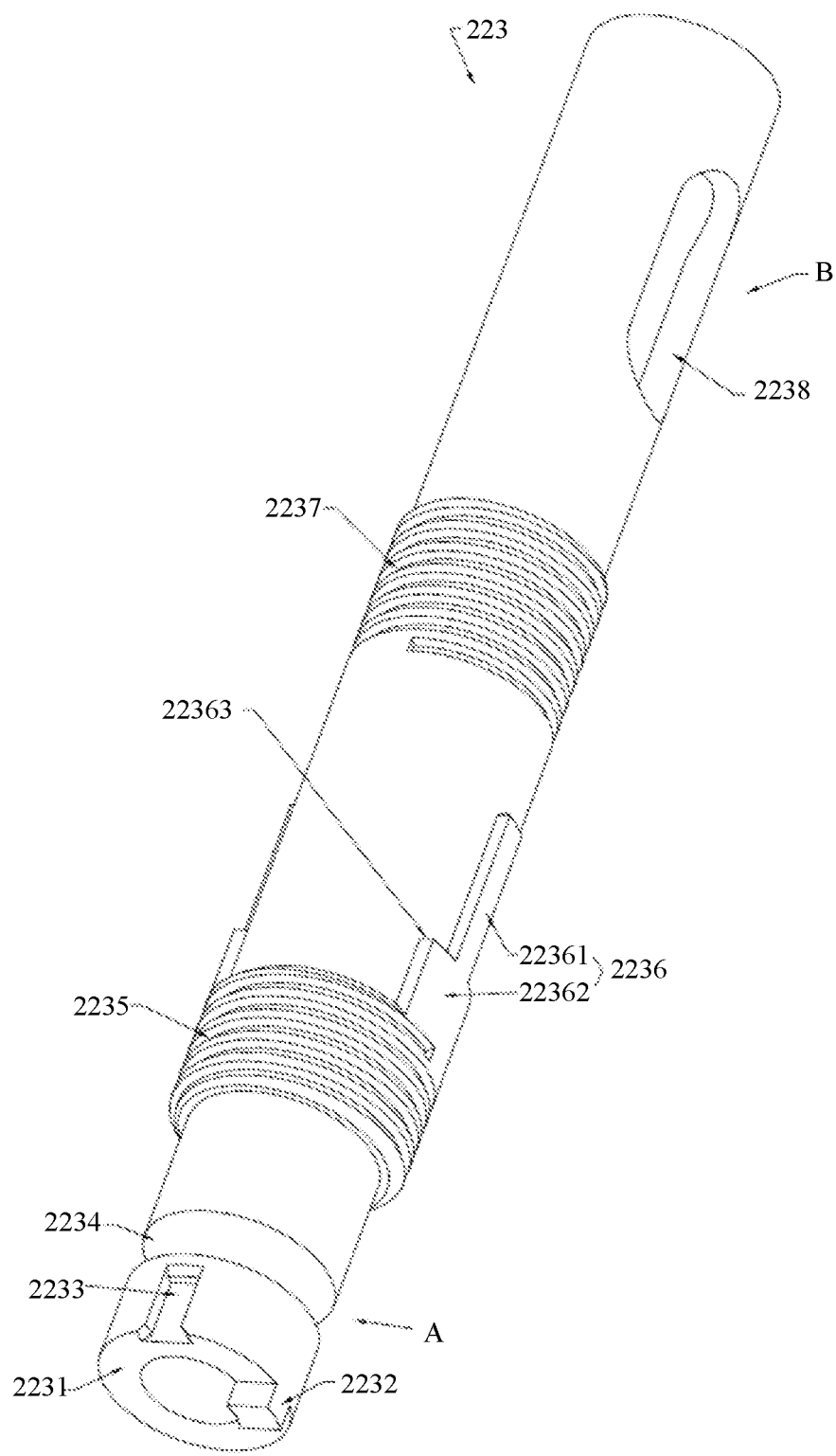
FIG. 22 is a schematic three-dimensional view of a main shaft in a main housing in a connector main part in a fiber connector plug assembly according to an implementation of a first solution.
Figure 23:
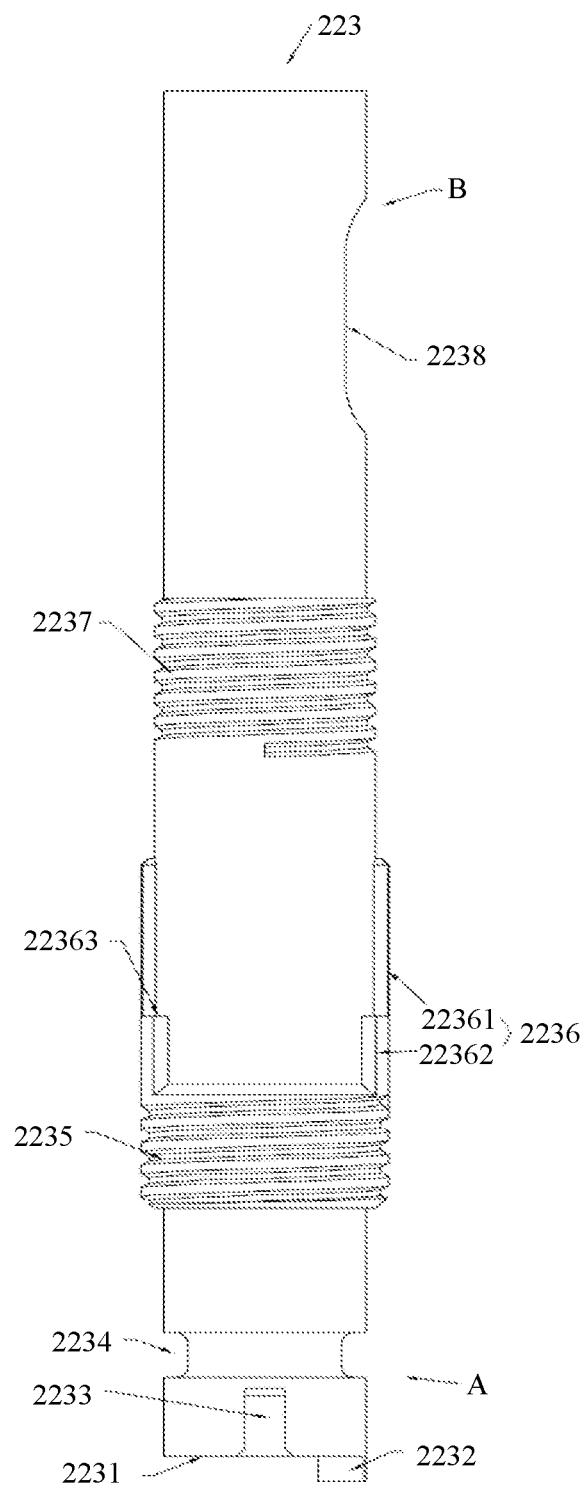
FIG. 23 is a schematic plane view of a main shaft in a main housing in a connector main part in a fiber connector plug assembly according to an implementation of a first solution in one direction.
Figure 24:
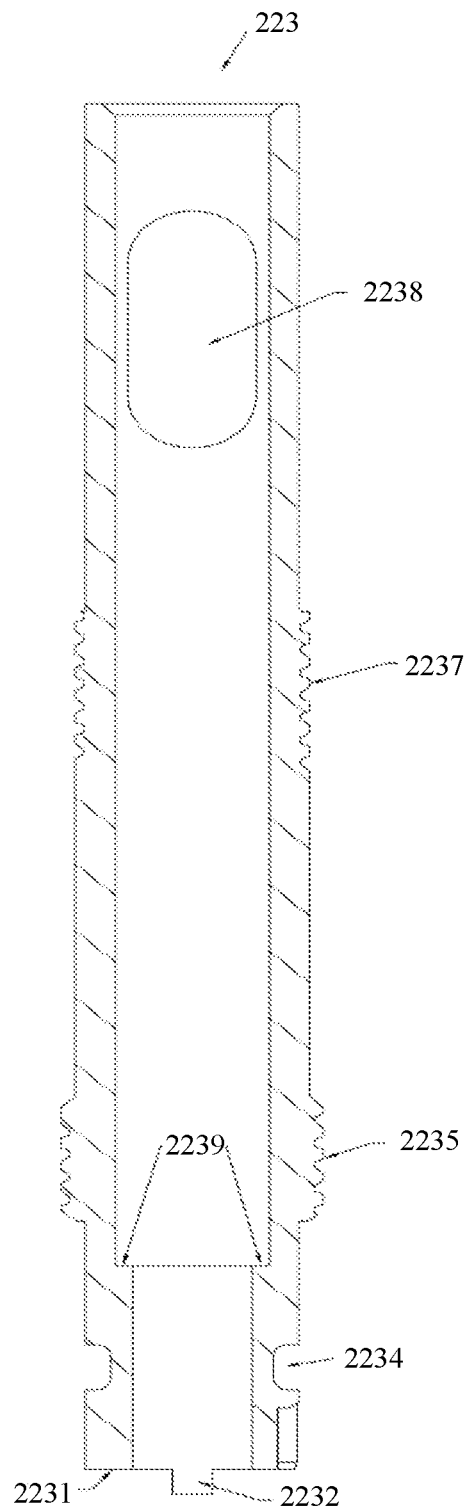
FIG. 24 is a schematic sectional view of a main shaft in a main housing in a connector main part in a fiber connector plug assembly according to an implementation of a first solution.

Refer to FIG. 22, FIG. 23, and FIG. 24. A core element of the main housing 22 is the main shaft 223, and main features of the main shaft 223 are centralized on the front-end face and the outer surface of the main shaft 223. A front-end face 2231 of the main shaft 223 is configured to be connected to the front frame sleeve 21 and the mounting member 221. A bump 2232 is protrudingly arranged on the front-end face 2231 of the main shaft 223. The bump 2232 extends in the radial direction from an inner edge of the front-end face 2231 of the main shaft 223 to an outer edge of the front-end face 2231 of the main shaft 223.

In an implementation, a second guide structure 2233, a sealing groove 2234, a locking portion 2235, a first sliding guide structure 2236, and a fastening portion 2237 are sequentially arranged on the outer surface of the main shaft 223 in the axial direction from the front-end to the rear end of the main shaft 223.

At a position of the front-end face 2231 of the main shaft 223, the second guide structure 2233 and the first guide structure 213 on the front frame sleeve 21 are connected (as shown in FIG. 4), and jointly fit the guide key on the fiber adapter, which can prevent relative rotation between the front frame sleeve 21 and the main shaft 223.

In an implementation, in the radial direction, the second guide structure 2233 may be a groove structure recessed on the outer surface of the main shaft 223, or the second guide structure 2233 penetrates the inner surface and the outer surface of the main shaft 223 (that is, the second guide structure 2233 may be understood as a cut structure arranged on the main shaft 223). In another implementation, alternatively, the second guide structure 2233 may be a structure protrudingly arranged on the outer surface of the main shaft 223. A circumferential size and a radial size of the second guide structure 2233 may be the same as a circumferential size and a radial size of the first guide structure 213. Because both the outer surface of the main shaft and the outer surface of the front frame sleeve are exterior faces of the fiber connector plug, the circumferential size and the radial size of the second guide structure 2233 are designed to be the same as the circumferential size and the radial size of the first guide structure 213. In this way, the first guide structure 213 and the second guide structure 2233 may visually form a one-piece structure. In this way, a complete appearance consistency effect is also achieved between the front frame sleeve 21 and the main shaft 223, which not only facilitates a miniaturization design, but also can improve user experience.

The sealing groove 2234 is of an arc-shaped groove structure that surrounds the outer surface of the main shaft 223. The locking portion 2235 is located on a side of the sealing groove 2234 away from the second guide structure 2233. The following describes the locking portion 2235 in detail.

For ease of description, the outer surface of the main shaft 223 defined in this implementation is a surface that bears the locking portion 2235, instead of an outer surface of the locking portion 2235.

Refer to FIG. 22. The locking portion 2235 may be a convex boss structure integrally formed on the outer surface of the main shaft 223. Alternatively, there may be a split structure between the locking portion 2235 and the main shaft 223. For example, the locking portion 2235 is sleeved on and fastened to the outer surface of the main shaft 223, or is connected to the outer surface of the main shaft 223 in another fastening manner (for example, glue fastening). The locking portion 2235 may be of a closed ring structure surrounding the outer surface of the main shaft 223, and may be understood as a cylindrical boss structure continuously extending in the circumferential direction, and is a centrosymmetric rotary structure. The locking portion 2235 may alternatively be of a non-closed ring structure. For example, one, two, or more locking portions 2235 are arranged on the outer surface of the main shaft 223. In an embodiment in which there are two locking portions 2235, the locking portions 2235 may be symmetrically distributed on two sides of the main shaft 223. In an embodiment in which there are a plurality of locking portions 2235, the locking portions 2235 may be distributed on a same circumference at equal intervals. The outer surface of the locking portion 2235 may be a smooth surface, for example, a cylindrical surface, an arc surface, or a plane, and the outer surface of the locking portion 2235 may be arranged with a screw thread or another microstructure configured to increase contact friction force, for example, an etched structure.

Refer to FIG. 22 and FIG. 23. The first sliding guide structure 2236 is located on a side of the locking portion 2235 away from the sealing groove 2234. The first sliding guide structure 2236 is configured to cooperate with the sliding member 40, and provide mounting limiting and guidance for a slidable connection of the sliding member 40 on the main shaft 223. The first sliding guide structure 2236 may be a guide rail structure protrudingly arranged on the outer surface of the main shaft 223, or may be a guide groove structure recessed on the outer surface of the main shaft 223. The first sliding guide structure 2236 includes a first guide portion 22361 and a first limiting portion 22362. The first limiting portion 22362 is connected to the locking portion 2235. The first guide portion 22361 is connected to a side of the first limiting portion 22362 away from the locking portion 2235. In the circumferential direction, a size of the first guide portion 22361 is less than a size of the first limiting portion 22362. A first limiting step 22363 is formed between the first limiting portion 22362 and the outer surface of the main shaft 223. The first limiting step 22363 is configured to define a boundary position for sliding of the sliding member 40 toward the front-end of the main shaft 223. When the sliding member 40 slides to the first limiting step 22363 and abuts against the first limiting step 22363, the sliding member 40 cannot slide toward the front-end of the main shaft 223 any longer. The first guide portion 22361 is connected to a middle portion of the first limiting portion 22362. The first limiting portion 22362 and the first guide portion 22361 form a T-shaped structure, and the first guide portion 22361 is of a strip-shaped structure extending in the axial direction. In this implementation, there are two first sliding guide structures 2236 symmetrically distributed on outer surfaces of two opposite sides of the main shaft 223.

The fastening portion 2237 is located on a side of the first sliding guide structure 2236 away from the locking portion 2235. The fastening portion 2237 is configured to connect to the fastening base 224. In this implementation, the fastening portion 2237 is of a threaded structure and is configured to connect to the fastening base 224 in a threaded connection manner. Alternatively, the fastening portion 2237 may be of another fastening structure. For example, the main shaft 223 and the fastening base 224 are fastened in a manner of a fit between a buckle and a clamping groove.

Refer to FIG. 22, FIG. 23, and FIG. 24. The main shaft 223 provided in this implementation includes a front-end A and a tail end B. The front-end face 2231 is an end face of the front-end A. The second guide structure 2233 and the sealing groove 2234 are arranged on an outer surface of the front-end A. An inner surface of the front-end A is configured to connect the fastener 222. A limiting table 2239 is arranged on the inner surface of the main shaft 223. The limiting table 2239 faces the tail end B, and the limiting table 2239 is configured to fit a clasp portion 2223 of the elastic clasp arm 2222 on the fastener 222. The tail end B is configured to be fastened to the fiber. A through hole 2238 is arranged at the tail end B. The through hole 2238 penetrates the outer surface and the inner surface of the main shaft 223.

In this implementation, elements assembled on the outer surface of the main shaft 223 include the sealing structure 30, the sliding member 40, the second elastic member 70, the fastening base 224, the heat shrink tube 226, and the tail sleeve 225. The sealing structure 30 is an elastic sealing ring, and is sleeved in the sealing groove 2234 and partially protrudes from the outside of the sealing groove 2234. The part of the sealing structure 30 protruding from the outside of the sealing groove 2234 is configured to sealingly connect the fiber adapter.

Figure 25:
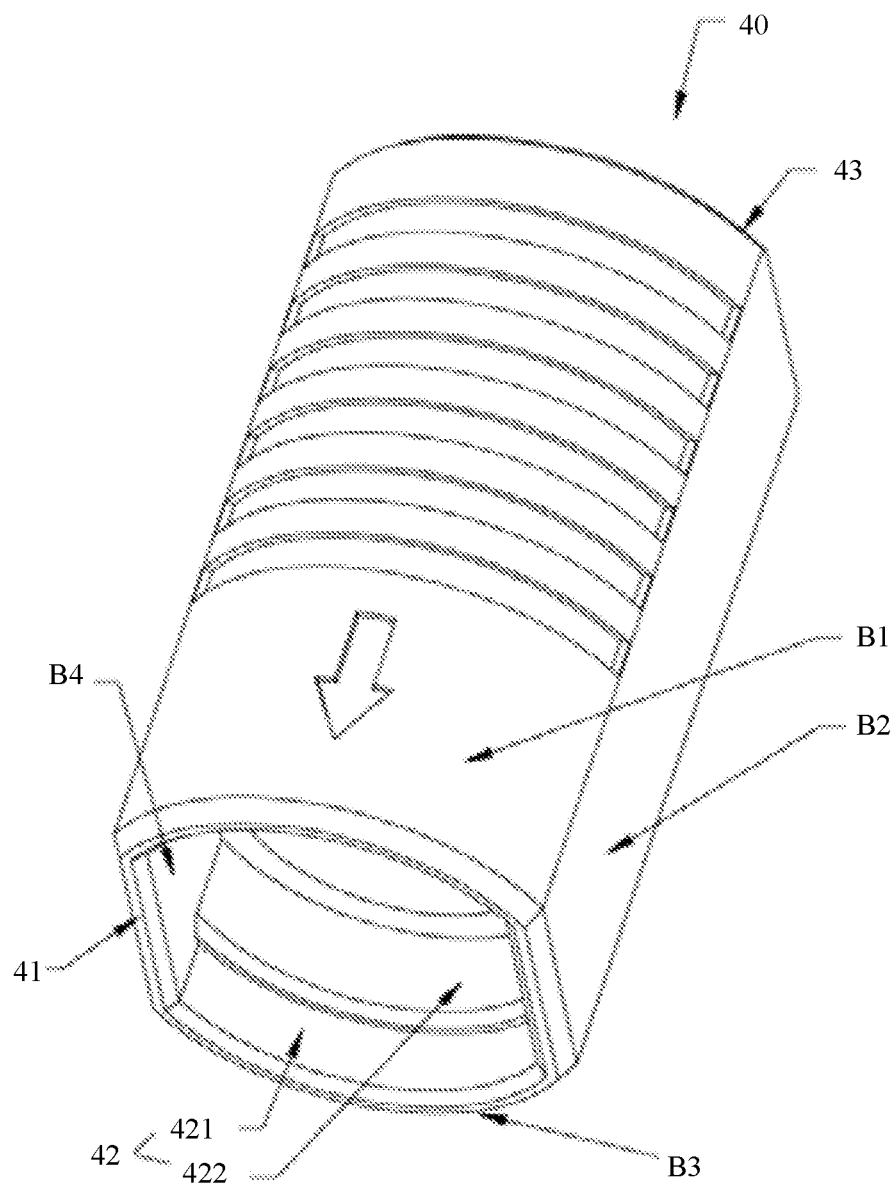
FIG. 25 is a schematic three-dimensional view of a sliding member in a main housing in a connector main part in a fiber connector plug assembly according to an implementation of a first solution.
Figure 26:
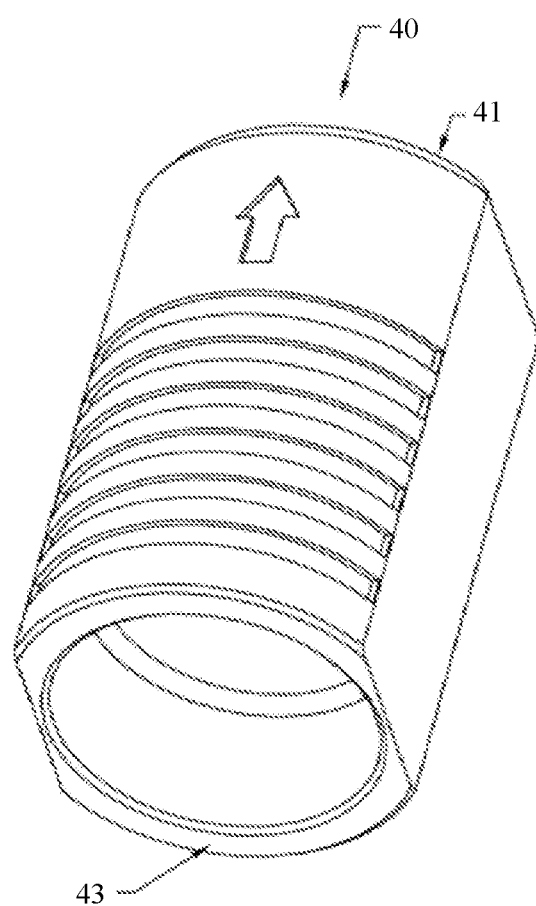
FIG. 26 is a schematic three-dimensional view of a sliding member in a main housing in a connector main part in a fiber connector plug assembly according to an implementation of a first solution in another direction.
Figure 27:
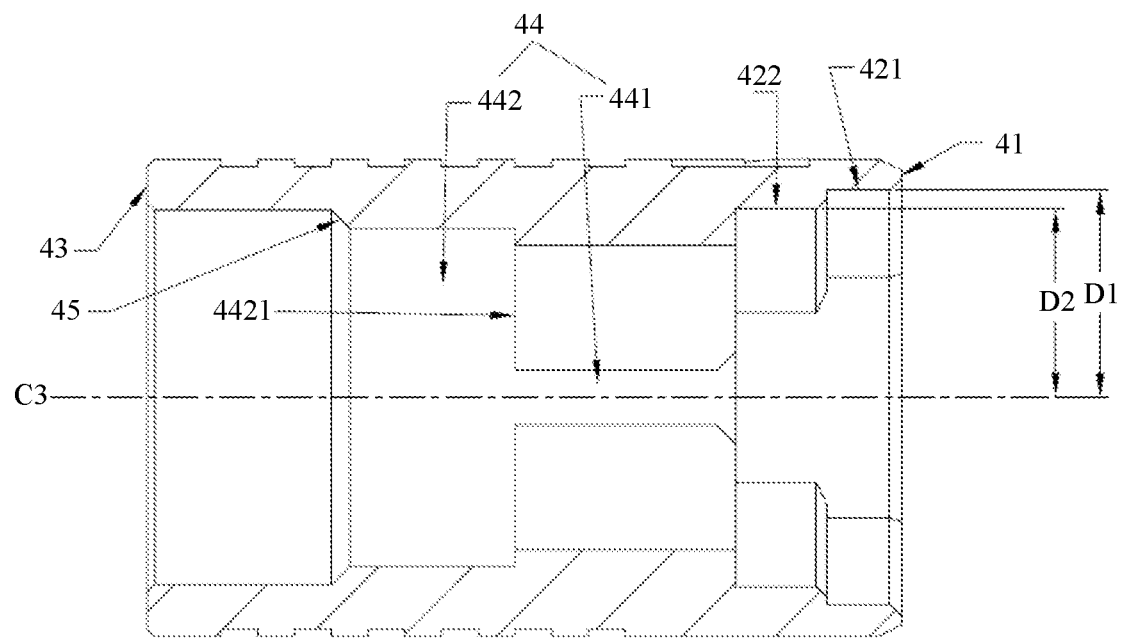
FIG. 27 is a sectional view of a sliding member in a main housing in a connector main part in a fiber connector plug assembly according to an implementation of a first solution.
Figure 28:
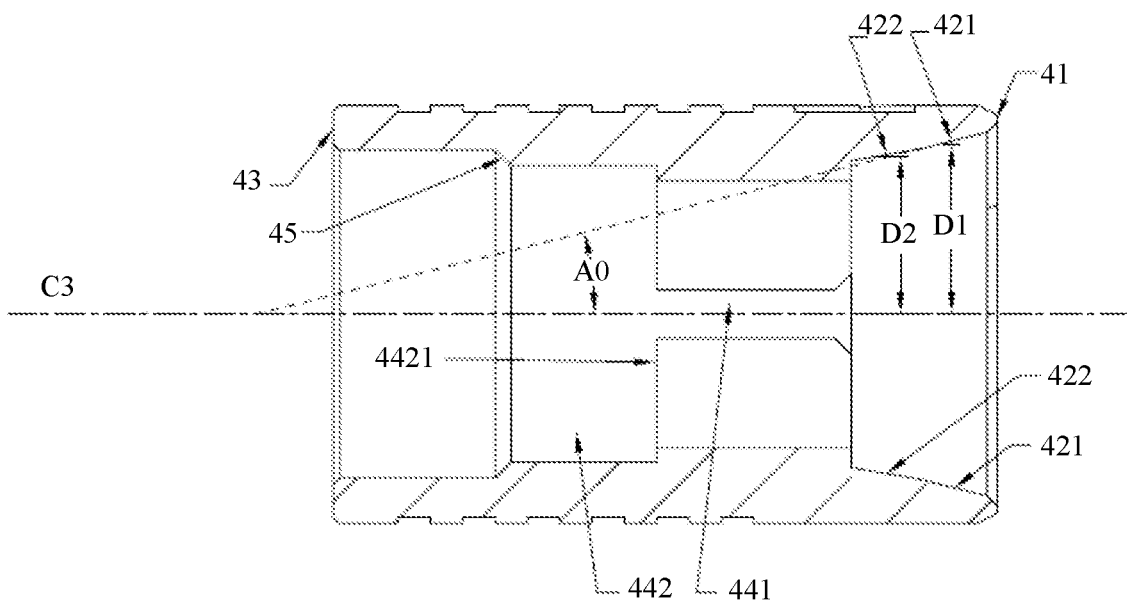
FIG. 28 is a sectional view of a sliding member in a main housing in a connector main part in a fiber connector plug assembly according to an implementation of a first solution.

Refer to FIG. 25 and FIG. 26. In an implementation, the sliding member 40 is in a sleeve shape, and the sliding member 40 includes a front-end face 41 and a rear end face 43. An inner surface of the sliding member 40 includes a fitting surface 42. The fitting surface 42 adjoins the front-end face 41 of the sliding member 40 and faces an internal space of the sliding member 40 (which may also be understood as facing a central axis of the sliding member 40). The fitting surface 42 includes a first region 421 and a second region 422. The first region 421 is located between the second region 422 and the front-end face 41 of the sliding member 40. In an implementation, both the first region 421 and the second region 422 are arc-shaped surfaces in the circumferential direction. Refer to FIG. 27 and FIG. 28. In the radial direction, a vertical distance D1 (which may be understood as a radial size of the first region 421) between the first region 421 and a central axis C3 is greater than a vertical distance D2 (which may be understood as a radial size of the second region 422) between the second region 422 and the central axis. The first region 421 may be directly connected to the second region 422. Alternatively, the first region 421 and the second region 422 may be two non-adjacent regions on the fitting surface 42, that is, the first region 421 and the second region 422 are spaced apart. In the axial direction, vertical distances between different positions of the first region 421 and the central axis may be equal (for example, an implementation shown in FIG. 27), that is, an extension direction of the first region 421 in a direction from the front-end face 41 to the rear end face 43 of the sliding member 40 is parallel to the central axis. In another implementation, the vertical distances between different positions of the first region 421 and the central axis may be unequal (for example, an implementation shown in FIG. 28), that is, an included angle Ao is formed between the extension direction of the first region 421 in the direction from the front-end face 41 to the rear end face 43 of the sliding member 40 and the central axis.

Specifically, in the axial direction, the fitting surface 42 may be in a stepped shape (for example, the implementation shown in FIG. 27), and the fitting surface 42 may also be in a bevel shape (for example, the implementation shown in FIG. 28). An etched structure is arranged in the first region 421 and/or the second region 422. Alternatively, a groove is arranged on the fitting surface 42 (where the groove may be arranged in the first region 421 or the second region 422, or the groove may be arranged in each of the first region 421 and the second region 422). The groove is configured to fit a protruding portion on the elastic arm. Both the etched structure and the groove structure that is arranged on the fitting surface help increase locking force. Arrangement of the second region 422 may be the same as or different from that of the first region 421. This is not limited in this application. Forms of the first region 421 and the second region 422 may be different provided that the distance between the second region 422 and the central axis is closer than that between the first region 421 and the central axis.

Refer to FIG. 25. The sleeve-shaped sliding member 40 includes a first plate member B1, a second plate member B2, a third plate member B3, and a fourth plate member B4 that are sequentially connected. The first plate member B1 is arranged opposite to the third plate member B3. The second plate member B2 is arranged opposite to the fourth plate member B4. The fitting surface 42 is arranged on inner surfaces of the first plate member B1 and the third plate member B3. In this implementation, the first plate member B1 and the third plate member B3 are of convex arc-shaped structures, and an anti-sliding structure is arranged on an outer surface of each of the first plate member B1 and the third plate member B3. The second plate member B2 and the fourth plate member B4 are of flat plate structures. The second plate member B2 and the fourth plate member B4 are arranged in parallel with each other. A distance between the second plate member B2 and the fourth plate member B4 is less than a maximum distance between the first plate member B1 and the third plate member B3. When the sliding member 40 is operated, external force is applied to the first plate member B1 and the third plate member B3, and one side of the second plate member B2 and the fourth plate member B4 may be configured to adjoin another fiber connector plug, so that a plurality of fiber connector plugs are densely arranged to save a space. When the sliding member 40 is connected to the main shaft 223, the second plate member B2 and the fourth plate member B4 may be in direct contact with the outer surface of the main shaft 223 or may be connected to the outer surface of the main shaft 223 by using a guide structure. A gap is formed between the main shaft 223 and each of the first plate member B1 and the third plate member B3. The gap may be a locking groove for accommodating a second locking structure of the fiber adapter or an accommodating space for accommodating the second elastic element 70 and the fastening base.

Refer to FIG. 27 and FIG. 28. A second sliding guide structure 44 is further arranged on the inner surface of the sliding member 40. The second sliding guide structure 44 is configured to cooperate with the first sliding guide structure 2236 on the main shaft 223. The second sliding guide structure 44 is located on inner surfaces of the second plate member B2 and the fourth plate member B4. The second sliding guide structure 44 includes a second guide portion 441 and a second limiting portion 442. The second limiting portion 442 is located on a side of the second guide portion 441 away from the front-end face 41 of the sliding member 40. The second guide portion 441 is configured to fit the first guide portion 22361 on the outer surface of the main shaft 223. The second limiting portion 442 is configured to fit the first limiting portion 22362 on the outer surface of the main shaft 223. A side that is of the second limiting portion 442 and that faces the front-end face of the sliding member 40 forms a second limiting step 4421. The second limiting step 4421 is configured to fit the first limiting step 22363 of the first limiting portion 22362 on the main shaft 223, to define a boundary position for sliding of the sliding member 40 toward the front-end of the main shaft 223. The second limiting portion 442 and the second guide portion 441 form a T-shaped structure. In this implementation, the second limiting portion 442 and the second guide portion 441 are guide groove structures recessed on the inner surface of the sliding member 40. Alternatively, in another implementation, the second limiting portion 442 and the second guide portion 441 may be guide rail structures protrudingly arranged on the inner surface of the sliding member 40. A step positioning face 45 facing the rear end face 43 of the sliding member 40 is arranged on the inner surface of the sliding member 40, and is configured to position the second elastic member 70.

The second elastic member 70 is elastically connected between the fastening base 224 and the sliding member 40, and the fastening base 224 is fastened to the fastening portion 2237 on the outer surface of the main shaft 223.

Figure 29:
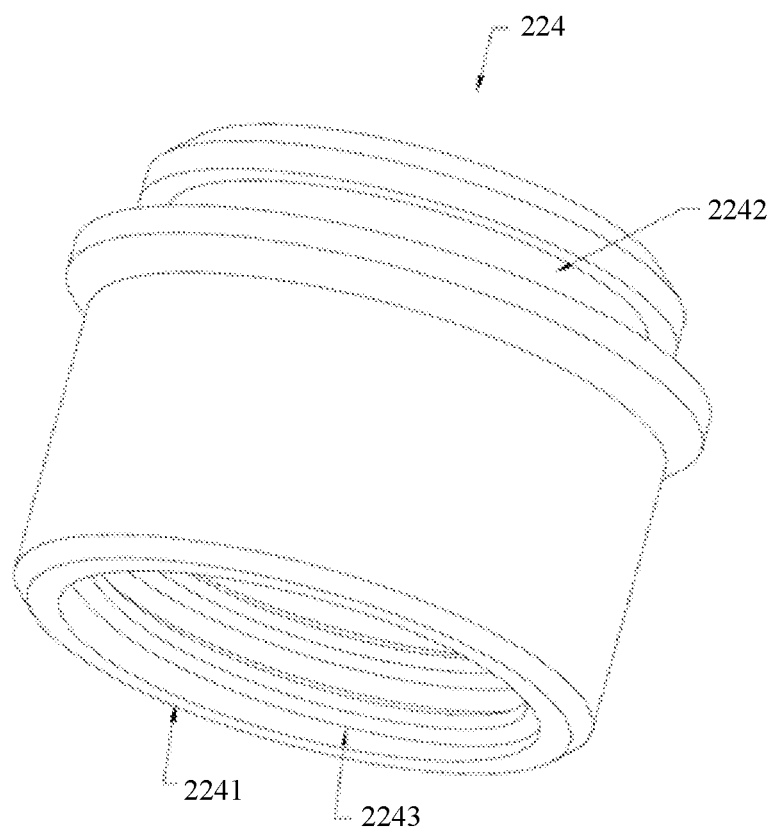
FIG. 29 is a schematic three-dimensional view of a fastening base in a main housing in a connector main part in a fiber connector plug assembly according to an implementation of a first solution.

Refer to FIG. 29. In an implementation, the fastening base 224 includes a front-end face 2241, and a thread 2243 is arranged on an inner surface of the fastening base 224. The fastening base 224 is fastened to the fastening portion 2237 on the main shaft 223 by using a threaded fitting structure, and the threaded fitting structure is connected to the fastening base 224 and the main shaft 223. An axial position of the fastening base 224 on the main shaft 223 may be adjusted by rotating the fastening base 224. The front-end face 2241 of the fastening base 224 is configured to abut against the second elastic member 70. A fastening groove 2242 is arranged on an outer surface of the fastening base 224, and the fastening groove 2242 is located at a position close to a rear end face of the fastening base 224.

Refer to FIG. 6 and FIG. 7. The fastening groove 2242 is configured to fasten a front-end of the tail sleeve 225, and the tail sleeve 225 is sleeved on a periphery of the tail end of the main shaft 223. The heat shrink tube 226 is arranged between an outer surface of the tail end of the main shaft 223 and the tail sleeve 225. The heat shrink tube 226 is connected between the tail end of the main shaft 223 and the fiber 11 outside the main shaft 223, and the heat shrink tube 226 is used to implement a sealing connection between the main shaft 223 and the fiber 11.

For an assembly and cooperation relationship between the elements in the fiber connector plug provided in this implementation, refer to the following descriptions (where the descriptions are performed according to a possible assembly sequence, and refer to FIG. 5, FIG. 6, and FIG. 7).

The rear end of the fastener 222 is inserted into the main shaft 223 from an opening of the front-end of the main shaft 223, and the clasp portion 2223 on the elastic clasp arm 2222 on the fastener 222 fits the limiting table 2239 on the inner surface of the main shaft 223 to fasten the fastener 222 and the main shaft 223. The front-end of the fastener 222 is exposed to a front portion of the main shaft 223. In this implementation, the fastener 222 and the main shaft 223 are designed to be a split structure, and are easy to manufacture and also relatively easy to assemble. In addition, the fastener 222 is fastened to the main shaft 223 by extending into the internal space of the main shaft 223, and the fastener 222 occupies the internal space of the main shaft 223, without increasing a peripheral size of the main shaft 223, thereby facilitating a miniaturization design. In another implementation, alternatively, the fastener 222 and the main shaft 223 may be an integrated structure, that is, the front-end of the main shaft 223 is directly integrally formed as a front-end part of the fastener 222. Although a manufacturing process of the integrated structure is more complex than that of the split architecture, the integrated structure of the fastener 222 and the main shaft 223 has an advantage of lightness and thinness, where "thin" refers to a radial size, because in the radial direction, the fastener 222 and the main shaft 223 are not assembled and connected in an overlapping manner.

The fiber 11 passes through the main shaft 223 and the fastener 222, a part of the fiber core nil at the front-end of the fiber 11 is inserted into the fiber core fastening hole 1251 of the ferrule 12, and the fiber core in is fastened to the ferrule 12 by using curing glue.

With reference to FIG. 18 and FIG. 19, the ferrule 12 extends into the mounting member 221 from the rear end of the mounting member 221, and passes through the mounting member 221. The first limiting face 1244 of the first stop structure 1242 on the ferrule 12 abuts against the second limiting face 2215 of the second stop structure 2213 on the inner surface of the mounting member 221, and the first plane 1243 of the first limiting structure 1241 on the ferrule 12 is in contact with the contact face 2216 of the second stop structure 2213 on the mounting member 221, so that connection positioning between the ferrule 12 and the mounting member 221 is implemented, and the first elastic member 60 is sleeved on the rear section 125 of the ferrule 12.

The mounting member 221 on which the ferrule 12 and the first elastic member 60 are mounted is connected to the main shaft 223. Specifically, the threaded portion 2219 on the rear end of the mounting member 221 is fitted to the external thread 2221 on the front-end of the fastener 222, so that the mounting member 221 is fastened to the main shaft 223. In this state, the bump 2232 on the front-end face 2231 of the main shaft 223 extends into the second cut 2218 on the rear end face of the mounting member 221. The first elastic member 60 abuts between the positioning face 1245 of the first stop structure 1242 of the ferrule 12 and a front-end face of the fastener 222.

The front frame sleeve 21 is sleeved from one side of the front-end of the ferrule 12 to the periphery of the mounting member 221, and the second plane 2142 of the second limiting structure 214 in the front frame sleeve 21 is in contact with the first plane 1243 of the first limiting structure 1241 of the ferrule 12. In this state, the second plane 2142 of the front frame sleeve 21 is coplanar with the contact face 2216 of one of the second stop structures 2213 of the mounting member 221. The second plane 2142 of the front frame sleeve 21 and the contact face 2216 of the other second stop structure 2213 of the mounting member 221 are arranged opposite to each other on two sides of the ferrule 12. The elastic clamping hook 2212 on the mounting member 221 cooperates with the hole 215 on the front frame sleeve 21, to fasten the front frame sleeve 21 and the mounting member 221. In this state, the bump 2232 on the front-end face 2231 of the main shaft 223 extends into the first cut 216 on the rear end face of the front frame sleeve 21 to position the front frame sleeve 21 and the main shaft 223 in the circumferential direction. The rear end face 212 of the front frame sleeve 21 is coplanar with the rear end face 2214 of the mounting member 221. The first cut 216 directly faces the second cut 2218 in the radial direction, and the bump 2232 on the main shaft 223 fits both the first cut 216 and the second cut 2218.

The front-end face 121 of the ferrule 12 is flush with the front-end face 211 of the front frame sleeve 21, or the front-end face 121 of the ferrule 12 is located between the front-end face 211 of the front frame sleeve 21 and the rear end face 212 of the front frame sleeve 21 in the axial direction. It may also be understood that the vertical projection of the front-end face 121 of the ferrule 12 on the front frame sleeve 21 is located on the front-end face 211 of the front frame sleeve 21 or the inner surface of the front frame sleeve 21.

With reference to FIG. 6 and FIG. 7, the front-end face of the sliding member 40 faces the tail end of the main shaft 223 (the fiber needs to pass through the sliding member 40), the sliding member 40 is sleeved on the outer surface of the main shaft 223, and the second sliding guide structure 44 on the inner surface of the sliding member 40 cooperates with the first sliding guide structure 2236 on the outer surface of the main shaft 223, to implement positioning of the sliding member 40 and the main shaft 223 in the circumferential direction. The second sliding guide structure in this implementation is a groove structure, a position indicated by a lead numbered as 44 in FIG. 7 is an inner wall of a groove, and the groove accommodates the first sliding guide structure 2236. With reference to FIG. 27 and FIG. 28, a position between the sliding member 40 and the main shaft 223 is defined in the axial direction through a fit between the second limiting step 4421 of the second limiting portion 442 of the sliding member 40 and the first limiting step 22363 of the first limiting portion 22362 on the outer surface of the main shaft 223.

The second elastic member 70 is sleeved on the main shaft 223, and one end of the second elastic member 70 is mounted in a space between the sliding member 40 and the main shaft 223 and abuts against the step positioning face 45 of the inner surface of the sliding member 40.

The fastening base 224 is mounted to the fastening portion 2237 on the main shaft 223, a front-end of the fastening base 224 abuts against the other end of the second elastic member 70, and the fastening base 224 partially extends into the space between the sliding member 40 and the main shaft 223. In this state, the second elastic member 70 is in a compressed state and pushes the sliding member 40 to the first position by using elastic force, that is, a position of the fit between the second limiting step 4421 of the second limiting portion 442 of the sliding member 40 and the first limiting step 22363 of the first limiting portion 22362 on the outer surface of the main shaft 223.

The sliding member 40 can slide between the first position and the second position. The second position may be determined by using a limiting structure on the main shaft 223, or the second position may not have a determined position provided that in the axial direction, the sliding member 40 is located on a side that is of the first position and that is away from the ferrule. Refer to FIG. 6. The sliding member 40 and the locking portion 2235 on the main shaft 223 jointly form a first locking structure L1, and the first locking structure L1 is configured to cooperate with the second locking structure on the fiber adapter, to fasten the fiber connector plug to the fiber adapter. When the sliding member 40 is at the first position, the sliding member 40 and the locking portion 2235 cooperate to lock the second locking structure. When the sliding member 40 is at the second position, unlocking between the locking portion 2235 and the second locking structure is implemented. A locking groove 47 is formed between the fitting surface 42 of the sliding member 40 and the outer surface of the main housing 22. The locking groove 47 is configured to fit an elastic arm of the second locking structure. An opening of the locking groove 47 is located between the front-end face 41 of the sliding member 40 and the outer surface of the main housing 22. It may be understood that the fitting surface 42 is an inner wall of the locking groove 47. The fitting surface 42 faces the main housing 22. The first region 421 is located between the second region 422 and the opening of the locking groove. A vertical distance between the first region 421 and the main housing 22 is greater than a vertical distance between the second region 422 and the main housing 22. When the sliding member 40 is at the first position, the first region 421 is arranged opposite to the locking portion 2235, and the second region 422 is arranged opposite to the outer surface of the main housing 22. When the sliding member 40 is at the second position, the fitting surface 42 (including the first region 421 and the second region 422) is arranged opposite to the outer surface of the main housing 22.

After the sliding member 40 and the fastening base 224 are mounted to the main shaft 223, a position of the fiber is adjusted. The through hole 2238 on the tail end B of the main shaft 223 corresponds to an exposed part of the reinforced layer 112 of the fiber 11. Glue is dispensed at the through hole 1128 on the tail end B of the main shaft 223, and the reinforced layer 112 of the fiber 11 and the inner surface of the main shaft 223 are fastened by using the glue. In this implementation, the through hole 2238 for glue filling is arranged on the tail end B of the main shaft 223, and the fiber is fastened in a manner of glue filling. When the glue is filled into a gap between the reinforced layer 112 and the main shaft 223, a surface structural form of the reinforced layer 112 is further used, and the surface of the reinforced layer 112 has a glue filling space. In this way, the glue can be in full contact with the fiber 11 and the main shaft 223, thereby improving a fastening effect. In addition, some materials are removed from the main shaft 223, and the fiber is fastened in the main shaft 223 without occupying an external space of the main shaft, thereby facilitating a miniaturization design. In addition, filling the glue into the gap between the main shaft 223 and the fiber 11 can further sealingly connect the fiber 11 to the main shaft 223, so that arrangement of the through hole does not cause a poor sealing effect. To ensure the sealing effect, the heat shrink tube 226 is sleeved at the position of the tail end B of the main shaft 223, so that one part of the heat shrink tube 226 is fastened on the outer surface of the tail end of the main shaft 223. The other part of the heat shrink tube 226 is fastened to an outer layer 113 of a part that is of the fiber 11 and that does not extend into the main shaft 223. The tail sleeve 225 is fastened to a periphery of the heat shrink tube 226, and the front-end of the tail sleeve 225 is fastened in the fastening groove 2242 on the rear end of the fastening base 224. An outer surface of the tail sleeve 225 may be imprinted with a one-dimensional bar code by using a technology such as mold printing or laser marking, for visual recognition.

The sealing structure 30 is sleeved in the sealing groove 2234, and when the fiber connector plug is inserted into the fiber adapter, the sealing ring is sealingly connected between the main shaft 223 and the inner surface of the fiber adapter. The fiber connector plug provided in this implementation is an outdoor fiber connector plug, and has a sealing requirement. The front-end of the main shaft 223 provided in this implementation extends into the fiber adapter 200-1 to implement sealing by using the sealing structure 30, and the tail end of the main shaft 223 implements a sealing connection between the main shaft 223 and the fiber by using the heat shrink tube 226. In this way, only one sealing structure 30 needs to be arranged on the front-end of the main shaft 223, to implement a sealing connection between the fiber connector plug and the fiber adapter.

The following describes in detail the fiber adapter 200-1 that cooperates with the fiber connector plug provided in the first solution.

Figure 30:
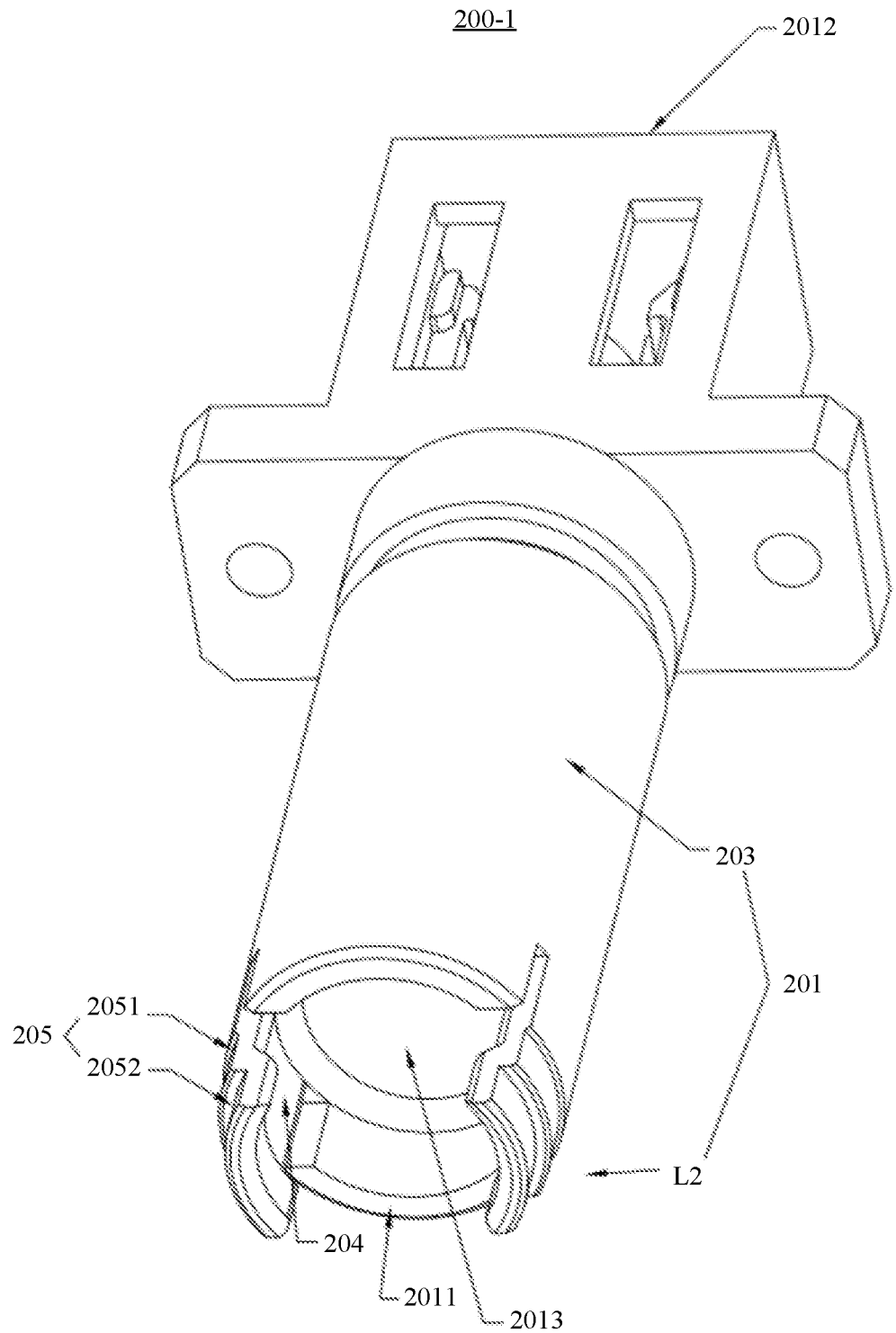
FIG. 30 is a schematic three-dimensional view of an implementation of a fiber adapter in a first solution.
Figure 31:
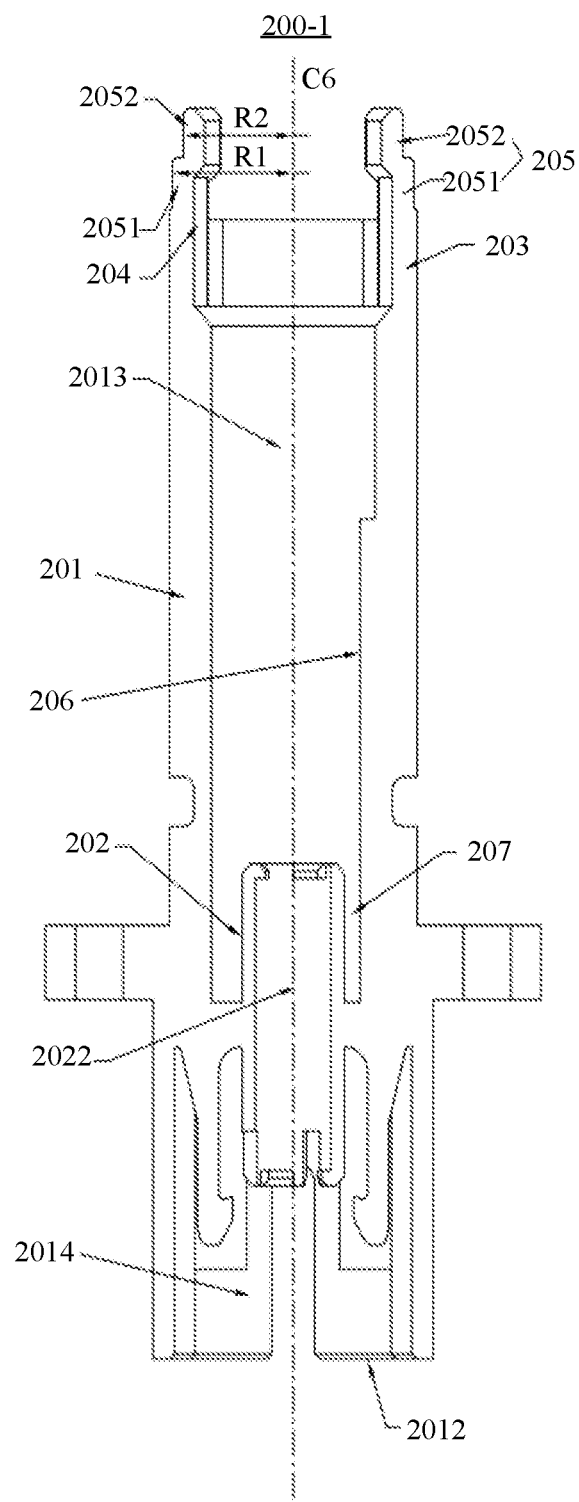
FIG. 31 is a sectional view of an implementation of a fiber adapter in a first solution.

Refer to FIG. 30 and FIG. 31. The fiber adapter 200-1 includes a main body sleeve 201 and a ferrule sleeve 202. The ferrule sleeve 202 is connected inside the main body sleeve 201. The ferrule sleeve 202 and the main body sleeve 201 may be an integrated structure. The main body sleeve 201 includes a first end face 2011 and a second end face 2012. A first accommodating space 2013 located on an inner side of the first end face 2011 and a second accommodating space 2014 located on an inner side of the second end face 2012 are formed inside the main body sleeve 201. A first opening for the first accommodating space 2013 to communicate with the outside is arranged on the first end face 2011. A second opening for the second accommodating space 2014 to communicate with the outside is arranged on the second end face 2012. A ferrule accommodating space 2022 is arranged in the ferrule sleeve 202, and the ferrule accommodating space 2022 is connected between the first accommodating space 2013 and the second accommodating space 2014. The first accommodating space 2013 is for accommodating one fiber connector plug, the second accommodating space 2014 is for accommodating another fiber connector plug, and the ferrule accommodating space 2022 in the ferrule sleeve 202 is for accommodating ferrules of the two fiber connector plugs. In the fiber adapter 200-1 provided in this implementation, the first accommodating space 2013 is for plugging an outdoor fiber connector plug, and the second accommodating space 2014 is for plugging an indoor fiber connector plug. An internal structure of the second accommodating space 2014 and a specific architecture of the indoor fiber connector plug are not limited in this application.

The main body sleeve 201 includes a main body portion 203 and a second locking structure L2. The second locking structure L2 is arranged on one end of the main body portion 203. The second locking structure L2 is located at the first opening in which the first accommodating space 2013 communicates with the outside. The second locking structure L2 includes a clamping groove 204 and an elastic arm 205. The elastic arm 205 is connected to one end of the main body portion 203. In an axial direction, the main body portion 203 is located between the ferrule sleeve 202 and the elastic arm 205, and the clamping groove 204 is located on an inner surface of the main body sleeve 201. The elastic arm 205 of the fiber connector plug extends from one end of the main body portion 203 in the axial direction of the main body sleeve 201. The elastic arm 205 includes a first section 2051 and a second section 2052. The first section is connected between the second section 2052 and the main body portion 203. An outer surface of the elastic arm 205 is a surface of the elastic arm 205 away from the first accommodating space 2013.

Refer to FIG. 31. A vertical distance R1 between an outer surface of the first section 2051 and a central axis C6 of the main body sleeve 201 is greater than a vertical distance R2 between an outer surface of the second section 2052 and the central axis C6 of the main body sleeve 201. Specifically, a part of the clamping groove 204 is located on an inner surface of the main body portion 203, and a part of the clamping groove 204 is located on an inner surface of the elastic arm 205 (specifically, an inner surface of the first section 2051). In a radial direction of the main body sleeve 201, the first section 2051 directly faces the part of the clamping groove 204, and the second section 2052 is located on a periphery of the clamping groove 204.

Figure 32:
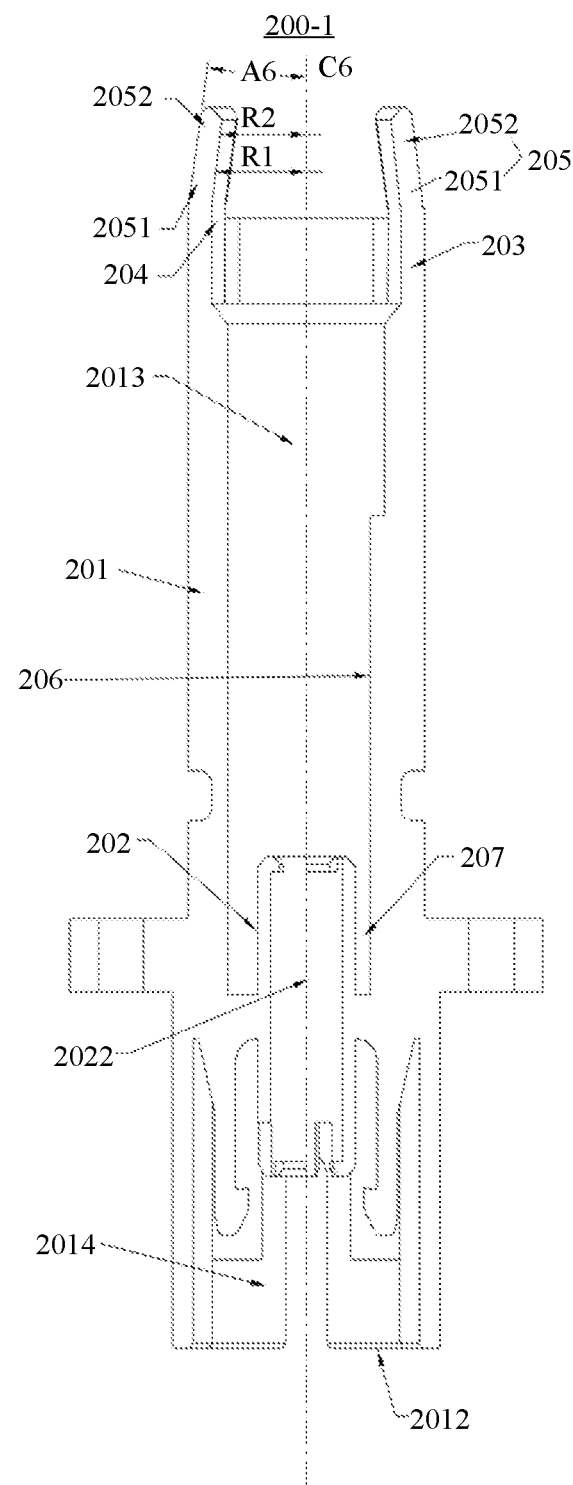
FIG. 32 is a sectional view of an implementation of a fiber adapter in a first solution.

In an implementation, as shown in FIG. 31, the outer surface of the elastic arm 205 is in a stepped shape, that is, a step face is formed between the first section 2051 and the second section 2052. In another implementation, as shown in FIG. 32, an extension direction of an end that is from the main body portion 203 to the second section 2052 and that is away from the main body portion 203 is an extension direction of the elastic arm 205. An included angle A6 is formed between the extension direction of the elastic arm 205 and the axial direction of the main body sleeve 201. FIG. 32 schematically shows that the elastic arm 205 is inclined to extend in the axial direction. A specific inclined angle A6 may be set according to a related feature (that is, a fitting surface) on a sliding member of a specific fiber connector plug.

In an implementation, an etched structure is arranged on the outer surface of the first section 2051 and/or the outer surface of the second section 2052; or a protruding portion is arranged on the outer surface of the elastic arm 205, and the protruding portion is configured to cooperate with the groove on the sliding member 40 of the fiber connector plug.

Refer to FIG. 31 and FIG. 32. A guide key 206 is arranged on the inner surface of the main body portion 203 of the main body sleeve 201. In this implementation, the guide key 206 is protrudingly arranged toward the first accommodating space 2013, and the guide key 206 is configured to cooperate with the first guide structure 213 on the front frame sleeve 21 and provide guidance in a process of inserting the fiber connector plug into the fiber adapter 200-1. A first slot 207 is formed between the main body sleeve 201 and the ferrule sleeve 202. The first slot 207 is configured to accommodate the front frame sleeve 21 in the fiber connector plug. The first slot 207 between the main body sleeve 201 and the ferrule sleeve 202 cooperates with the front frame sleeve 21 of the fiber connector plug 100 through, the inner surface of the main body sleeve 201 is in contact cooperation with the outer surface of the front frame sleeve 21, and the guide key 206 is configured to cooperate with the first guide structure 213 on the front frame sleeve 21, so that the fiber adapter 200-1 provided in this implementation implements cooperation between the fiber adapter 200-1 and the fiber connector plug. For the fiber adapter 200-1, a structure of the fiber adapter 200-1 is simplified. The fiber connector plug inserted into the fiber adapter 200-1 is aligned by using the first slot 207 and the inner surface of the main body sleeve 201. A radial size may be designed to match the front frame sleeve 21 of the fiber connector plug, and has an advantage of a small size.

Figure 33:
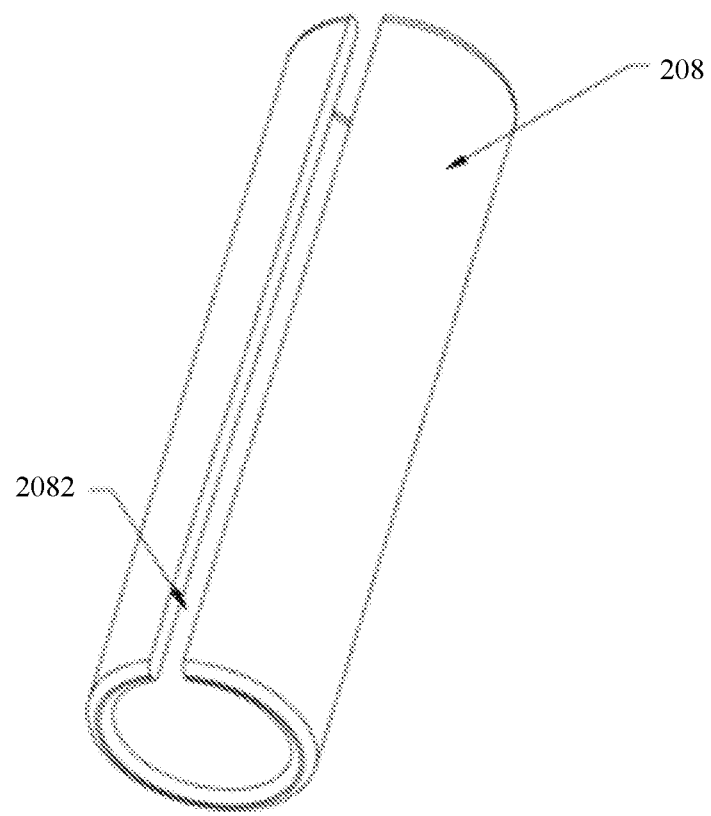
FIG. 33 is a schematic three-dimensional view of a ceramic sleeve in the fiber adapter shown in FIG. 30.

Refer to FIG. 33. The fiber adapter 200-1 provided in this application further includes a ceramic sleeve 208, and the ceramic sleeve 208 is mounted inside the ferrule sleeve 202. The ceramic sleeve 208 is provided with a cut 2082. The cut 2082 extends from one end of the ceramic sleeve 208 to the other end in the axial direction. Arrangement of the cut 2082 makes a radial size of the ceramic sleeve 208 adjustable, so that a close fit between the ceramic sleeve 208 and the ferrule sleeve 202 can be implemented. An internal space of the ceramic sleeve 208 is for accommodating the ferrule. Specifically, the ceramic sleeve 208 is configured to clamp the front section 123 of the ferrule 12. An outer diameter size of the front section 123 of the ferrule 12 is slightly greater than an inner diameter of the ceramic sleeve 208. In this way, when the front section 123 is inserted into the ceramic sleeve 208, the ceramic sleeve 208 is forced to open, so that the ceramic sleeve 208 clamps the front section 123.

Figure 34:
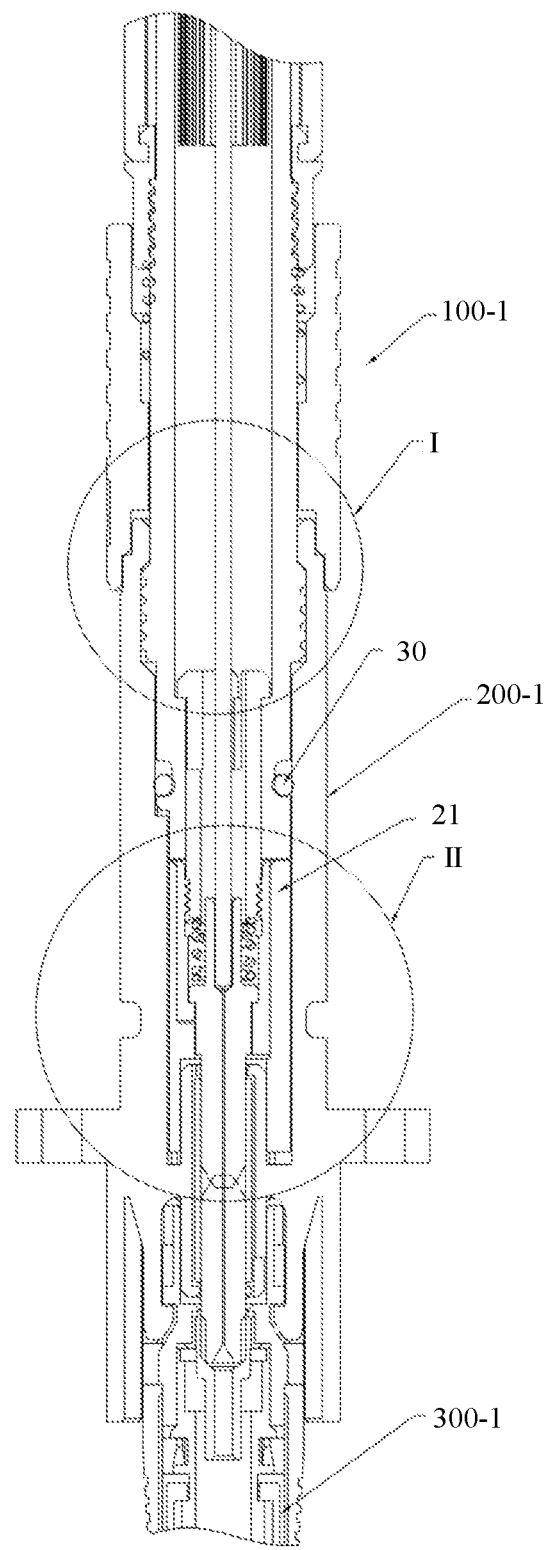
FIG. 34 is a schematic sectional view after a fiber connector plug formed by mounting an integrated kit to a connector main part in a fiber connector plug assembly is inserted into a corresponding fiber adapter according to an implementation of a first solution.
Figure 35:
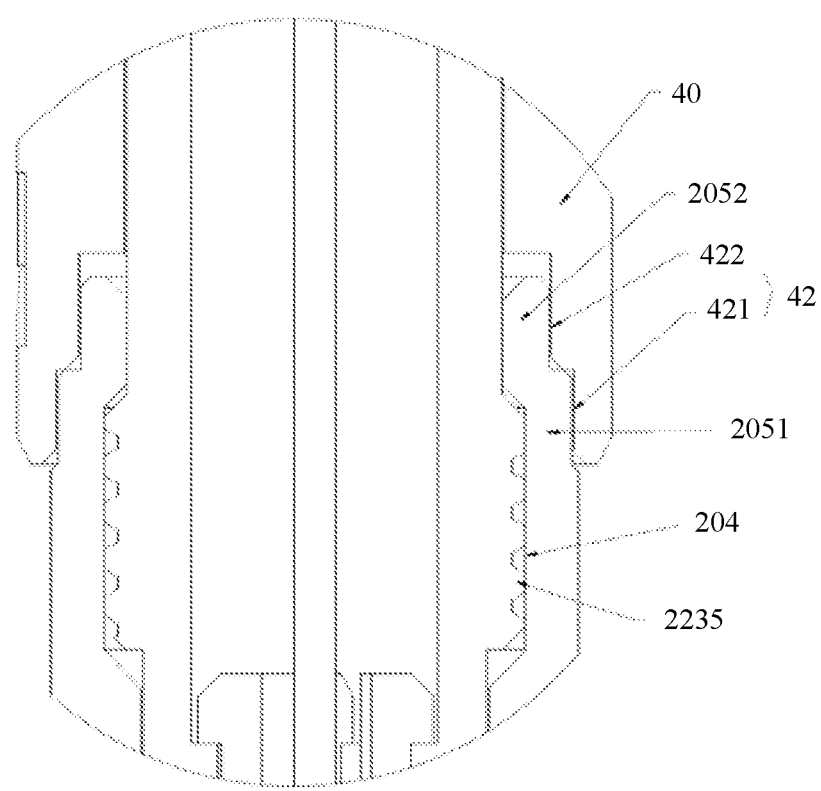
FIG. 35 is a schematic enlarged view of a part I in FIG. 34.

FIG. 34 is a schematic sectional view in which the connector main part 100-1 and the integrated kit 21 after being assembled are inserted into the fiber adapter 200-1 and are in a locked state in the first solution, where the other end of the fiber adapter 200-1 is plugged in the peer fiber connector plug 300-1. FIG. 35 is a schematic enlarged view of a part I in FIG. 34, and FIG. 36 is a schematic enlarged view of a part II in FIG. 34.

Figure 37:
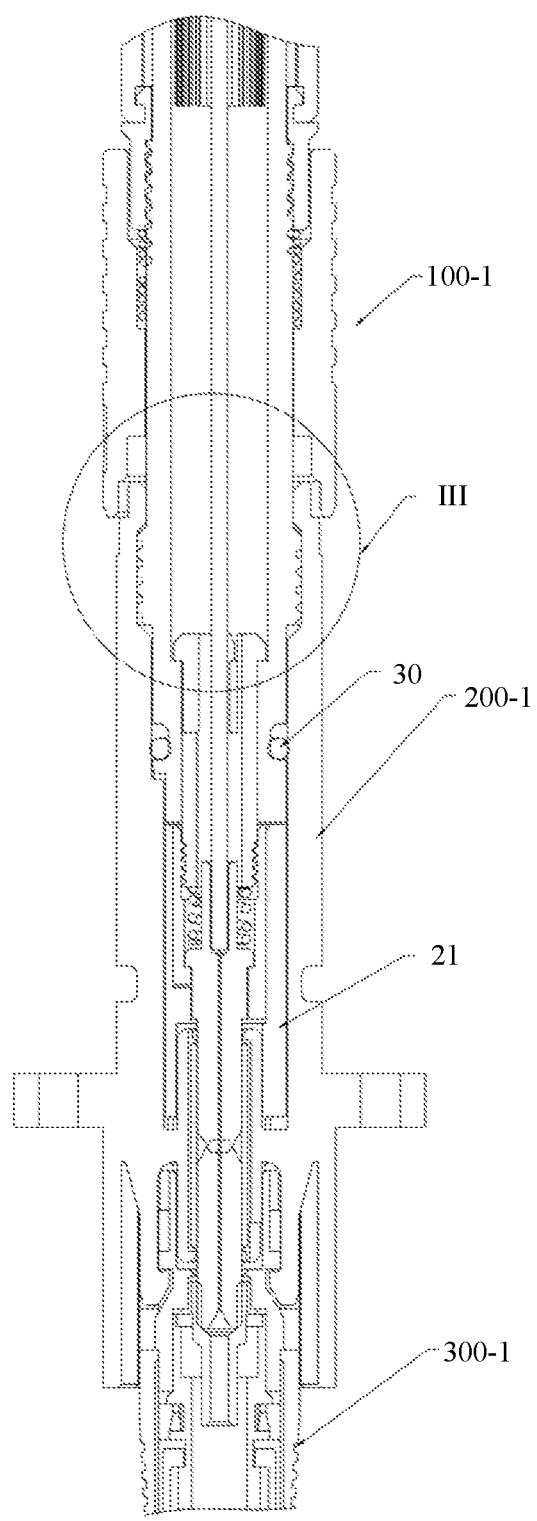
FIG. 37 is another schematic sectional view after a fiber connector plug formed by mounting an integrated kit to a connector main part in a fiber connector plug assembly is inserted into a corresponding fiber adapter according to an implementation of a first solution.
Figure 38:
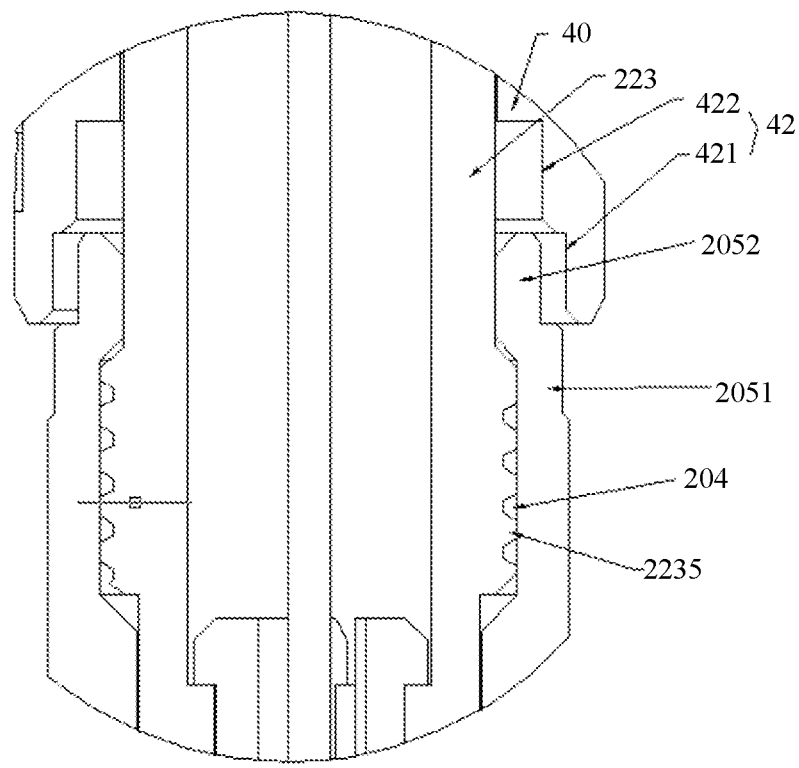
FIG. 38 is a schematic enlarged view of a part III in FIG. 37.

FIG. 37 is a schematic sectional view in which the connector main part 100-1 and the integrated kit 21 after being assembled are inserted into the fiber adapter 200-1 and are in an unlocked state in the first solution. FIG. 38 is a schematic enlarged view of a part III in FIG. 37;

It can be seen from FIG. 34 that, in the fiber adapter 200-1, the sealing structure 30 implements a sealing connection between the fiber connector plug and the corresponding fiber adapter 200-1.

Figure 36:
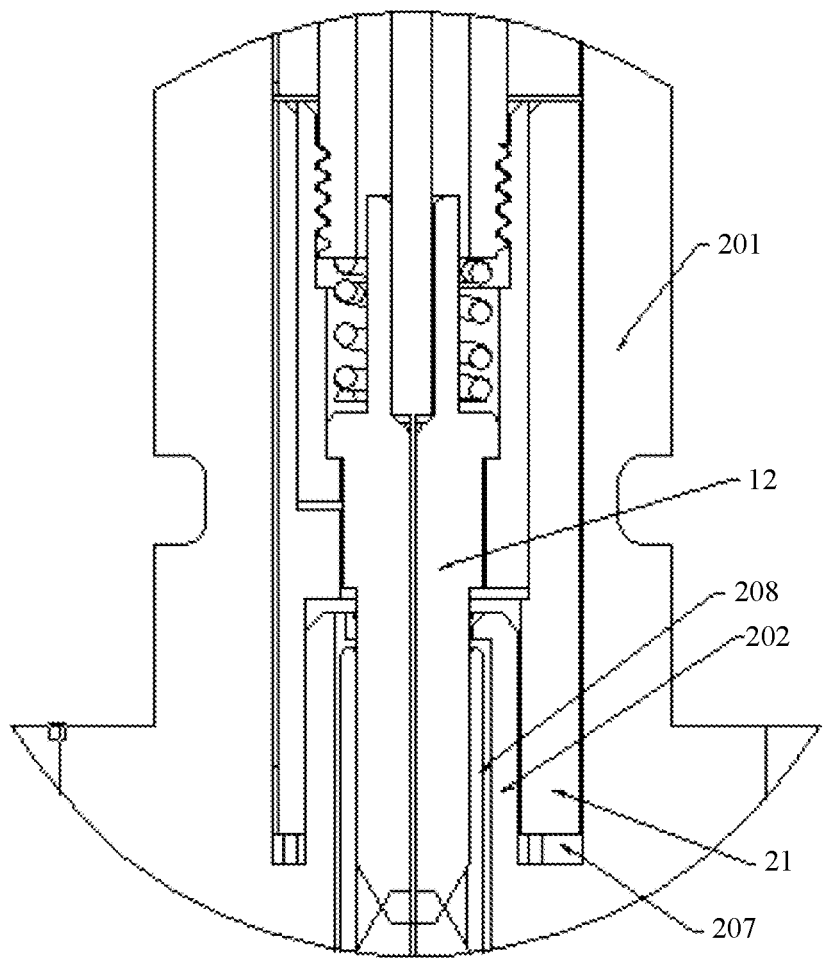
FIG. 36 is a schematic enlarged view of a part II in FIG. 34.

As shown in FIG. 36, after the fiber connector plug is inserted into the fiber adapter 200-1, the front frame sleeve 21 of the fiber connector plug is inserted into the first slot 207, the ferrule 12 is inserted into the ferrule sleeve 202 and is enclosed by the ceramic sleeve 208, and the outer surface of the front frame sleeve 21 is in contact with the inner surface of the main body sleeve 201.

FIG. 34 shows a locked state after the fiber connector plug is inserted into the fiber adapter 200-1. As shown in FIG. 35, the sliding member 40 is at the first position, the locking portion 2235 of the fiber connector plug cooperates with the clamping groove 204 of the fiber adapter, the first region 421 of the fitting surface 42 abuts against the first section 2051 of the elastic arm 205, and the second region 422 of the fitting surface 42 abuts against the second section 2052 of the elastic arm 205, to implement a dual-step locking structure.

FIG. 37 shows an unlocked state after the fiber connector plug is inserted into the fiber adapter 200-1. As shown in FIG. 38, the sliding member 40 is at the second position, the first region 421 of the fitting surface 42 is located on a periphery of the second section 2052 of the elastic arm 205, the first region 421 and the second section 2052 have no abutting relationship, the first region 421 and the second section 2052 are separated from each other, a gap is formed between the first region 421 and the second section 2052, and the second region 422 directly faces the outer surface of the main shaft 223 of the fiber connector plug. A gap is formed between the fitting surface 42 and the elastic arm 205, and the elastic arm 205 may open. Therefore, in this case, although the locking portion 2235 of the fiber connector plug is located in the clamping groove 204 of the fiber adapter, the fiber connector plug may still be pulled out of the fiber adapter 200-1.

Figure 39:
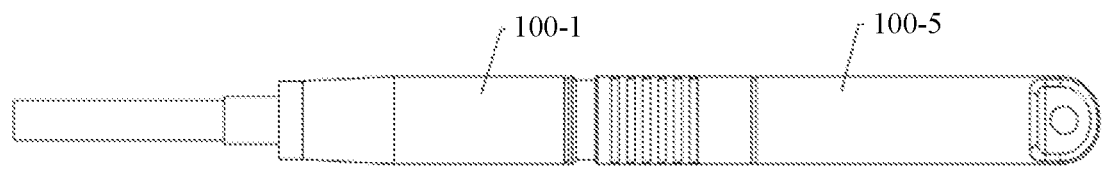
FIG. 39 is a schematic view of mounting a traction cap to a fiber connector plug formed by mounting an integrated kit to a connector main part in a fiber connector plug assembly according to an implementation of a first solution.
Figure 40:
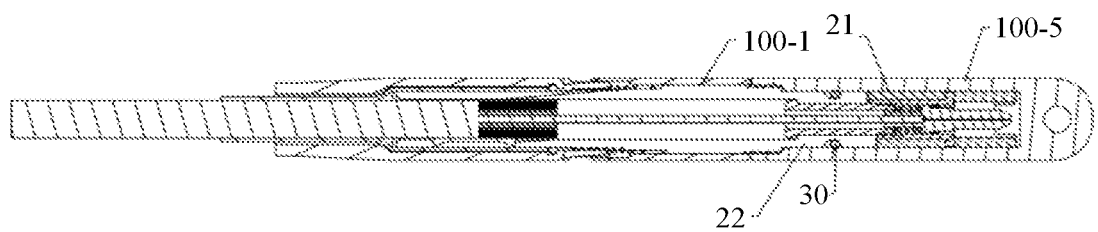
FIG. 40 is a sectional view of FIG. 39.

FIG. 39 and FIG. 40 are schematic views of cooperation between a fiber connector plug formed by assembling the connector main part 100-1 and the integrated kit (that is, the front frame sleeve 21) and a traction cap 100-5 in the first solution. The traction cap 100-5 is sleeved on a periphery of the integrated kit (that is, the front frame sleeve 21), and is fastened to the main housing 22, and the traction cap 100-5 is fastened to the main housing 22 in a threaded connection manner. An inner surface of the traction cap 100-5 is in contact with the outer surface of the integrated kit (that is, the front frame sleeve 21), and is also in contact with an outer surface of a part of the main housing 22. A sealing structure 30 is arranged between the traction cap 100-5 and the main housing 22. Connection strength between the traction cap 100-5 and the main housing 22 is greater than connection strength between the integrated kit (that is, the front frame sleeve 21) and the main housing 22. Therefore, in this implementation, the traction cap 100-5 is connected to the main housing 22, so that the fiber connector plug can be pulled and protected in a scenario in which the fiber connector plug is threaded. The traction cap 100-5 may also be directly assembled to the connector main part 100-1, that is, the traction cap 100-5 is directly mounted when the connector main part 100-1 is not assembled with the integrated kit (that is, the front frame sleeve 21). After the connector main part 100-1 is threaded through the traction cap 100-5, the traction cap 100-5 is removed, and then the integrated kit (that is, the front frame sleeve 21) is mounted to the connector main part 100-1.

In the second solution, a specific implementation of the fiber connector plug formed by the assembly kit 21A and the connector main part 100-1 is described in detail as follows.

The connector main part 100-1 and the connector main part 100-1 that cooperates with the integrated kit in the first solution have the same structure.

Figure 41:
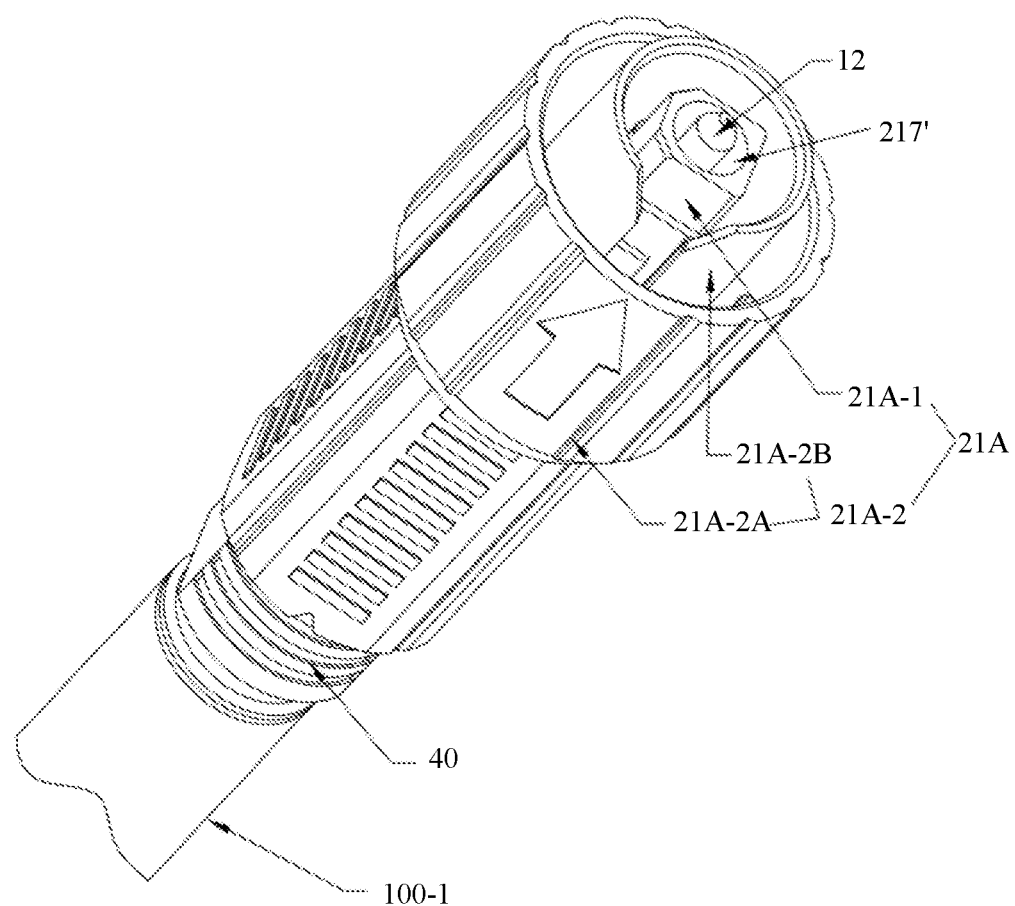
FIG. 41 is a schematic three-dimensional view of a fiber connector plug assembly formed by mounting an assembly kit to a connector main part in a fiber connector plug assembly according to an implementation of a second solution.

Refer to FIG. 41. An intermediate member 21A-1 of an assembly kit 21A is in a sleeve shape, the intermediate member 21A-1 is arranged around a periphery of a front section 123 of a ferrule 12, and a slot 217' is formed between the intermediate member 21A-1 and the front section 123. A plug-in member 21A-2 of the assembly kit 21A is in a sleeve shape, and is arranged around a periphery of the intermediate member 21-1. The plug-in member 21A-2 includes an outer sleeve 21A-2A and a guide sleeve 21A-2B, the guide sleeve 21A-2B surrounds the intermediate member 21A-1, and the outer sleeve 21A-2A surrounds the guide sleeve 21A-2B. A sliding member 40 on a connector main part 100-1 partially extends into the plug-in member 21A-2, and is configured to connect the plug-in member 21A-2.

Figure 42:
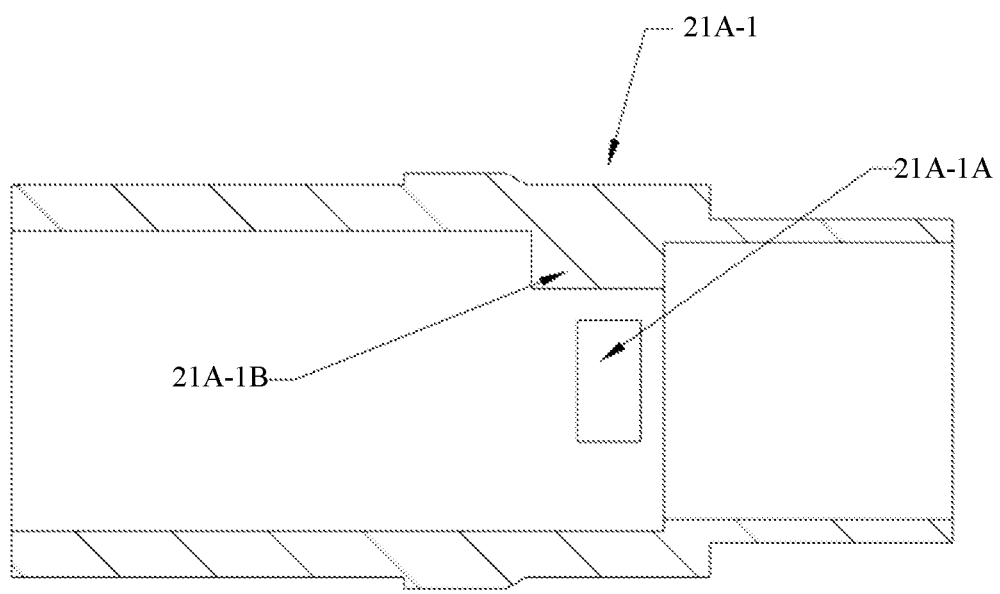
FIG. 42 is a sectional view of an intermediate member in an assembly kit in a fiber connector plug assembly according to an implementation of a second solution.

Refer to FIG. 42. The intermediate member 21A-1 is provided with a hole 21A-1A that penetrates an inner surface and an outer surface of the intermediate member 21A-1, and the hole 21A-1A is used to detachably connect to a main housing 22 on the connector main part 100-1. It may be understood that a concave clamping groove may be arranged on the inner surface of the intermediate member 21A-1 to replace the hole 21A-1A. A limiting structure 21A-1B is arranged on the inner surface of the intermediate member 21A-1. The limiting structure 21A-1B is configured to cooperate with the ferrule 12 to implement positioning of the ferrule 12. On one hand, the ferrule 12 is restricted from rotating relative to the intermediate member 21A-1, and on the other hand, the ferrule 12 can be prevented from axially moving out of a front-end of the intermediate member 21A-1.

Figure 43:
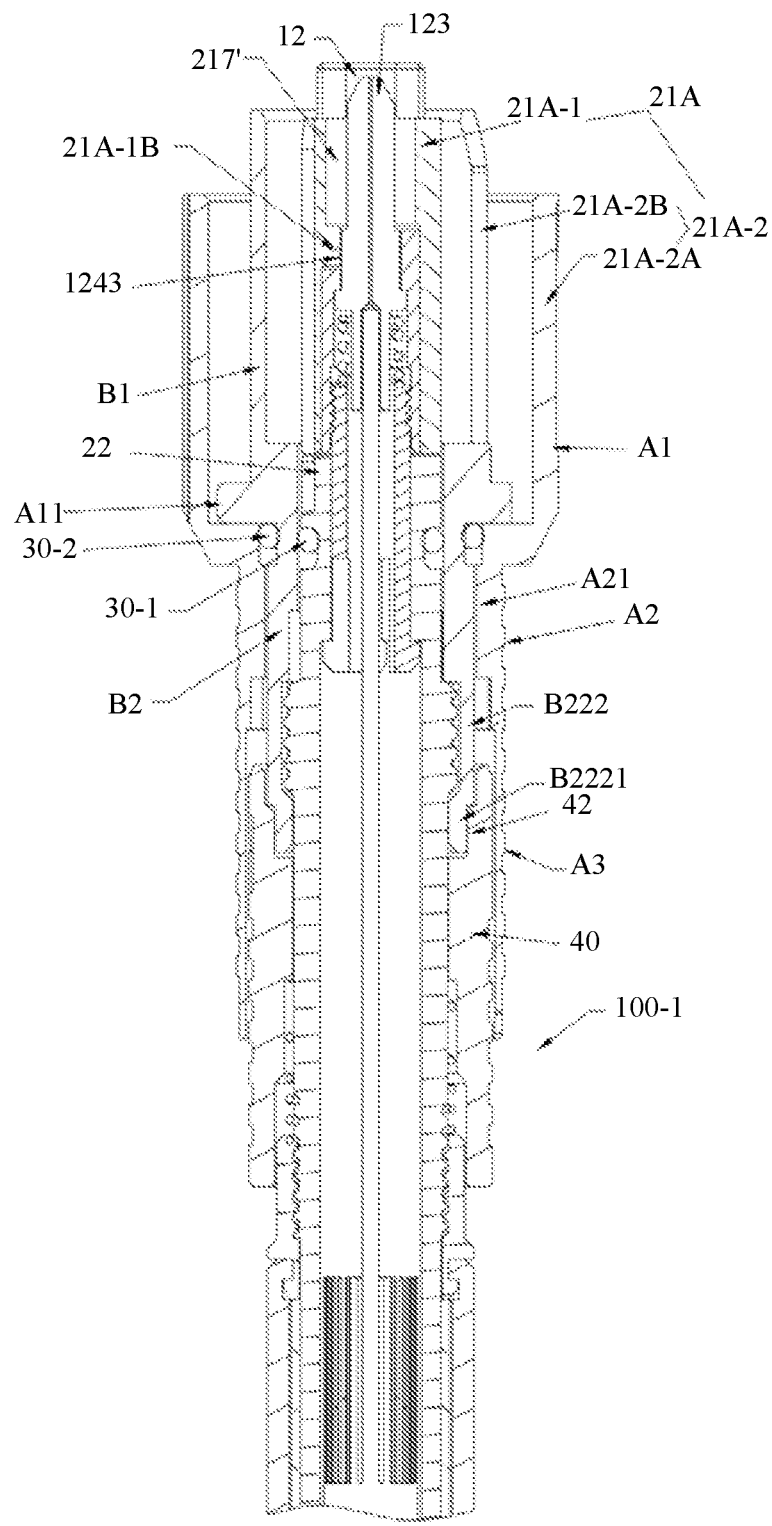
FIG. 43 is a sectional view of a fiber connector plug assembly according to an implementation of a second solution.
Figure 44:
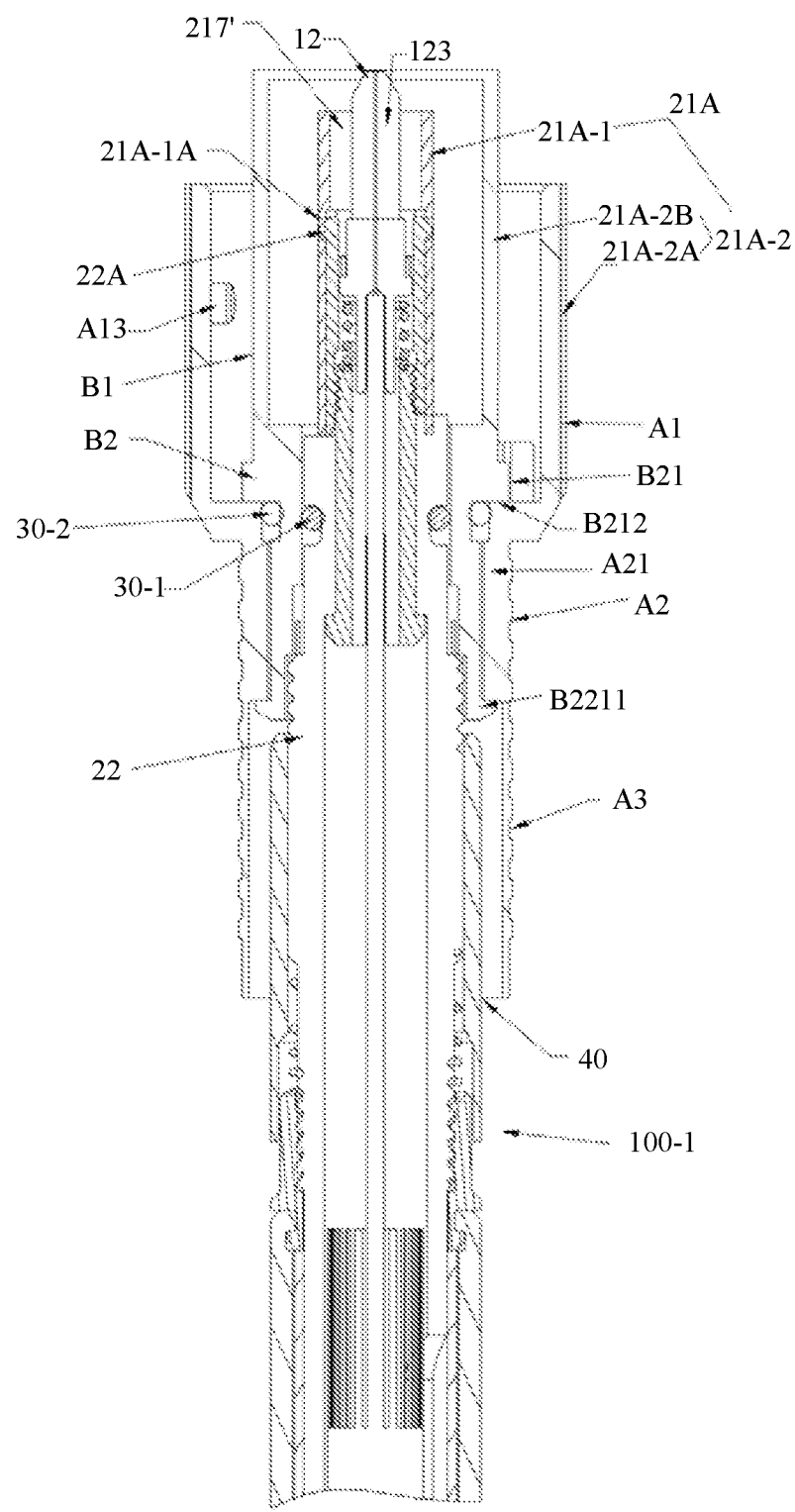
FIG. 44 is a sectional view of a fiber connector plug assembly according to an implementation of a second solution in another direction.

Refer to FIG. 43 and FIG. 44. A position of the intermediate member 21A-1 on the connector main part 100-1 is similar to a position of the integrated kit 21 on the connector main part 100-1 in the foregoing first solution. However, the intermediate member 21A-1 in the second solution does not have a cooperation structure (for example, a guide structure) for connecting to a fiber adapter, and may not have a function of protecting a front-end face of the ferrule. A front-end of the intermediate member 21A-1 is arranged corresponding to a side surface of the front section 123 of the ferrule 12, and a part region of a front-end of the front section 123 of the ferrule 12 is exposed outside the intermediate member 21A-1. A rear end face of the intermediate member 21A-1 is connected to a front-end of the main housing 22 of the connector main part 100-1. Refer to FIG. 44. The main housing 22 partially extends into an inner side of the intermediate member 21A-1, and an elastic clamping hook 22A on the main housing 22 cooperates with the hole 21-1A of the intermediate member 21A-1, to implement a detachable connection between the intermediate member 21A-1 and the main housing 22. A specific connection structure between the intermediate member 21A-1 and the connector main part 100-1 may be the same as a specific connection structure between the integrated kit 21 and the connector main part 100-1 in the foregoing first solution. Refer to FIG. 43. The limiting structure 21A-1B of the intermediate member 21A-1 is configured to cooperate with a first plane 1243 of the ferrule 12, to implement positioning of the ferrule 12. On one hand, the ferrule 12 is restricted from rotating relative to the intermediate member 21A-1, and on the other hand, the ferrule 12 can be prevented from axially moving out of the front-end of the intermediate member 21A-1. A specific structure of the ferrule 12 and a cooperation structure between the intermediate member 21A-1 and the first plane 1243 of the ferrule 12 may be the same as a specific structure of the ferrule and a cooperation structure between the integrated kit 21 and the ferrule 12 in the first solution.

Figure 45:
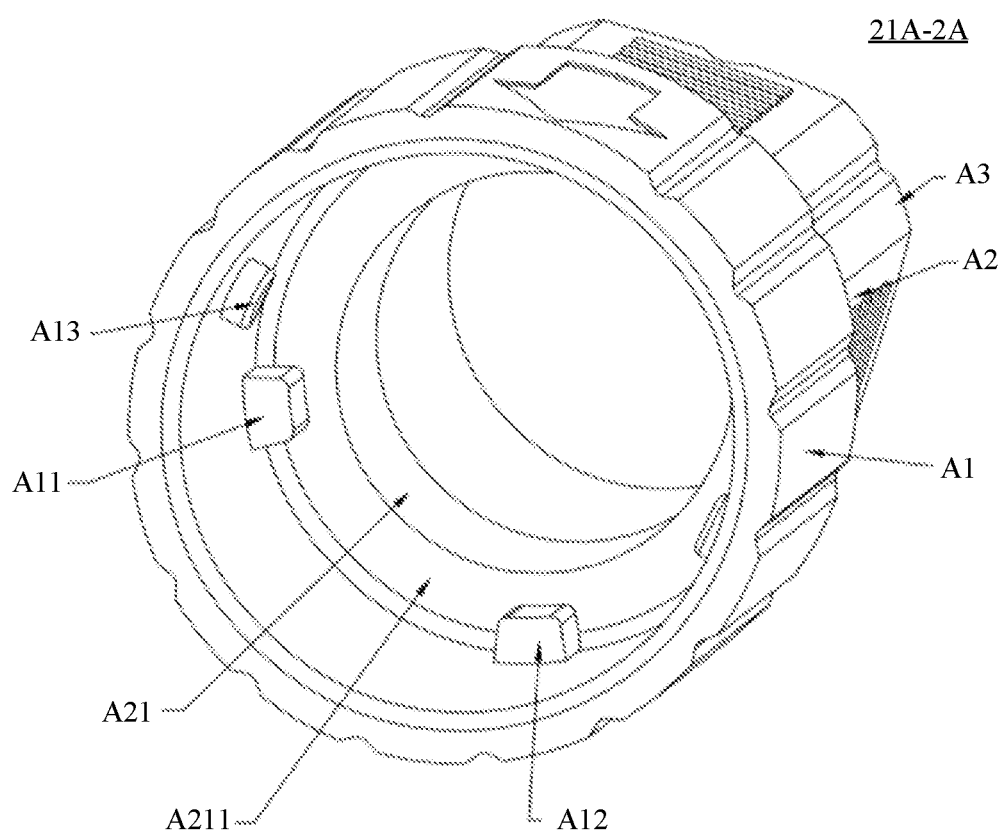
FIG. 45 is a three-dimensional view of a plug-in member in an assembly kit in a second solution in one direction.
Figure 46:
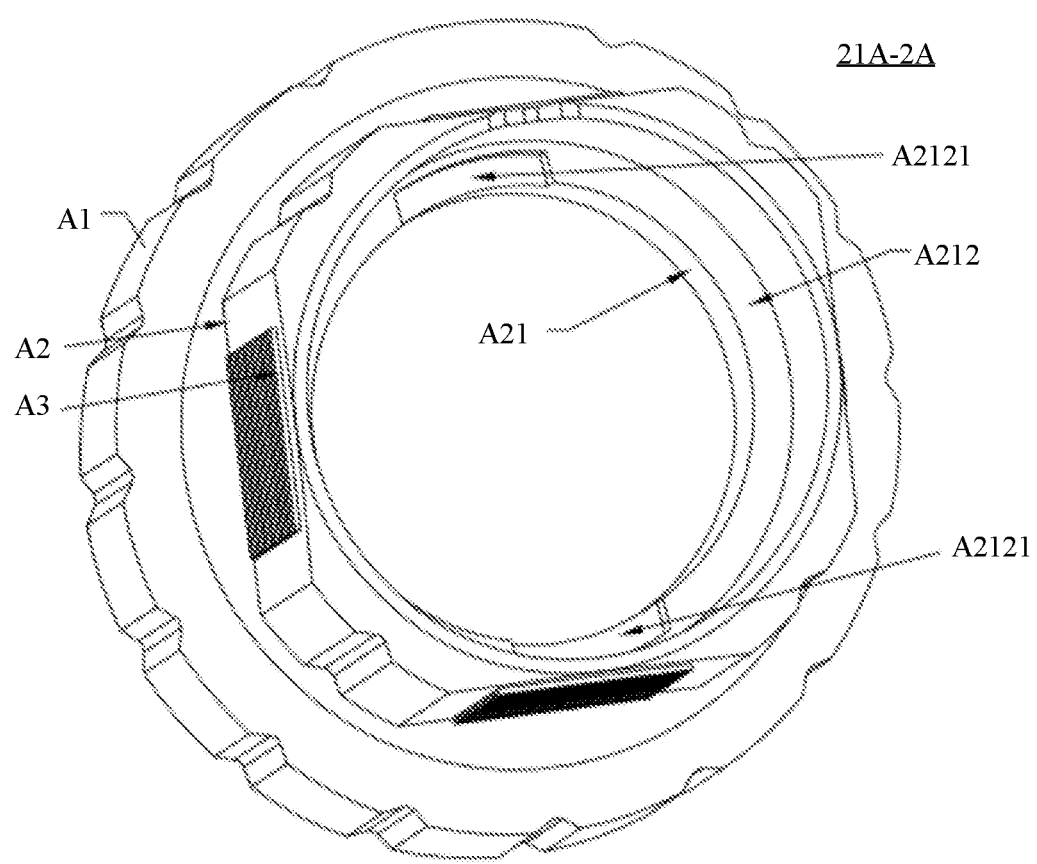
FIG. 46 is a three-dimensional view of a plug-in member in an assembly kit in a second solution in another direction.

Refer to FIG. 43, FIG. 44, FIG. 45, and FIG. 46. An outer sleeve 21A-2A of the plug-in member 21A-2 includes a fitting portion A1, a connecting portion A2, and a blocking portion A3 that are sequentially connected. Positions of the fitting portion A1, the connecting portion A2, and the blocking portion A3 can be clearly seen in FIG. 43 and FIG. 44. Due to an angle problem, a boundary between the connecting portion A2 and the blocking portion A3 is not obvious in FIG. 45 and FIG. 46. FIG. 45 and FIG. 46 mainly express a feature of an inner surface of the outer sleeve 21A-2A. A positioning structure A21 is protrudingly arranged on the inner surface of the outer sleeve 21A-2A. The positioning structure A21 is located on an inner surface of the connecting portion A2. The positioning structure A21 includes a first positioning face A211 and a second positioning face A212 that are arranged opposite to each other. The first positioning face A211 faces a side of the fitting portion A1, which may also be understood as that the first positioning face A211 faces a front-end of the outer sleeve 21A-2A. The second positioning face A212 faces a side of the blocking portion A3, which may also be understood as that the second positioning face A212 faces a rear end of the outer sleeve 21A-2A. An extension direction of the first positioning face A211 is perpendicular to an axial direction of the outer sleeve 21A-2A. A pair of limiting grooves A2121 (as shown in FIG. 46) are arranged on the second positioning face A212. A first limiting column A11 and a second limiting column A12 are protrudingly arranged on an inner surface of the fitting portion A1. The first limiting column A11 and the second limiting column A12 are distributed at an interval in a same circumference. In a steering direction, the first limiting column A11 and the second limiting column A12 are protrudingly arranged on the first positioning face A211. The first limiting column A11 and the second limiting column A12 are configured to limit a rotation angle of the outer sleeve 21A-2A relative to the guide sleeve 21-2B. A sliding block A13 is further arranged on the inner surface of the fitting portion A1. In an axial direction, the sliding block A13 is located on front sides of the first limiting column A11 and the second limiting column A12, and the first positioning face A211 is located on rear sides of the first limiting column A11 and the second limiting column A12. The sliding block A13 is configured to cooperate with a chute on the fiber adapter, to implement locking and unlocking between the fiber connector plug and the fiber adapter.

Figure 47:
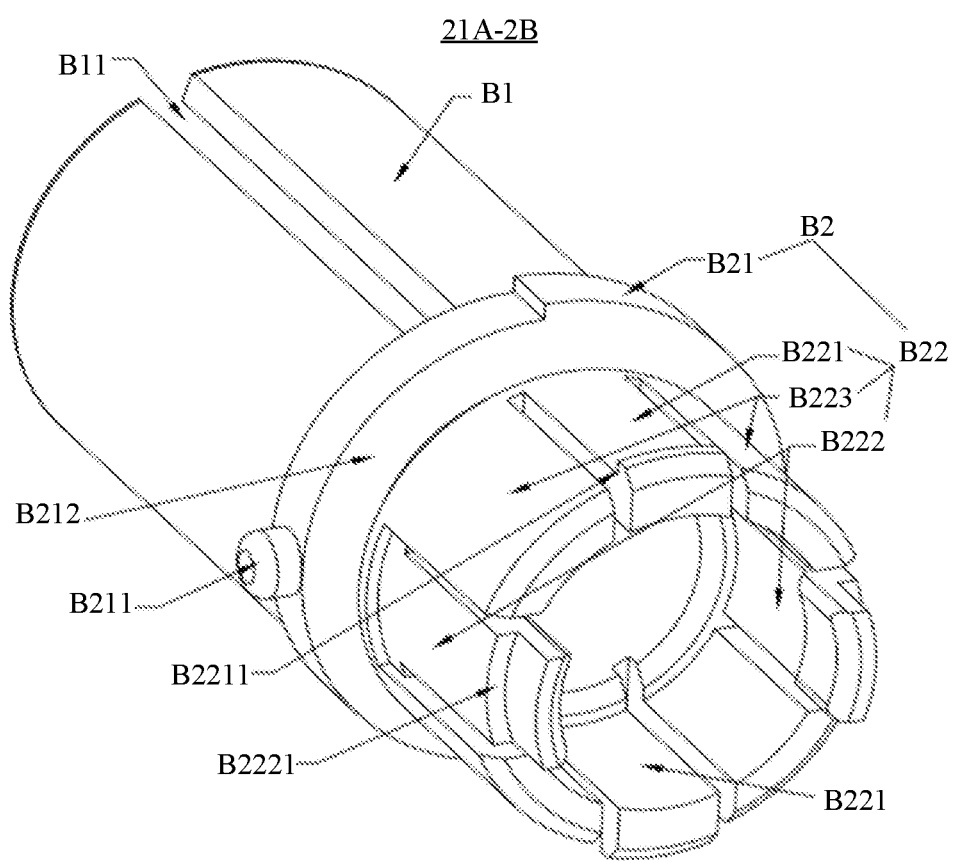
FIG. 47 is a three-dimensional view of an intermediate member in an assembly kit in a second solution.

Refer to FIG. 43, FIG. 44, and FIG. 47. The guide sleeve 21A-2B includes a guide section B1 and a fastening section B2 that are sequentially connected axially. The guide section B1 is in a hollow tubular shape, and both an inner wall and an outer wall of the guide section B1 are smooth surfaces without a protruding structure. The guide section B1 surrounds the periphery of the intermediate member 21-1, and an annular cavity is formed between the guide section B1 and the intermediate member 21-1. In a radial direction, a front-end face of the guide section B1 is correspondingly arranged at a position of a front-end face of the ferrule 12 or a front portion of the front-end face of the ferrule 12. That is, the front-end face of the ferrule 12 is located in an enclosing space of the guide section B1 or is flush with the front-end face of the guide section B1. In this way, the guide sleeve 21-2B can have a function of protecting the front-end face of the ferrule 12. The guide section B1 includes a guide groove or guide cut B11. The guide groove or guide cut B11 axially extends, and extends from a front-end of the guide section B1 to a direction of the fastening section B2. The guide groove or guide cut B11 is configured to cooperate with a guide structure in the fiber adapter, and plays a guide role in a process of plugging the fiber connector plug in the fiber adapter. The fastening section B2 includes a limiting convex ring B21 and a limiting section B22. The limiting convex ring B21 is located between the guide section B1 and the limiting section B22 and is of a protruding flange structure. A third limiting column B211 is protrudingly arranged on a periphery of the limiting convex ring B21. An end face of the limiting convex ring B21 facing the limiting section B22 is a third positioning face B212. Specifically, a plane in which the third positioning face B212 is located is perpendicular to an axial direction of the guide sleeve 21A-2B. The limiting section B22 includes two first elastic arms B221 that are oppositely arranged on two sides of an axis of the guide sleeve 21A-2B, two second elastic arms B222 that are oppositely arranged on the two sides of the axis of the guide sleeve 21A-2B, and four spacing sections B223. The four spacing sections B223 are pairwise and symmetrically arranged, and are distributed between the first elastic arms B221 and the second elastic arms B222 in a circumferential direction. The spacing sections B223 are at the two sides of the first elastic arm B221, and a cut gap is provided between the first elastic arm B221 and the spacing section B223. Similarly, the spacing sections B223 are at the two sides of the second elastic arm B222, and a cut gap is provided between the second elastic arm B222 and the spacing section B223. In this way, the first elastic arms B221 and the second elastic arms B222 can generate radial swing under external force. A clamping hook structure B2211 is arranged on a tail end (that is, an end away from the limiting convex ring B21) of the first elastic arm B221. In the radial direction, the clamping hook structure B2211 protrudes towards an outer side of the guide sleeve 21A-2B. A clamping portion B2221 is arranged on a tail end (that is, an end away from the limiting convex ring B21) of the second elastic arm B222. In the radial direction, the clamping portion B2221 is protrudingly arranged toward an inner side of the guide sleeve 21A-2B, the clamping portion B2221 is in a step shape, and the clamping portion B2221 and a main body part of the second elastic arm B222 jointly form a dual-step structure. In the axial direction, the clamping portion B2221 is located on a side that is of the clamping hook structure B2211 and that is of a tail end of the spacing section B223 away from the limiting convex ring B21. It may be understood that, in the axial direction, an end face of the clamping hook structure B2211 and an end face of the spacing section B223 jointly form an end face of the guide sleeve 21A-2B, and the clamping portion B2221 protrudes from the end face of the guide sleeve 21A-2B.

Refer to FIG. 44. The outer sleeve 21A-2A and the guide sleeve 21A-2B are interconnected to form a structure of the integrated plug-in member 21A-2, and the outer sleeve 21A-2A is fastened by using the limiting convex ring B21 of the guide sleeve 21A-2B and the first elastic arm B221. Specifically, the positioning structure A21 on the inner surface of the outer sleeve 21A-2A is clamped between the limiting convex ring B21 of the guide sleeve 21A-2B and the clamping hook structure B2211, the first positioning face A211 abuts against the third positioning face B212, and the clamping hook structure B2211 is clamped in the limiting groove A2121 on the second positioning face A212, so that the outer sleeve 21A-2A can be connected to the guide sleeve 21A-2B. Specifically, this connection architecture implements axial limiting between the outer sleeve 21A-2A and the guide sleeve 21A-2B, and the outer sleeve 21A-2A can rotate relative to the guide sleeve 21A-2B in the circumferential direction. After the outer sleeve 21A-2A and the guide sleeve 21A-2B are interconnected, a front-end of the guide sleeve 21A-2B protrudes from the outer sleeve 21A-2A and is exposed. An exposed part of the guide sleeve 21A-2B is configured to facilitate positioning and observation in a process of insertion into the fiber adapter. An operator can see the exposed part of the guide sleeve 21A-2B, so that alignment in the plug-in process is easily implemented. External force enables the first elastic arm B221 to open to an internal space of the guide sleeve 21A-2B, so that the clamping hook structure B2211 detaches from the limiting groove A2121, and the outer sleeve 21A-2A can be removed from the guide sleeve 21A-2B.

After the outer sleeve 21A-2A and the guide sleeve 21A-2B are interconnected, the third limiting column B211 on the periphery of the limiting convex ring B21 is located between the first limiting column A11 and the second limiting column A12. In this way, in a process in which the outer sleeve 21A-2A rotates relative to the guide sleeve 21A-2B, the first limiting column A11 and the second limiting column A12 can stop the third limiting column B211, and restrict relative rotation travel between the outer sleeve 21A-2A and the guide sleeve 21A-2B.

Refer to FIG. 43. In this implementation, the plug-in member 21A-2 is connected to the main housing 22 through cooperation between the clamping portion B2221 on the tail end of the second elastic arm B222 of the guide sleeve 21A-2B and the fitting surface 42 of the sliding member 40 on the connector main part 100-1. Cooperation (including structures and principles of locking and unlocking) between the second elastic arm B222 and the fitting surface 42 of the sliding member 40 is the same as cooperation (including structures and principles of locking and unlocking) between the fitting surface 42 of the sliding member 40 and the elastic arm 205 of the second locking structure L2 on the fiber adapter provided in the first solution. Details are not described again.

As shown in FIG. 43 and FIG. 44, in the second solution, the fiber connector plug includes two levels of sealing, that is, includes a first sealing structure 30-1 and a second sealing structure 30-2. The first sealing structure 30-1 is located between the main housing 22 of the connector main part 100-1 and an inner surface of the guide sleeve 21A-2B to form a sealing connection structure. The second sealing structure 30-2 is located between the guide sleeve 21A-2B and the inner surface of the outer sleeve 21A-2A to form a sealing connection structure.

In the first solution, the sliding member 40 in the connector main part 100-1 provided in this application is configured to cooperate with the fiber adapter to lock the fiber connector plug to the fiber adapter. However, in the second solution, the sliding member 40 is configured to cooperate with the plug-in member 21A-2 of the assembly kit 21A to lock the plug-in member 21A-2 to the connector main part 100-1. It can be seen that the connector main part 100-1 provided in this application has the following: The same structure can match advantages of different kits, and functions and applications of the connector main part 100-1 are expanded and can adapt to different application scenarios, which facilitate resource sharing and reduce energy consumption.

Figure 48:
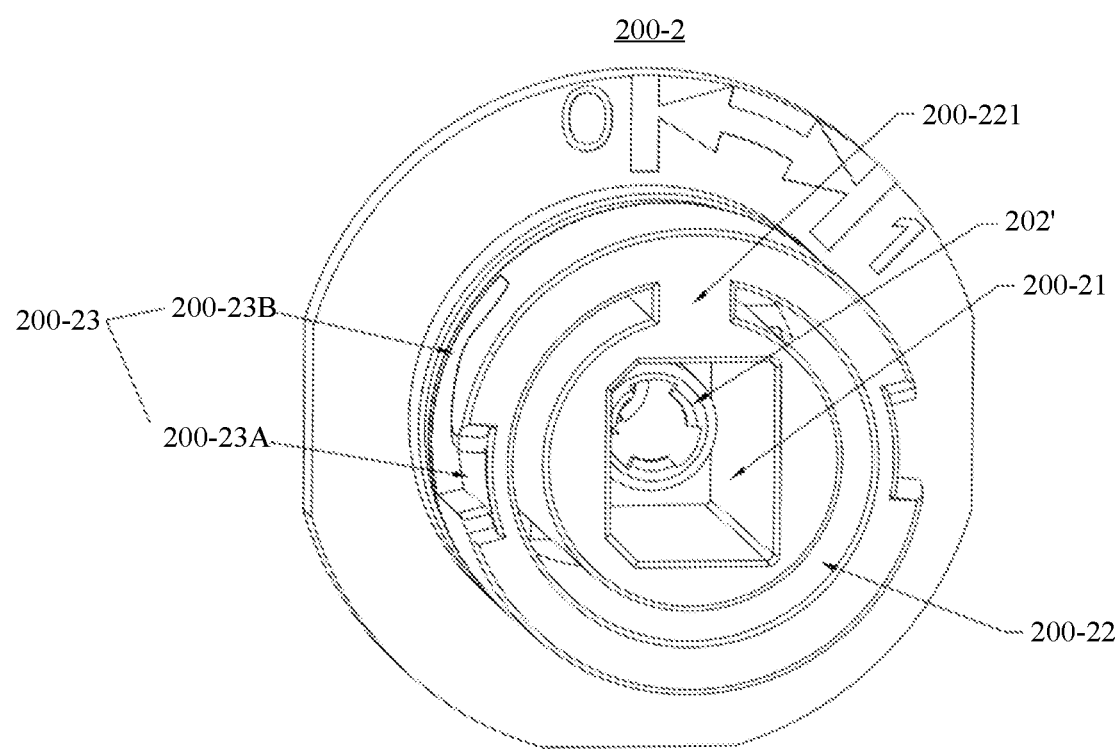
FIG. 48 is a three-dimensional view of a fiber adapter in a second solution.

For the second solution, for a specific structure of a fiber adapter 200-2 that cooperates with the assembly kit 21A, reference may be made to FIG. 48. FIG. 48 shows structural characteristics of the fiber adapter 200-2 in cooperation with the assembly kit 21A and the connector main part 100-1. In the radial direction, from a center of the fiber adapter 200-2 to a periphery, a ferrule sleeve 202' (where a ferrule accommodating space is provided in the ferrule sleeve 202', and a structure of the ferrule sleeve 202' is the same as a structure of the ferrule sleeve 202 in the fiber adapter 200-1 in the first solution) is arranged on the fiber adapter 200-2, and an intermediate member accommodating cavity 200-21, a guide groove 200-22, and a chute 200-23 located on an outer surface are on a periphery of the ferrule sleeve 202'. The chute 200-23 includes an open end 200-23A and a locking section 200-23B. The fiber adapter 200-2 includes a foolproof structure 200-221 connected to the guide groove 200-22. The foolproof structure 200-221 is configured to cooperate with the guide groove or guide cut B11 on the guide sleeve 21A-2B, to ensure a correct insertion direction. In this implementation, the guide groove 200-22 is an unclosed enclosing structure, and the foolproof structure 200-221 is formed between a head end and a tail end of the guide groove 200-22. For the chute 200-23, a part of the chute at the open end 200-23A is in a shape of a straight groove, and an extension direction of the straight groove is the axial direction, that is, the extension direction is the same as that of a central axis of the fiber adapter. The locking section 200-23B extends in an arc shape, and an extension track of the locking section 200-23B is similar to a shape of a part of a spiral line. When the fiber connector plug formed by the connector main part 100-1 and the assembly kit 21A is inserted into the fiber adapter 200-2, the guide sleeve 21A-2B is aligned with the guide groove 200-22, the guide groove or guide cut B11 is aligned with the foolproof structure 200-221, and the sliding block A13 on the outer sleeve 21A-2A is aligned with the open end 200-23A of the chute 200-23, so that the fiber connector plug can be inserted into the fiber adapter 200-2. In an insertion process, the outer sleeve 21A-2A is rotated, so that the sliding block A13 slides to an end of the locking section 200-23B away from the open end 200-23A, that is, locking between the fiber connector plug and the fiber adapter 200-2 is completed. In a locked state, the outer sleeve 21A-2A surrounds a periphery of the fiber adapter 200-2. Specifically, a positioning groove may be arranged on one end of the locking section 200-23B away from the open end 200-23A. When sliding to a position of the positioning groove, the sliding block A13 may cooperate with the positioning groove to implement a positioning function.

In the third solution, a specific implementation of the fiber connector plug formed by the assembly kit 21B and the connector main part 100-1 is described in detail as follows.

The connector main part 100-1 and the connector main part 100-1 that cooperates with the integrated kit in the first solution have the same structure.

Figure 49:
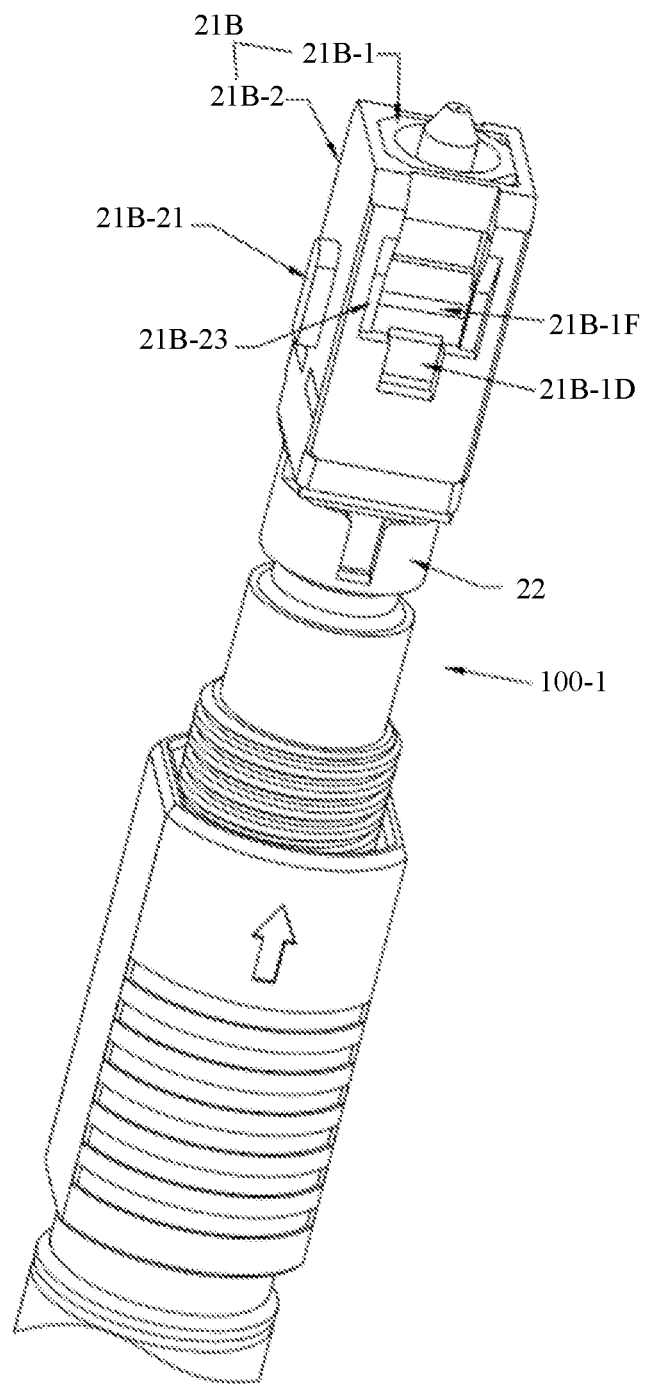
FIG. 49 is a schematic three-dimensional view of a fiber connector plug assembly formed by mounting an assembly kit to a connector main part in a fiber connector plug assembly according to an implementation of a third solution.

Refer to FIG. 49. An intermediate member 21B-1 of an assembly kit 21B is connected to a main housing 22 of a connector main part 100-1, and a plug-in member 21B-2 is connected to the intermediate member 21B-1 and is arranged around a periphery of the intermediate member 21B-1.

Figure 50:
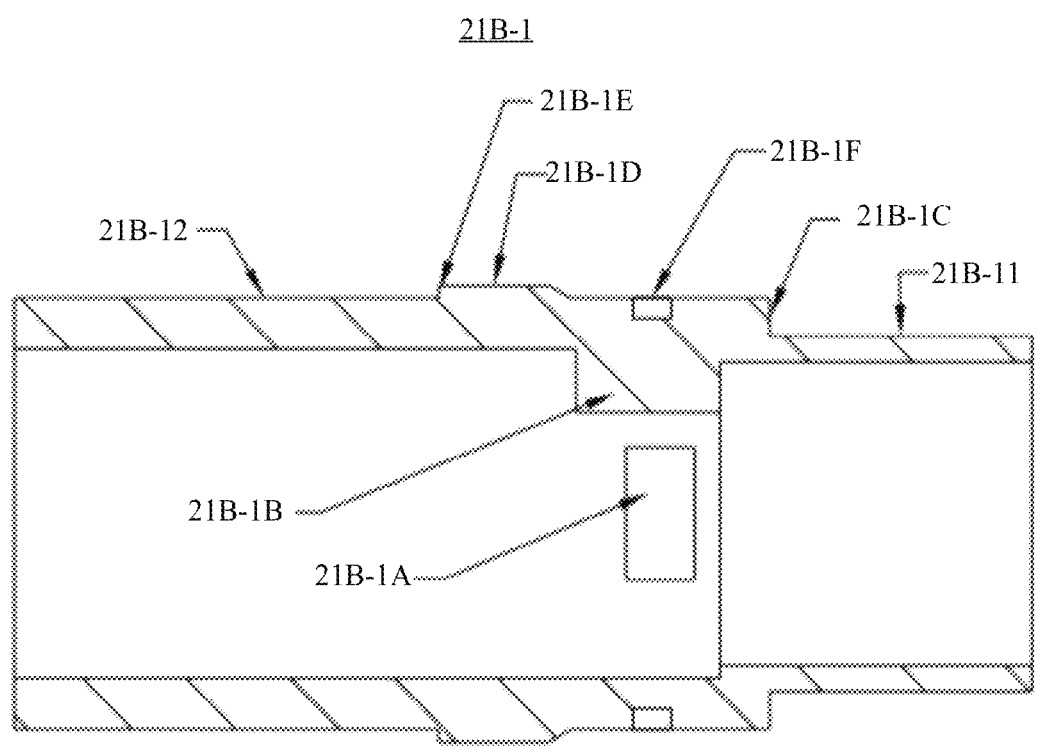
FIG. 50 is a sectional view of an intermediate member in an assembly kit in a fiber connector plug assembly according to an implementation of a third solution.

Refer to FIG. 50. The intermediate member 21B-1 in the assembly kit 21B and the intermediate member 21A-1 in the assembly kit 21A in the second solution may have a same structure, and may have different structures. In this implementation, the intermediate member 21B-1 is provided with a hole 21B-1A that penetrates an inner surface and an outer surface of the intermediate member 21B-1, and the hole 21B-1A is used to detachably connect to the main housing 22 on the connector main part 100-1. A limiting structure 21B-1B is arranged on the inner surface of the intermediate member 21B-1. The limiting structure 21B-1B is configured to cooperate with a ferrule 12 to implement positioning of the ferrule 12. The hole 21B-1A and the limiting structure 21B-1B are the same as related features of the intermediate member 21A-1 in the second solution. Therefore, the hole 21B-1A and the limiting structure 21B-1B are both parts configured to cooperate with the connector main part 100-1. In this implementation, the intermediate member 21B-1 includes a first section 21B-11 and a second section 21B-12 that are axially distributed, and an outer diameter of the first section 21B-11 is less than an outer diameter of the second section 21B-12. A step face 21B-1C is formed on an outer surface between the first section 21B-11 and the second section 21B-12, and the step face 21B-1C faces a front-end of the intermediate member 21B-1. A clamping block 21B-1D is protrudingly arranged on an outer surface of the second section 21B-12, and a face of a rear end of the clamping block 21B-1D facing the intermediate member 21B-1 is a positioning face 21B-1E. The step face 21B-1C and the positioning face 21B-1E are configured to cooperate with a corresponding limiting feature on the plug-in member 21B-2 of the assembly kit 21B, to axially limit the plug-in member 21B-2 and the intermediate member 21B-1. Specifically, an inner wall of a front-end of the plug-in member 21B-2 is in contact with an outer surface of the first section 21B-11 (as shown in FIG. 49), and a limiting face (for example, a limiting face numbered as 21B-25 shown in FIG. 54, which may be understood as that an inner diameter of a part of the plug-in member 21B-2 close to a rear end is greater than an inner diameter of a front-end of the plug-in member 21B-2) that cooperates with the step face 21B-1C is arranged on an inner surface of the plug-in member 21B-2. A clamping portion 21B-1F is further protrudingly arranged on the outer surface of the intermediate member 21B-1. The clamping portion 21B-1F and the clamping block 21B-1D are located on a same side surface. In an axial direction, the clamping portion 21B-1F is located between the clamping block 21B-1D and the step face 21B-1C.

The plug-in member 21B-2 in the third solution is greatly different from the plug-in member 21A-2 in the second solution. In this solution, the plug-in member 21B-2 is of an integrated architecture, and is not a combination of an outer sleeve and a guide sleeve, but is of an independent tubular structure. In addition, the plug-in member 21B-2 is slidably connected to the intermediate member 21B-1, and the plug-in member 21B-2 and the connector main part 100-1 has no connection relationship. The plug-in member 21B-2 in this solution is integrated with a foolproof structure, a guide structure, and an unlocking structure that need to be used in a plug-in process, and has advantages of a simple structure and a small size.

In this solution, a structure for locking a fiber adapter is arranged on the intermediate member 21B-1, and unlocking is implemented by using the plug-in member 21B-2. A connection relationship between the intermediate member 21B-1 and the plug-in member 21B-2 is a sliding connection in the axial direction.

Figure 51:
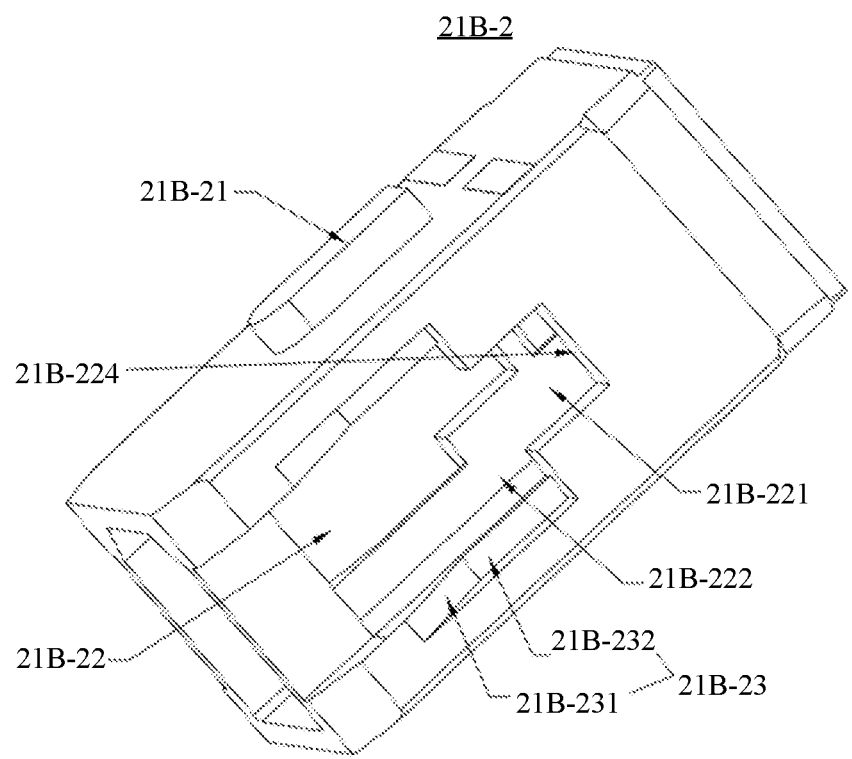
FIG. 51 is a three-dimensional view of a plug-in member in an assembly kit in a third solution.

Refer to FIG. 51. The plug-in member 21B-2 is approximately in a square tubular structure, and the intermediate member 21B-1 is also approximately in a square tubular structure. In this way, the plug-in member 21B-2 is sleeved on the periphery of the intermediate member 21B-1, and circumferential positioning can be implemented between the plug-in member 21B-2 and the intermediate member 21B-1 through contact cooperation, that is, relative rotation between the plug-in member 21B-2 and the intermediate member 21B-1 can be prevented.

Refer to FIG. 51. A protruding foolproof structure 21B-21 is arranged on an outer surface of one side of the plug-in member 21B-2, and the foolproof structure 21B-21 is configured to cooperate with a corresponding foolproof slot on the fiber adapter, to ensure a direction in which the plug-in member 21B-2 is plugged in the fiber adapter. Specifically, the foolproof structure 21B-21 extends in a strip shape, and an extension direction is the axial direction. A front-end of the foolproof structure 21B-21 is an arc-shaped end face, the arc-shaped end face may also be replaced with an oblique surface, and the arc-shaped end face is used as guidance in a plug-in process, so that the plug-in process is smoother.

A hollow region 21B-22 is arranged on another side surface of the plug-in member 21B-2 (where there are two hollow regions 21B-22 symmetrically distributed on two opposite side surfaces). When the intermediate member 21B-1 is assembled to the plug-in member 21B-2, the clamping portion 21B-1F and the clamping block 21B-1D are located in the hollow region 21B-22. The hollow region 21B-22 includes a first hole 21B-221 and a second hole 21B-222 that are connected, an area of the second hole 21B-222 is greater than that of the first hole 21B-221, and the first hole 21B-221 is located at an end of the second hole 21B-222 to form a T-shaped hole structure. The first hole 21B-221 is configured to accommodate the clamping block 21B-1D, and a hole wall of the first hole 21B-221 includes a limiting face 21B-224. The limiting face 21B-224 faces the second hole 21B-222, and the limiting face 21B-224 is configured to cooperate with the clamping block 21B-1D to form axial limiting of the plug-in member 21B-2. In the axial direction, the limiting face 21B-224 and a front-end face of the main housing 22 of the connector main part 100-1 implement limiting of the plug-in member 21B-2. The second hole 21B-222 is arranged corresponding to the clamping portion 21B-1F, and the second hole 21B-222 is configured to accommodate an elastic arm that is on the fiber adapter and that is provided with a clamping hook, so that the clamping hook can cooperate with the clamping portion 21B-1F to implement a locked state.

A pair of chutes 21B-23 are further recessed on the outer surface of the plug-in member 21B-2. The pair of chutes 21B-23 are symmetrically distributed on two sides of the second holes 21B-222, and extension directions are the axial direction. Each chute 21B-23 includes a first region 21B-231 and a second region 21B-232 that are connected. In the axial direction, the second region 21B-232 is located between the first region 21B-231 and the first hole 21B-221, a groove bottom of the second region 21B-232 includes a first plane, and a distance between the first plane and the inner surface of the plug-in member 21B-2 is less than a distance between the outer surface and the inner surface of the plug-in member 21B-2. The groove bottom of the second region 21B-232 is an oblique surface connected between the outer surface and the first plane. The chute 21B-23 is configured to unlock between the fiber adapter and the plug-in member 21B-2.

In the implementation provided in this solution, a detachable connection structure is used between the intermediate member 21B-1 and the main housing 22 of the connector main part 100-1, and the plug-in member 21B-2 is detachably connected to the intermediate member 21B-1. In a process of plugging a fiber connector plug assembly in a fiber adapter 200-3, the plug-in member 21B-2 cooperates with the fiber adapter 200-3 to implement guiding, and the intermediate member 21B-1 cooperates with the fiber adapter 200-3 to implement locking and fastening.

Figure 52:
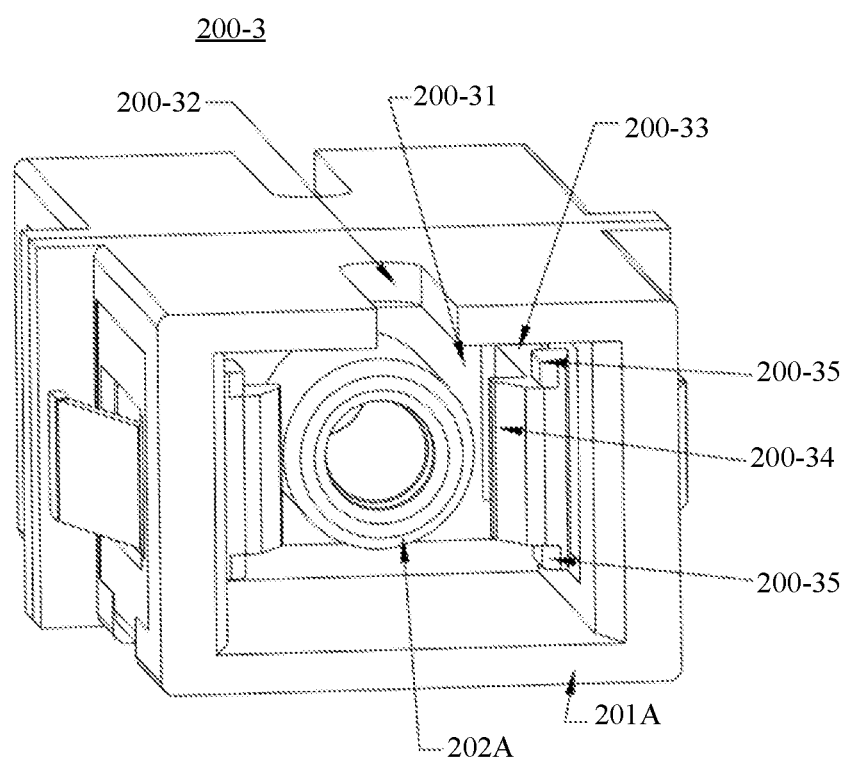
FIG. 52 is a three-dimensional view of a fiber adapter in a third solution.

Refer to FIG. 52. A structure of the fiber adapter 200-3 is as follows: In a radial direction, the fiber adapter 200-3 includes a ferrule sleeve 202A and a main body sleeve 201A surrounding a periphery of the ferrule sleeve 202A. A space between the main body sleeve 201A and the ferrule sleeve 202A is an accommodating space 200-31 for accommodating the assembly kit 21B, an end of the accommodating space 200-31 is a socket for inserting a fiber connector plug, and a bottom of the accommodating space 200-31 opposite to the socket is a bottom end of the main body sleeve 201A. The main body sleeve 201A is provided with a foolproof groove 200-32 that penetrates an inner surface and an outer surface of the main body sleeve 201A, and the foolproof groove 200-32 forms an opening on an end face of the main body sleeve 201A, so that the foolproof structure 21B-21 is inserted into the foolproof groove 200-32 from the opening. A pair of elastic arms 200-33 are arranged between the main body sleeve 201A and the ferrule sleeve 202A. An end of the elastic arm 200-33 is fastened to the bottom end of the main body sleeve 201A, a clamping hook 200-34 and a sliding block 200-35 are arranged on an end of the elastic arm 200-33 away from the main body sleeve 201A, and both the clamping hook 200-34 and the sliding block 200-35 are located on a side of the elastic arm 200-33 facing the ferrule sleeve 202A. There are two sliding blocks 200-35 distributed on two sides of the clamping hook 200-34. The sliding blocks 200-35 are configured to cooperate with the chutes on the plug-in member 21B-2, and the clamping hook 200-34 is configured to cooperate with the clamping portion 21B-1F on the intermediate member, to implement the locked state. A space for accommodating the assembly kit 21B is formed between the elastic arm 200-33 and the ferrule sleeve 202A, and a gap is formed between the elastic arm 200-33 and the main body sleeve 201A. The gap is for providing an elastic swing space of the elastic arm 200-33 under an action of external force (force for inserting or removing the fiber connector plug).

Figure 53:
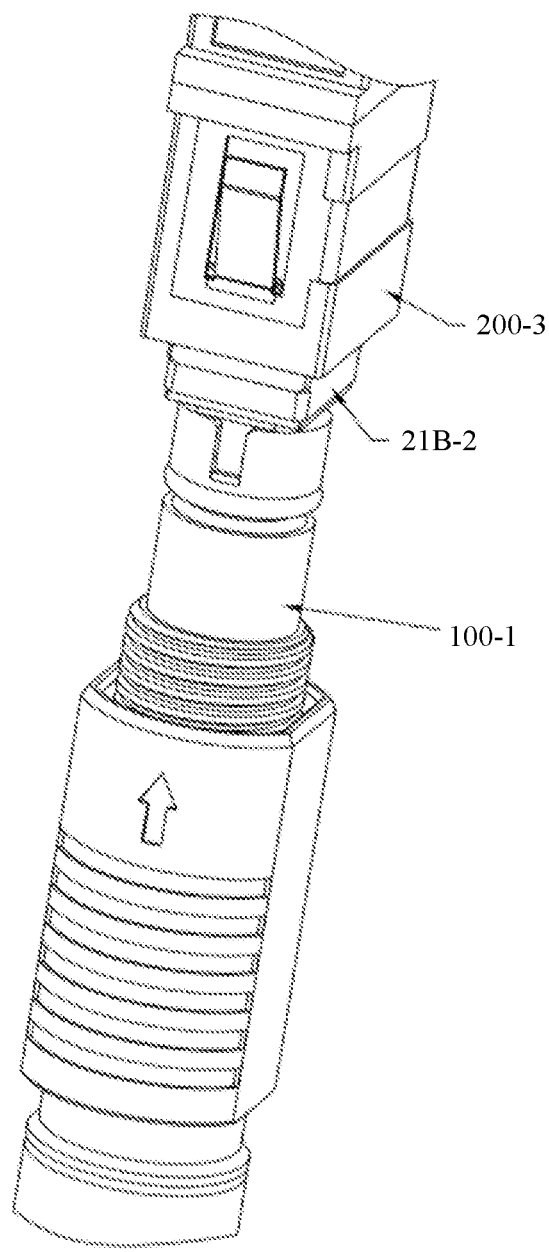
FIG. 53 is a three-dimensional view of plugging a fiber connector plug assembly in a fiber adapter in a third solution.
Figure 54:
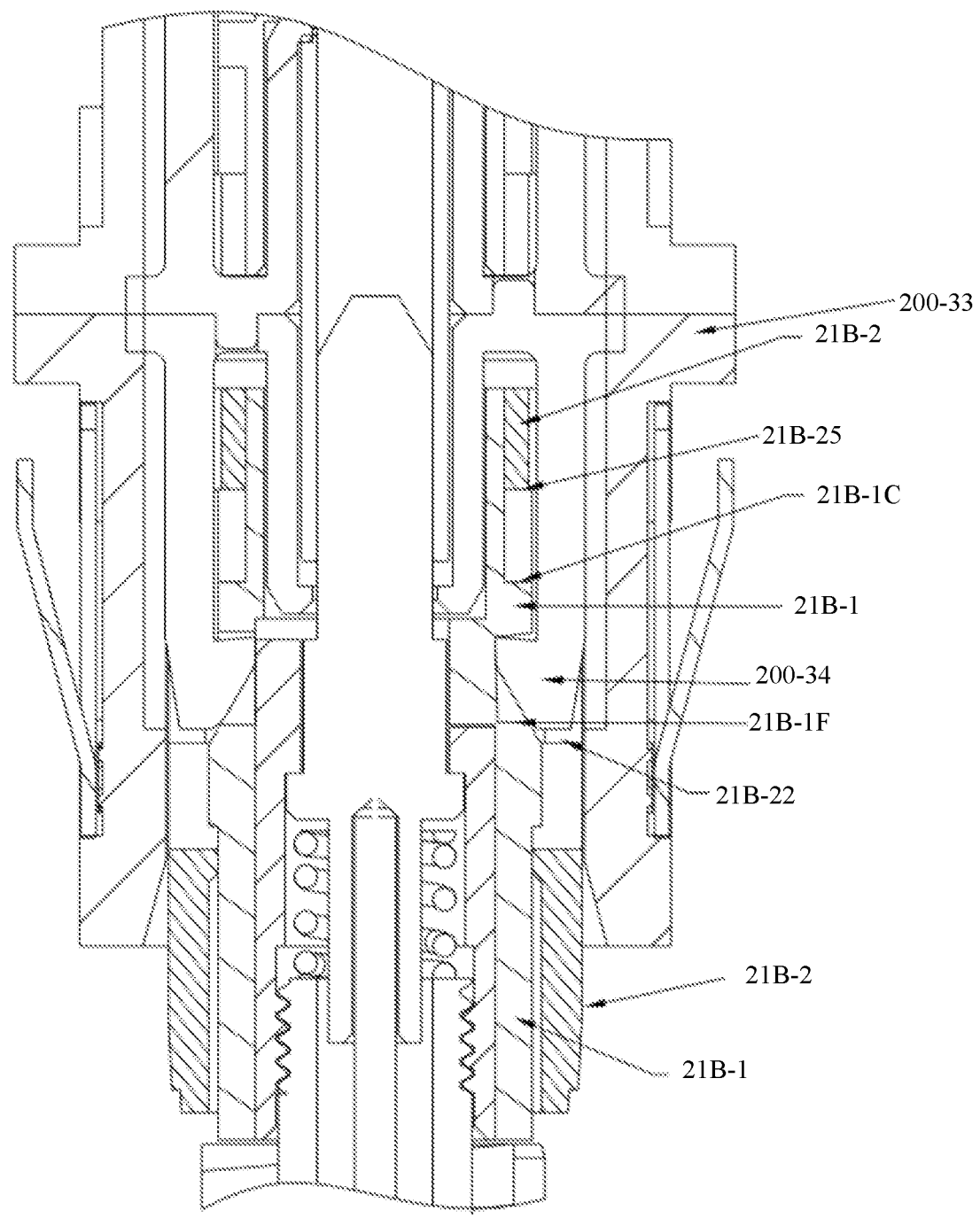
FIG. 54 is a partial sectional view of plugging a fiber connector plug assembly in a fiber adapter in a third solution.

Refer to FIG. 53 and FIG. 54. When the plug-in member 21B-2 is inserted into the fiber adapter 200-3 and is in the locked state, the limiting face 21B-224 is configured to cooperate with the positioning face 21B-1E of the intermediate member 21B-1 (this structural relationship is not shown in the figures), and the clamping hook 200-34 in the fiber adapter 200-3 cooperates with the clamping portion 21B-1F on the intermediate member 21B-1. When the fiber connector plug needs to be removed from the fiber adapter, the plug-in member 21B-2 is axially pulled in a direction away from the fiber adapter, so that the plug-in member 21B-2 can move. In a moving process, the sliding block 200-35 moves on the chute 21B-23 (with reference to FIG. 49 and FIG. 52), and the sliding block 200-35 is forced to generate radial displacement through the bevel second region 21B-232 of the chute 21B-23, and the elastic arm 200-33 is also driven to generate elastic swing, so that the clamping hook 200-34 detaches from the clamping portion 21B-1F, to implement unlocking. The first limiting face 21B-223 is configured to cooperate with the step face 21B-1C of the intermediate member 21B-1, to implement limiting of a sliding process of the plug-in member 21B-2 in an unlocking process.

In the fourth solution, a specific implementation of the fiber connector plug formed by the assembly kit 21C and the connector main part 100-1 is described in detail as follows.

In this solution, a structure of the connector main part 100-1 may be the same as that of the connector main part in the foregoing three solutions. However, in this solution, a sliding member on the connector main part 100-1 is not required. Therefore, when the connector main part 100-1 is applied in this solution, the sliding member may be removed, but structures of other parts remain unchanged.

Figure 55:
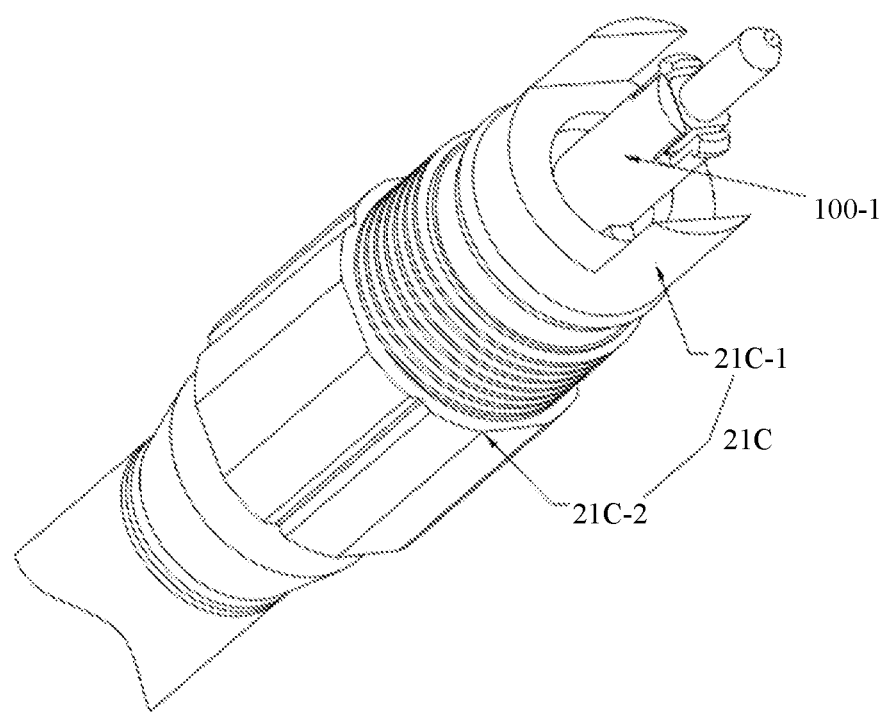
FIG. 55 is a schematic three-dimensional view of a fiber connector plug assembly formed by mounting an assembly kit to a connector main part in a fiber connector plug assembly according to an implementation of a fourth solution.
Figure 56:
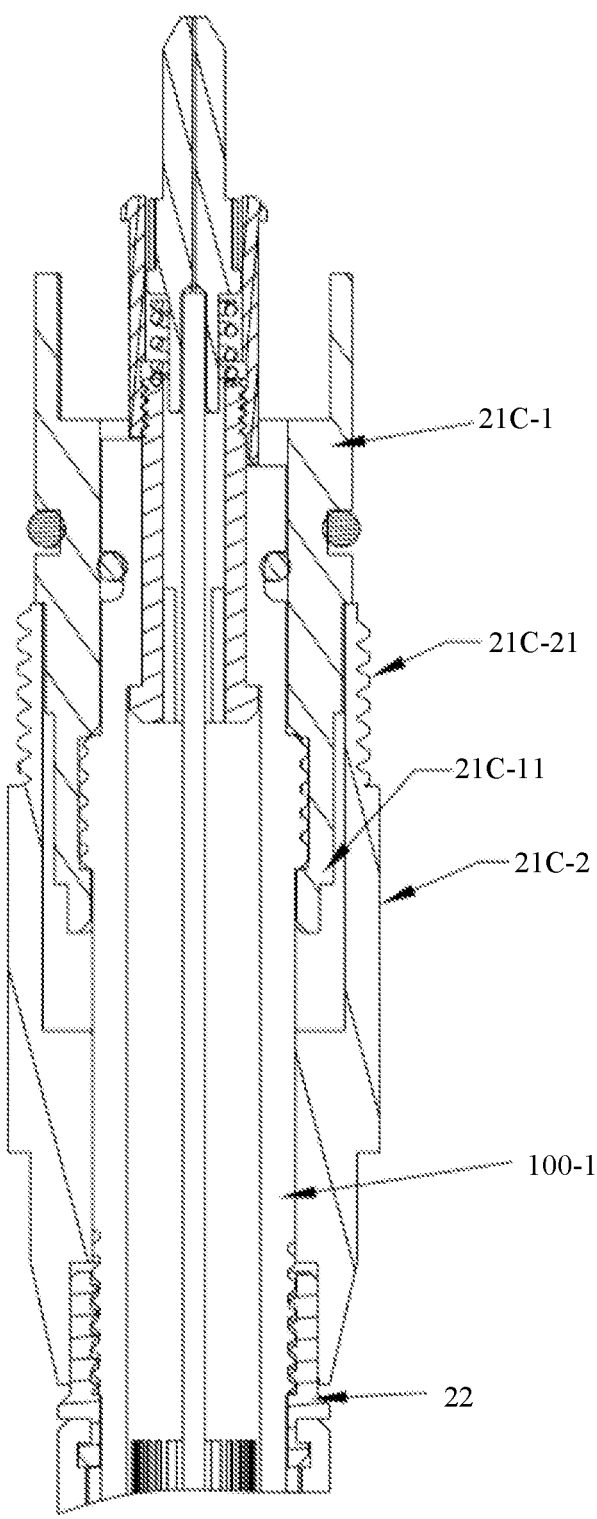
FIG. 56 is a sectional view of a fiber connector plug assembly formed by mounting an assembly kit to a connector main part in a fiber connector plug assembly according to an implementation of a fourth solution.

Refer to FIG. 55 and FIG. 56. An intermediate member 21C-1 of an assembly kit 21C is connected to a connector main part 100-1, and a plug-in member 21C-2 is connected to the intermediate member 21C-1 and is arranged around a periphery of a part of the intermediate member 21C-1. A structure of the intermediate member 21C-1 of the assembly kit 21C in this solution may be the same as or different from those of the intermediate members in the second solution and the third solution.

Figure 57:
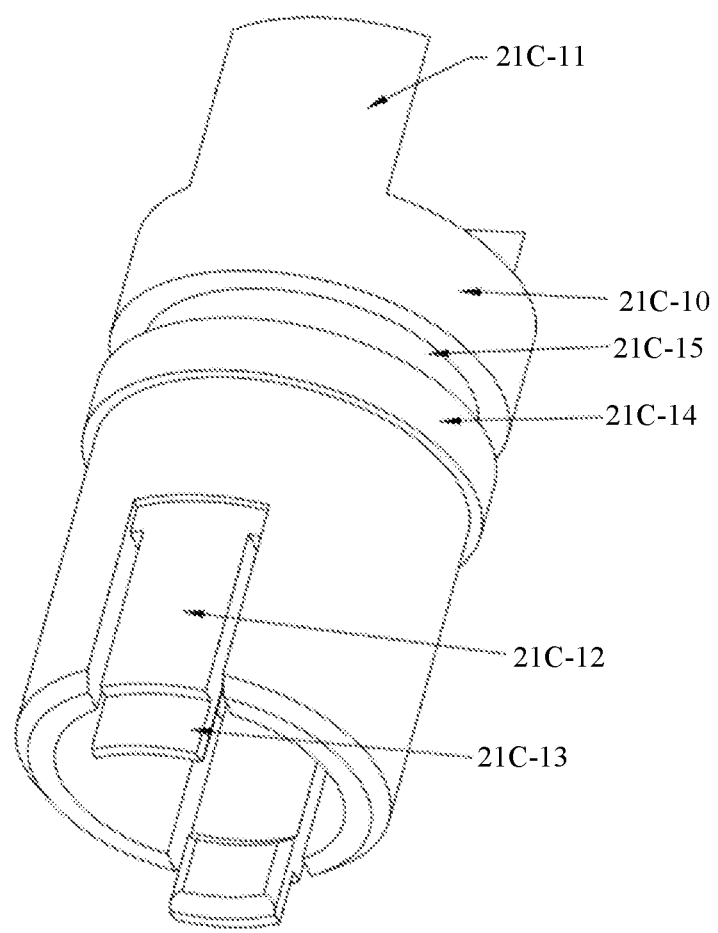
FIG. 57 is a three-dimensional view of an intermediate member in an assembly kit in a fourth solution.

Refer to FIG. 57. In an implementation, a specific structure of the intermediate member 21C-1 is as follows: The intermediate member 21C-1 is in a sleeve shape and includes a sleeve main body 21C-10. A pair of guide arms 21C-11 are protrudingly arranged on a front-end of the sleeve main body 21C-10. The guide arms 21C-11 axially extend forward from a front-end face of the sleeve main body 21C-10. The pair of guide arms 21C-11 are configured to cooperate with a fiber adapter to implement guidance. For example, a pair of guide grooves are arranged on the fiber adapter, and the guide arms 21C-11 cooperate with the guide grooves to implement a guiding function. A pair of elastic arms 21C-12 are formed at a position of the sleeve main body close to a rear end of the sleeve main body, and the elastic arms 21C-12 are formed by arranging cut grooves on the sleeve main body 21C-10. Extension directions of the elastic arms 21C-12 are an axial direction. A pair of buckle portions 21C-13 are arranged on tail ends of the elastic arms 21C-12, and the buckle portions 21C-13 are configured to clamp the intermediate member 21C-1 to a main housing of the connector main part 100-1.

In this implementation, a limiting ring 21C-14 is further protrudingly arranged on an outer surface of the intermediate member 21C-1. The limiting ring 21C-14 is configured to limit the plug-in member 21C-2, so that the assembled plug-in member 21C-2 cannot be removed from a direction of a front-end of the intermediate member 21C-1. A groove 21C-15 for accommodating a sealing element is arranged on a front-end of the limiting ring 21C-14, and the sealing element in the groove 21C-15 is configured to implement a sealing connection between the intermediate member 21C-1 and the fiber adapter. A sealing structure is easily arranged between the intermediate member 21C-1 and the connector main part 100-1.

Refer to FIG. 56. The plug-in member 21C-2 is of an integrated tubular structure, the plug-in member 21C-2 is fastened to the connector main part 100-1, the plug-in member 21C-2 encloses a part of the intermediate member 21C-1, and a remaining part of the intermediate member 21C-1 is located outside the plug-in member 21C-2, and the plug-in member 21C-2 includes an external thread 21C-21 for connecting to the fiber adapter. In an implementation, the plug-in member 21C-2 is fastened between the intermediate member 21C-1 and a main housing 22 of the connector main part 100-1. In an assembling process, the plug-in member 21C-2 is first sleeved on the main housing 22, and a corresponding structure is arranged on an outer surface of the main housing 22 to support and limit the plug-in member 21C-2. The intermediate member 21C-2 is then inserted between the plug-in member 21C-2 and the main housing. The intermediate member 21C-1 is fastened to the main housing through cooperation between the elastic arm 21C-12 and the buckle portion 21C-13 on the intermediate member 21C-2 and a clamping structure on the main housing. It can be seen from FIG. 56 that, after assembly, there is a gap between the plug-in member 21C-2 and the elastic arm 21C-12 of the intermediate member 21C-1. The gap provides an avoidance space for the elastic arm 21C-12 in a locking and unlocking process. When the intermediate member 21C-1 is pulled out under external force, the elastic arm 21C-12 is forced to open, that is, the elastic arm 21C-12 deviates to the gap, so that the buckle portion 21C-13 is in an unlocked state.

Figure 58:
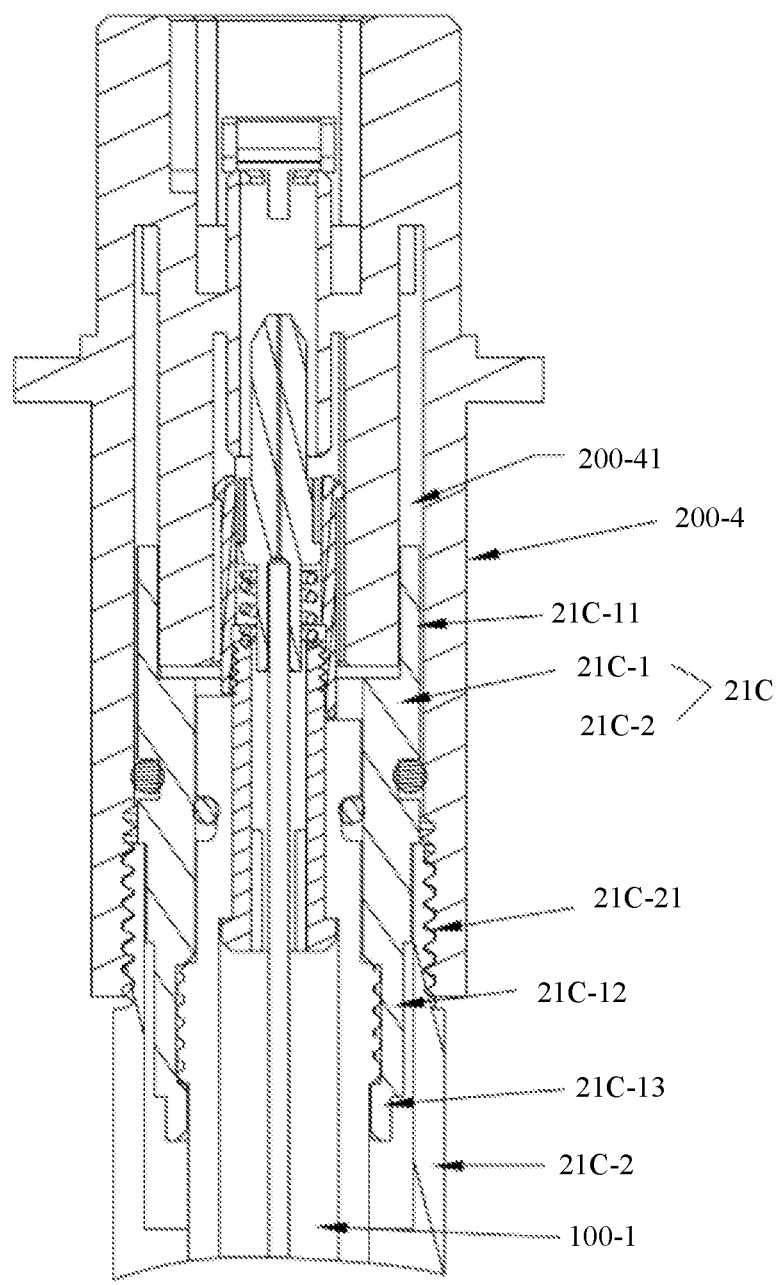
FIG. 58 is a sectional view of plugging a fiber connector plug assembly in a fiber adapter in a fourth solution.

FIG. 58 shows a state in which the connector main part 100-1 and the assembly kit 21C after cooperation are mounted to a fiber adapter 200-4, where a guide arm 21C-11 of the intermediate member 21C-1 cooperates with a guide groove 200-41 of the fiber adapter 200-4. The external thread 21C-21 of the plug-in member 21C-2 fits an internal thread of the fiber adapter 200-4 to implement a locked state of a fiber connector plug assembly and the fiber adapter.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fiber connector plug assembly, comprising:
 a connector main part comprising a ferrule and a main housing, wherein the ferrule comprises a front section and a connection section, the connection section is at least partially located inside the main housing, the connection section is in positioning connection to the main housing and configured to radially fasten the ferrule and restrict the ferrule from axially moving out of the main housing, and the front section is entirely located outside the main housing; and
 at least two kits that each have a sleeve shape, the at least two kits configured to be detachably connected to the main housing to block the front section, and the connector main part configured to be selectively connected to one of the at least two kits to form a fiber connector plug, wherein
  when one of the at least two kits is connected to the connector main part, a slot is formed between the kit and the front section,
  the ferrule is inserted into a ferrule sleeve of a fiber adapter, the ferrule sleeve extends into the slot and an open end of the ferrule sleeve is located in the slot,
  the at least two kits and the connector main part are combinable to form fiber connector plugs of different forms to adapt to fiber adapters of different forms,
  the at least two kits further comprise an assembly kit,
  the assembly kit comprises an intermediate member and a plug-in member that both have a sleeve shape, and
  when the assembly kit is connected to the connector main part, the intermediate member is detachably connected to the connector main part and surrounds the front section, the slot is formed between the intermediate member and the front section.

2. The fiber connector plug assembly according to claim 1, wherein the front section is made of a ceramic material, and the connection section is made of a non-ceramic material.

3. The fiber connector plug assembly according to claim 1, wherein:
 the at least two kits comprise an integrated kit;
 the integrated kit comprises a front-end face and a rear end face;
 the ferrule comprises a front-end face located at an end of the front section away from the connection section; and
 when the integrated kit is connected to the connector main part,
  the rear end face of the integrated kit is connected to the main housing, and
  the front-end face of the ferrule is flush with the front-end face of the integrated kit, or the front-end face of the ferrule is located between the front-end face of the integrated kit and the rear end face of the integrated kit in an axial direction.

4. The fiber connector plug assembly according to claim 3, wherein:
 the main housing of the connector main part comprises a main shaft and a sliding member arranged on an outer surface of the main shaft, the ferrule is connected to a front-end of the main housing, and the sliding member is slidably connected to the main housing between a first position and a second position;
 when the connector main part is connected to the integrated kit to form the fiber connector plug, a locking portion and the sliding member are configured to cooperate with a corresponding fiber adapter;
 when the sliding member is at the first position, the sliding member and the locking portion are configured to cooperate to jointly lock the fiber adapter; and when the sliding member is at the second position, the fiber connector plug and the fiber adapter are configured to be unlocked.

5. The fiber connector plug assembly according to claim 4, wherein:
a locking groove is formed between the sliding member and the main housing, the locking groove is configured to fit an elastic arm of the fiber adapter, an opening of the locking groove is located between an end of the sliding member and the main housing, the sliding member comprises a fitting surface formed on an inner wall of the locking groove, the fitting surface faces the main housing, the fitting surface comprises a first region and a second region, the first region is located between the second region and the opening of the locking groove, and a vertical distance between the first region and the main housing is greater than a vertical distance between the second region and the main housing;
when the sliding member is at the first position, the first region is arranged opposite to the locking portion, and the second region is arranged opposite to an outer surface of the main housing; and
when the sliding member is at the second position, the fitting surface is arranged opposite to the outer surface of the main housing.

6. The fiber connector plug assembly according to claim 3, wherein:
the plug-in member is sleeved on a periphery of the intermediate member, and the plug-in member is configured to cooperate with the fiber adapter to connect the fiber connector plug assembly to the fiber adapter.

7. The fiber connector plug assembly according to claim 6, wherein:
the main housing of the connector main part comprises a main shaft, a locking portion and a sliding member that are arranged on an outer surface of the main shaft, and the ferrule is connected to a front-end of the main housing;
the sliding member is slidably connected to the main housing between a first position and a second position;
the locking portion is located between the sliding member and the ferrule in an axial direction of the main housing; and
the plug-in member comprises an outer sleeve and a guide sleeve, the outer sleeve is connected to a periphery of the guide sleeve and surrounds the guide sleeve, the guide sleeve is sleeved on the periphery of the intermediate member, and the guide sleeve is configured to cooperate with the sliding member, to connect the plug-in member to the connector main part.

8. The fiber connector plug assembly according to claim 7, wherein:
a locking groove is formed between the sliding member and the main housing, an opening of the locking groove is located between an end of the sliding member and the main housing, the sliding member comprises a fitting surface formed on an inner wall of the locking groove, the fitting surface faces the main housing, the fitting surface comprises a first region and a second region, the first region is located between the second region and the opening of the locking groove, and a vertical distance between the first region and the main housing is greater than a vertical distance between the second region and the main housing;
and the guide sleeve comprises a limiting convex ring and a limiting section, the limiting convex ring is located at an end of the limiting section, the limiting section comprises a first elastic arm and a second elastic arm that extend axially and that are arranged at intervals in a circumferential direction, the first elastic arm is provided with a clamping hook structure that protrudes radially and outwardly, the second elastic arm is provided with a clamping portion that protrudes radially and inwardly, the clamping hook structure and the limiting convex ring jointly function to fasten the plug-in member, and the clamping portion is configured to cooperate with the locking groove and the fitting surface to connect the plug-in member to the connector main part.

9. The fiber connector plug assembly according to claim 6, wherein the plug-in member is of an integrated tubular structure, the plug-in member is slidably connected to the intermediate member and surrounds the intermediate member, the plug-in member is provided with a hollow region, an outer surface of the intermediate member is provided with a clamping portion, the clamping portion is correspondingly arranged in the hollow region, the clamping portion is configured to cooperate with a clamping hook of the fiber adapter to implement a locked state, and through axial sliding of the plug-in member relative to the intermediate member, the clamping portion is driven to detach from the clamping hook of the fiber adapter to implement unlocking.

10. The fiber connector plug assembly according to claim 3, wherein:
the fiber connector plug assembly further comprises a traction cap; and
when the integrated kit is connected to the connector main part, the traction cap is configured to cover a periphery of the integrated kit and is fastened to the main housing.

11. The fiber connector plug assembly according to claim 3, wherein:
the integrated kit is provided with a hole, the main housing is provided with an elastic clamping hook, the elastic clamping hook is configured to cooperate with the hole to implement a locked state between the integrated kit and the main housing, an avoidance space is provided on a side of the elastic clamping hook away from the integrated kit; and
when the integrated kit is subjected to force, the elastic clamping hook is capable of moving into the avoidance space, so that a buckle detaches from the hole to unlock the integrated kit from the main housing.

12. The fiber connector plug assembly according to claim 3, wherein:
the integrated kit comprises a main body and an elastic arm, the elastic arm comprises a first end and a second end that are opposite to each other, the first end is connected to the main body, a clamping hook is arranged on the second end, the elastic arm further comprises a first side edge and a second side edge that are connected between the first end and the second end, a first gap is provided between the first side edge and the main body, a second gap provided between the second side edge and the main body, the main housing is provided with a lock hole or a lock slot, the clamping hook is configured to cooperate with the lock hole or the lock slot to lock the integrated kit to the main housing; and
when the elastic arm is opened by external force, the clamping hook is configured to detach from the lock hole or the lock slot to unlock the integrated kit from the main housing.

13. The fiber connector plug assembly according to claim 2, wherein:
the at least two kits comprise at least two assembly kits, and each assembly kit comprises an intermediate member and a plug-in member that both have a sleeve shape; and
when the assembly kit is connected to the connector main part, the intermediate member is sleeved on a periphery of the front section of the ferrule and is detachably connected to the main housing, the plug-in member is arranged around a periphery of the intermediate member, the plug-in member is configured to cooperate with the fiber adapter, and forms of plug-in members of different assembly kits are different.

14. The fiber connector plug assembly according to claim 13, wherein:
the main housing of the connector main part comprises a main shaft and a sliding member arranged on an outer surface of the main shaft, and the ferrule is connected to a front-end of the main housing; the sliding member is slidably connected to the main housing between a first position and a second position; and
when the connector main part is connected to the assembly kit to form the fiber connector plug, the plug-in member is configured to cooperate with the sliding member to fasten the plug-in member to the connector main part.

15. The fiber connector plug assembly according to claim 14, wherein:
a locking groove is formed between the sliding member and the main housing, an opening of the locking groove is located between an end of the sliding member and the main housing, the sliding member comprises a fitting surface formed on an inner wall of the locking groove, the fitting surface faces the main housing, the fitting surface comprises a first region and a second region, the first region is located between the second region and the opening of the locking groove, and a vertical distance between the first region and the main housing is greater than a vertical distance between the second region and the main housing;
the plug-in member comprises an outer sleeve and a guide sleeve, the outer sleeve is connected to a periphery of the guide sleeve and surrounds the guide sleeve, and the guide sleeve is sleeved around the periphery of the intermediate member; and
the guide sleeve comprises a limiting convex ring and a limiting section, the limiting convex ring is located at an end of the limiting section, the limiting section comprises a first elastic arm and a second elastic arm that extend axially and are arranged at intervals in a circumferential direction, the first elastic arm is provided with a clamping hook structure that protrudes radially and outwardly, the second elastic arm is provided with a clamping portion that protrudes radially and inwardly, the clamping hook structure and the limiting convex ring jointly function to fasten the plug-in member, and the clamping portion is configured to cooperate with the locking groove and the fitting surface, to connect the plug-in member to the connector main part.

16. The fiber connector plug assembly according to claim 13, wherein the plug-in member has an integrated tubular structure, the plug-in member is slidably connected to the intermediate member and surrounds the intermediate member, the plug-in member is provided with a hollow region, an outer surface of the intermediate member is provided with a clamping portion, the clamping portion is accommodated in the hollow region, the clamping portion is configured to cooperate with a clamping hook of the fiber adapter to implement a locked state, and through axial sliding of the plug-in member relative to the intermediate member, the clamping portion is driven to detach from the clamping hook to implement unlocking.

17. The fiber connector plug assembly according to claim 13, wherein the plug-in member is of an integrated tubular structure, the plug-in member is fastened to the connector main part, the plug-in member encloses a part of the intermediate member, a remaining part of the intermediate member is located outside the plug-in member, and the plug-in member comprises an external thread for connecting to the fiber adapter.

18. A fiber connector assembly, comprising:
at least two fiber adapters having structures different from each other; and
a fiber connector plug assembly comprising:
a connector main part comprising a ferrule and a main housing, wherein the ferrule comprises a front section and a connection section, the connection section is at least partially located inside the main housing, the connection section is in positioning connection to the main housing and configured to radially fasten the ferrule and restrict the ferrule from axially moving out of the main housing, and the front section is entirely located outside the main housing, and
at least two kits configured for one-to-one plug-in cooperation with the at least two fiber adapters, the at least two kits each having a sleeve shape, the at least two kits configured to be detachably connected to the main housing to block the front section, and the connector main part configured to be selectively connected to one of the at least two kits to form a fiber connector plug, wherein
when one of the at least two kits is connected to the connector main part, a slot is formed between the kit and the front section,
when the ferrule is inserted into a ferrule sleeve of a fiber adapter, the ferrule sleeve extends into the slot and an open end of the ferrule sleeve is located in the slot,
the at least two kits and the connector main part are combinable to form fiber connector plugs of different forms to adapt to fiber adapters of different forms,
the at least two kits further comprise an assembly kit,
the assembly kit comprises an intermediate member and a plug-in member that both have a sleeve shape, and
when the assembly kit is connected to the connector main part, the intermediate member is detachably connected to the connector main part and surrounds the front section, the slot is formed between the intermediate member and the front section.

19. A communication device, comprising the fiber connector assembly according to claim 18.

20. A method of using a fiber connector plug assembly comprising: a connector main part comprising a ferrule and a main housing, wherein the ferrule comprises a front section and a connection section, the connection section is at least partially located inside the main housing, the connection section is in positioning connection to the main housing and configured to radially fasten the ferrule and restrict the ferrule from axially moving out of the main housing, and the front section is entirely located outside the main housing; and at least two kits that each have a sleeve shape, the at least two kits configured to be detachably connected to the main housing to block the front section, the connector main part configured to be selectively connected to one of the at least two kits to form a fiber connector plug, and the at least two kits and the connector main part are combinable to form fiber connector plugs of different forms to adapt to fiber adapters of different forms, the method comprising:
  connecting one of the at least two kits is connected to the connector main part, wherein a slot is formed between the kit and the front section; and
  inserting the ferrule into a ferrule sleeve of a fiber adapter, wherein the ferrule sleeve extends into the slot and an open end of the ferrule sleeve is located in the slot, wherein the at least two kits further comprise an assembly kit, the assembly kit comprises an intermediate member and a plug-in member that both have a sleeve shape, and when the assembly kit is connected to the connector main part, the intermediate member is detachably connected to the connector main part and surrounds the front section, the slot is formed between the intermediate member and the front section.

* * * * *